US 7,950,621 B2

(12) United States Patent
Meinig et al.

(10) Patent No.: US 7,950,621 B2
(45) Date of Patent: May 31, 2011

(54) PNEUMATIC PRESSURE REGULATION VALVE

(75) Inventors: Uwe Meinig, Münster (DE); Thomas May, Steinfurt (DE)

(73) Assignee: Hengst GmbH & Co. KG, Munster (DE)

( * ) Notice: Subject to any disclaimer, the term of this patent is extended or adjusted under 35 U.S.C. 154(b) by 656 days.

(21) Appl. No.: 10/592,697

(22) PCT Filed: Mar. 11, 2005

(86) PCT No.: PCT/EP2005/002587
§ 371 (c)(1),
(2), (4) Date: Sep. 11, 2006

(87) PCT Pub. No.: WO2005/088417
PCT Pub. Date: Sep. 22, 2005

(65) Prior Publication Data
US 2008/0142091 A1 Jun. 19, 2008

(51) Int. Cl.
F16K 31/126 (2006.01)
F16K 15/14 (2006.01)
F02M 33/00 (2006.01)
(52) U.S. Cl. ........ 251/61.4; 137/514; 137/859; 123/520
(58) Field of Classification Search ............... 137/859, 137/514.3–514.7, 514; 251/61.2–61.4, 54; 123/520
See application file for complete search history.

(56) References Cited

U.S. PATENT DOCUMENTS

| 3,844,529 A | | 10/1974 | Brandt et al. | |
|---|---|---|---|---|
| 3,989,017 A | * | 11/1976 | Reece | 123/536 |
| 4,330,006 A | * | 5/1982 | Eck et al. | 137/514 |
| 4,469,054 A | * | 9/1984 | Onishi et al. | 123/73 R |
| 4,606,321 A | * | 8/1986 | Gallegos del Bosque | 123/574 |
| 4,712,580 A | * | 12/1987 | Gilman et al. | 137/512.15 |
| 4,944,276 A | * | 7/1990 | House et al. | 123/520 |
| 5,472,645 A | * | 12/1995 | Rock et al. | 261/79.1 |
| 6,117,394 A | * | 9/2000 | Smith | 422/100 |
| 7,422,612 B2 | * | 9/2008 | Pietschner | 55/309 |

FOREIGN PATENT DOCUMENTS

DE 200 16 214 U1 3/2002

* cited by examiner

Primary Examiner — John Rivell
Assistant Examiner — Atif H Chaudry
(74) Attorney, Agent, or Firm — Greer, Burns & Crain, Ltd.

(57) ABSTRACT

A pneumatic pressure regulating valve, the opening of which can be automatically changed in a pressure-related manner, including a control diaphragm that is subjected to a reference pressure, to the gas pressure as well as to a governor spring, wherein a change in the differential pressure causes an adjustment of the control diaphragm and the latter itself or a closing element actuated by it changes the opening through an outflow cross-section, and wherein a structure that is arranged adjacent to the outflow cross-section on the diaphragm side forms a stop for the control diaphragm or for the closing element in the closed position of said control diaphragm. At least one preliminary stop is arranged in the pressure regulating valve such that, when the control diaphragm is moving in its closing direction, the control diaphragm or the closing element first comes into contact with the preliminary stop and that, when the control diaphragm is moving further in its closing direction, the control diaphragm or the closing element will then, while being subjected to elastic and flexible deformation or being further subjected to elastic and flexible deformation respectively, further reduces the opening and, in a final position, also comes into contact with the stop.

60 Claims, 41 Drawing Sheets

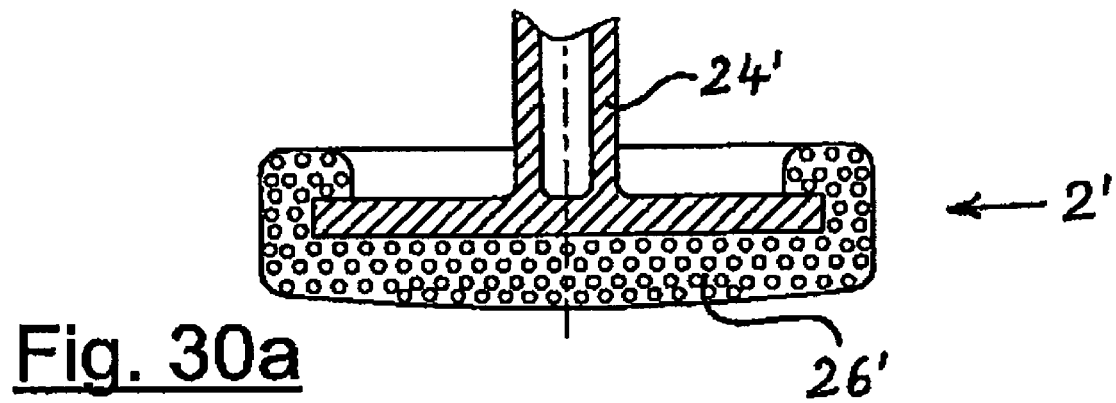
Fig. 30a
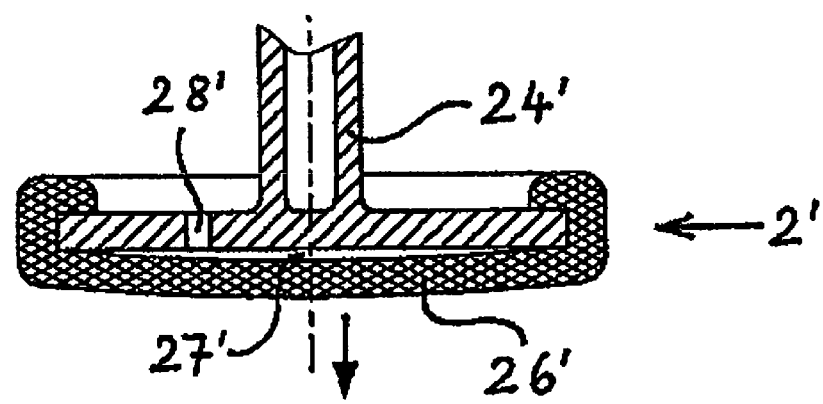
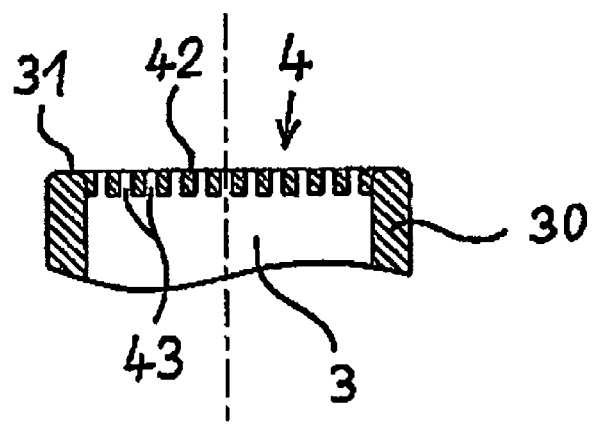
Fig. 30

PNEUMATIC PRESSURE REGULATION VALVE

BACKGROUND OF THE INVENTION

The present invention relates to a pneumatic pressure regulating valve arranged in the path of a gas line, the opening of which can be automatically changed by means of said pressure regulating valve in relation to the differential pressure between a reference pressure and one or more gas pressures applied to at least one inlet of said regulating valve, wherein a control diaphragm is provided in the pressure regulating valve, said control diaphragm being, on the one hand, subjected to the reference pressure and, on the other hand, to the gas pressure or gas pressures as well as to a governor spring, wherein a change in the differential pressure between the regions adjacent to the control diaphragm causes an adjustment of the control diaphragm and the control diaphragm itself or a closing element actuated by the control diaphragm increases or reduces the opening through an outflow cross-section of the pressure regulating valve, and wherein a structure of the pressure regulating valve that is arranged adjacent to the outflow cross-section on the diaphragm side forms a stop for the control diaphragm or for the closing element actuated by the control diaphragm in the latter's closed position.

A pneumatic pressure regulating valve designed as a throttle valve for automatically controlling the pressure in the crankcase of an internal combustion engine and comprising the elements mentioned above has been disclosed in DE 200 16 214 U1. This known throttle valve is provided such that it comprises two power elements for generating the return force acting on the control diaphragm, wherein a first power element exerts its return force on the control diaphragm over the entire travel distance of said control diaphragm, and wherein a second power element exerts its return force on the control diaphragm only over the second section of the travel distance of said control diaphragm, wherein said second section of the travel distance is the distance between a partially open position and the closed position of said control diaphragm. It is, furthermore, preferably provided that the two power elements are formed by two springs, the first of which is in permanent operable engagement with the control diaphragm and the second of which enters into operable engagement with the control diaphragm only after a first section of the travel distance of the control diaphragm has been covered in closing direction. Preferably, the two springs are helical springs of varying length.

This known throttle valve is considered to be to disadvantage in that the use of two springs requires a further spring which has to be manufactured and installed in addition. In this case, a higher number of components and increased manufacturing and assembling efforts, thus, have to be paid for the improved control characteristic achieved by means of the two power elements. What is more, this known throttle valve is to disadvantage in that the tolerances of the various components, here the springs, are adding up, with the result that the overall arrangement is more imprecise.

An alternative executive form of said known throttle valve according to DE 200 16 214 U1 provides that one power element is formed by a spring and that the other power element is the control diaphragm itself, said control diaphragm being provided with its own return force or with an integrated power element. While it is true that this prevents the requirement of a separate second spring, it has turned out that it is difficult to produce the control diaphragms which are suitable for this executive form of the valve and comprise their own exactly defined and permanently constant return force or an appropriately acting integrated power element.

A third version of this known throttle valve comprises instead of the two power elements one power element that exerts at least two different return forces and exerts a first return force on the control diaphragm over a first section of the travel distance of said control diaphragm and exerts a second higher return force on the control diaphragm over a second section of the travel distance of said control diaphragm. Theoretically, this executive form is a more elegant solution because it requires only one power element, but it has, here as well, turned out to be difficult to reproducibly manufacture such a power element and integrate it in the throttle valve, said power element having two return forces which are different in their relation to the travel distance.

SUMMARY OF THE INVENTION

Therefore, the present invention aims at creating a pneumatic pressure regulating valve of the aforementioned type, which obviates the drawbacks disclosed and which can, in particular, be used to achieve a reliable and permanently uniform function as well as a good control characteristic while, at the same time, having a simple design and which, over and above this, can provide the option of separating liquids from the gas flow passing through the pressure regulating valve.

This problem is solved by the invention by means of a pneumatic pressure regulating valve of the aforementioned type which is characterized in that at least one preliminary stop is arranged in the pressure regulating valve such that, when the control diaphragm is moving in its closing direction, the control diaphragm or the closing element actuated by the control diaphragm first comes into contact with the preliminary stop and that, when the control diaphragm is moving further in its closing direction, the control diaphragm or the closing element actuated by the control diaphragm, while being subjected to elastic and flexible deformation or being further subjected to elastic and flexible deformation respectively, further reduces the opening and, in a final position, also comes into contact with the stop.

This pressure regulating valve is to advantage in that it does not require any additional spring nor any other additional power element. Instead, it suffices to arrange at least one preliminary stop in the pressure regulating valve, said preliminary stop being associated with the control diaphragm in the way and manner mentioned. In its movements prior to any contact with the preliminary stop, the control diaphragm in the pressure regulating valve according to the invention behaves like the control diaphragm in a conventional pressure regulating valve. After the control diaphragm has come into contact with the preliminary stop, the further movement of the control diaphragm is performed subject to a different characteristic which has been caused and influenced by the preliminary stop, thereby achieving the desired improved control characteristic of the pressure regulating valve. The change of the characteristic in the adjustment of the control diaphragm depends on the properties of the control diaphragm, on the spacing between the preliminary stop and the actual stop for the final position or closed position of the control diaphragm, and on the design of the preliminary stop. By altering the properties of the control diaphragm and/or the spacing between the preliminary stop and the stop and/or the design of the preliminary stop, the control characteristic can be manipulated in a simple manner. Since any additional moving components are not required for achieving this function, the pressure regulating valve according to the invention is not subject to any additional sources of wear and tear. What is more, the integration of a preliminary stop in the pressure regulating valve requires only little additional effort, which does not result in any rise in the cost of manufacture of the pressure regulating valve and its parts. Thus, the pressure regulating valve according to the invention allows to achieve the desired enhancement of the control characteristic in a manner that is particularly simple from a technical view and, hence, also particularly cost-effective, wherein it is, at the same time, also possible to easily modify and optimize the control characteristic.

In a further embodiment, it is preferably provided that the control diaphragm is an elastomeric diaphragm and/or that the closing element is an elastomeric element or comprises an elastomeric lining. On the one hand, the use of an elastomer for the control diaphragm and/or the closing element guarantees the desired elastic and flexible properties and, on the other hand, it ensures a sensitive response and also a long service life of the pressure regulating valve.

A further embodiment provides that the preliminary stop is designed and/or retained in an elastic and flexible manner. In this executive form, the elasticity and flexibility of the control diaphragm is superimposed by an elasticity and flexibility of the preliminary stop, thereby allowing further manipulation and optimization of the control characteristic of the pressure regulating valve.

One solution, the technical requirements for which are particularly low, provides that the preliminary stop is formed by at least one pin which is arranged in, preferably concentrically to the stop. The pin can be installed in the stop, which is usually formed by a pipe connection piece, without difficulty, wherein it is possible to form said pin integrally with said stop or to insert said pin subsequently, e.g. by screwing, gluing, or welding.

As an alternative, the preliminary stop can be formed by a circle of pins arranged in a radially outward direction from, preferably concentrically to the stop. Here as well, the integration of the preliminary stop in the pressure regulating valve requires only little manufacturing efforts.

A further alternative embodiment provides that the preliminary stop is arranged in a radially outward direction from the stop and is designed in the form of a ring or ring segment, preferably concentrically to said stop.

For the purpose of a simple manufacture of the pressure regulating valve, it is, furthermore, preferably provided that the preliminary stop is connected to or formed integrally with a casing of the pressure regulating valve.

In order to ensure that the control diaphragm in the pressure regulating valve according to the invention comprises as long a service life as possible under the loads occurring, it is proposed to reinforce the control diaphragm with a diaphragm supporting body. Therein, the diaphragm supporting body is, appropriately, made of a material that is stiffer than the material of the remaining control diaphragm, in order to achieve a desired reinforcing effect in specific selectable regions of the control diaphragm.

For this purpose, a first further development provides that the diaphragm supporting body is a prefabricated component part and that the remaining control diaphragm is molded around the diaphragm supporting body. In this manner, it is ensured that the connection of the diaphragm supporting body to the remaining control diaphragm is particularly firm.

An alternative embodiment thereto provides that the diaphragm supporting body is a prefabricated component part and that it is connected, particularly buttoned or engaged to the control diaphragm on the side of the governor spring or that it is loose and pressed onto the control diaphragm by means of and on the side of the governor spring. The manufacture of this embodiment is simpler and, thus, more cost-effective.

In order to provide additional possibilities of selectively manipulating and modifying the control characteristic of the pressure regulating valve, it is furthermore proposed that one or more elements are formed to fit to or are attached to the control diaphragm side facing the stop, said elements cooperating with the preliminary stop.

In a preferred further development, the above-mentioned elements are projections formed integrally with or connected to the diaphragm supporting body. The diaphragm supporting body can be subjected to a higher mechanical load than the remaining diaphragm, so that the cooperation of the elements forming a part of the diaphragm supporting body with the preliminary stop do not have any effects on the control diaphragm that reduce the latter's service life.

An alternative measure for creating possibilities of manipulating the control characteristic of the pressure regulating valve and for preserving the control diaphragm is to design the region of the surface of the control diaphragm or the closing element that cooperates with the preliminary stop with a thickening or a lining or an insert.

In order to achieve a desired control characteristic, it may, as an alternative and instead of reinforcing or stiffening the control diaphragm in certain regions, also be reasonable to reduce the thickness or weaken the material of the control diaphragm or the closing element in that region of its surface that cooperates with the preliminary stop.

It is also possible to use the preliminary stop for manipulating the control characteristic of the pressure regulating valve in the way and manner desired. To achieve this, it is particularly provided that the preliminary stop is rounded or lenticular or spherical or conical or stepped on its front face.

In the region between the stop on the one hand and the control diaphragm or valve body on the other hand, the gas flow undergoes a relatively sharp change in its direction, in particular if the pressure regulating valve is only partially open. In order to achieve a favorable manipulation of the flow conditions in this case, one embodiment provides that the pin arranged in the stop is designed with a diminishing outside diameter, as seen in the direction of the gas flow through the stop. Herein, the contour of the pin may, for example, extend in the shape of a cone or a trumpet, so as to produce an improved flow path.

In order to avoid malfunctions of the pressure regulating valve caused by the control diaphragm adhering or sticking to the preliminary stop and/or the stop as well as to prevent premature wear and tear of the control diaphragm, a further embodiment of the pressure regulating valve proposes that the preliminary stop and/or the stop and/or the region of the surface of the control diaphragm that cooperates with the preliminary stop and/or the stop are/is provided with an anti-stick lining and/or an anti-abrasion layer.

A particularly cost-effective manufacture of the pressure regulating valve is provided by an executive form where the casing including stop and preliminary stop is a one-piece injection-molded part of plastic or a one-piece die casting of light metal. In this executive form, the casing including stop and preliminary stop can be manufactured in out-of-tool production so that the step of integrating the additional preliminary stop in the casing does not require any additional manufacturing efforts and needs only a minimum of additional plastic or light metal material.

A pressure regulating valve as has been described and illustrated above can be advantageously utilized for various applications. The pressure regulating valve according to the invention can be used to particular advantage if it is a crankcase pressure regulating valve for regulating the gas pressure in the crankcase of an internal combustion engine and if, therein, the pressure regulating valve is arranged in the path of a crankcase ventilation line. A favorable control characteristic that can be selectively manipulated and optimized is of particular importance in such a crankcase pressure regulation valve application, in order to ensure troublefree and smooth operation of an associated internal combustion engine.

The pressure regulating valve further contributes to a cost-effective manufacture in that, in a preferred embodiment, the pressure regulating valve, together with further components of the internal combustion engine, is arranged in a module that can be connected to the internal combustion engine. This also permits to achieve a particularly space-saving construction and a particularly easy assembly when the components pertaining to an internal combustion engine are attached thereto.

To this end, a practical further development preferably proposes that the further components of the module are devices for separating oil mist from the crankcase ventilation gas of the internal combustion engine and/or for filtering lubricating oil and/or fuel of the internal combustion engine. This is to advantage in that the flow paths for the crankcase ventilation gas are short with regard to oil-mist separation. Moreover, the parts having to be maintained or replaced at regular intervals, in particular filter elements, are, thus, arranged in a concentrated and easily accessible manner.

According to the invention, it is, furthermore, preferably provided that the pressure regulating valve or the module comprising the pressure regulating valve is integrated in a cylinder head cover of the internal combustion engine. In addition to the benefit of a compact construction, this is to additional advantage in that short paths are sufficient for ventilating the crankcase, thus being to advantage for the proper function of the pressure regulating valve and the internal combustion engine as a whole.

A further embodiment of the pneumatic pressure regulating valve according to the invention is characterized in that the preliminary stop is formed by at least one preliminary stop structure that is positioned in the outflow cross-section and is flat and perforated on the side of the diaphragm or closing element.

This flat and perforated structure of the preliminary stop allows to create a structure against which the control diaphragm or closing element, when moving in its closing direction, bears in an increasing manner, that is while it progressively covers the surface of said structure. As the vacuum pressure on the outflow side of the pressure regulating valve increases, the vacuum pressures on the control diaphragm projection area arranged opposite to the outflow cross-section are also high, in particular when the output mass flow rates through the pressure regulating valve are low. While the control diaphragm is increasingly bearing against the preliminary stop structure, the free forces acting in the closing direction of the control diaphragm are, accordingly, decreasing steadily. This effect is produced by the fact that the forces acting in the closing direction of the control diaphragm are directly supported against the casing of the pressure regulating valve in those regions of the control diaphragm where the latter already bears against the preliminary stop structure via said preliminary stop structure. In this manner, any undesired premature closing of the pressure regulating valve is prevented with low technical requirements. At the same time, a desired valve characteristic of the pressure regulating valve, which is largely independent of the particular vacuum pressure on the outflow side, is achieved for the pressure on the inflow side. If the pressure regulating valve is used for regulating the pressure in the crankcase of an internal combustion engine, this ensures a good ventilation of the crankcase over the entire characteristic engine map. Owing to the advantageous control characteristic of the pressure regulating valve over the entire characteristic map of the internal combustion engine, the pressure in the crankcase can be set to a value just below the atmospheric pressure; for that reason, the differential pressure that can be utilized for oil-mist separation is, at the same time, comparably higher, with the result that the separation capacity is also higher. When having the same dimensions as a conventional pressure regulating valve, the pressure regulating valve according to the invention has a clearly better characteristic curve. Alternatively, the pressure regulating valve can be reduced in size, with the result that the characteristic curve of the valve is still of the same quality as that of a larger conventional pressure regulating valve. This is also to advantage in that proven component parts, in particular the diaphragm, can still be used when the physical size is maintained.

In order to simplify the manufacture of the pressure regulating valve and to save assembly steps, a further development of the pressure regulating valve provides that the preliminary stop structure is formed integrally with the structure of the pressure regulating valve that forms the stop.

As an alternative, it is proposed that the preliminary stop structure is designed in the form of one or more component parts and is connected to the structure of the pressure regulating valve that forms the stop. Although this executive form requires a little more assembly steps, the freedom with regard to design and material selection for the preliminary stop structure is considerably higher.

It is, furthermore, preferably provided that the control diaphragm or the closing element actuated by the control diaphragm has a convex shape on its side facing the preliminary stop structure or can be deformed to be convex when a differential pressure is applied. The convex shape ensures that the control diaphragm or the closing element initially bears against the preliminary stop structure in its central region, while the control diaphragm or the closing element moves in the closing direction of the pressure regulating valve. While the control diaphragm or the closing element further moves in said closing direction, the surface bearing against the preliminary stop structure steadily increases in size, wherein said surface is increased from within outward, as seen in radial direction. The control diaphragm or the closing element may comprise the convex shape as a permanently given shape; as an alternative, it is also possible for the desired convex shape to develop only if the appropriate pressure conditions are existing, before the control diaphragm or the closing element reaches its first abutment against the preliminary stop structure.

Since, in the pressure regulating valve according to the invention, a flexibility of the control diaphragm is not only not disturbing, but even advantageous, the control diaphragm is preferably an elastomeric diaphragm, which is free from any supporting body at least in its region cooperating with the preliminary stop structure. Such a diaphragm is, in addition, to advantage in that it can be manufactured easily if a supporting body does not exist.

In a further embodiment, it is provided that the preliminary stop structure is flat on its side facing the control diaphragm or the closing element. In this executive form, the preliminary stop structure is particularly simple in its geometry. In association with a convexly shaped surface of the control diaphragm or closing element, however, a flat preliminary stop structure also allows to achieve the desired effect of a steadily increasing abutment of the control diaphragm or the closing element to the preliminary stop structure when the valve is adjusted in its closing direction.

As an alternative, it is also possible that the preliminary stop structure is convex on its side facing the control diaphragm or the closing element. In this convex design of the stop structure, the desired effect described above is achieved even in cooperation with a flat surface of the control diaphragm or closing element. The convex preliminary stop structure can also cooperate with a convex surface of the control diaphragm or closing element. By selecting the designs and by means of the measure of the convexity as well as the thickness or the flexibility of the diaphragm in the region facing the preliminary stop, the valve characteristic can be manipulated and optimized within a wide range and in the manner desired.

A further advantageous embodiment of the pressure regulating valve according to the invention provides that the preliminary stop structure extends into the structure forming the stop in axial direction of said structure. In axial direction of the structure forming the stop for the closed position of the valve, the preliminary stop structure, hence, forms flow paths which are, in essence, extending perpendicularly to the surface of the preliminary stop structure. Particularly when the pressure regulating valve is partially closed, that is when the control diaphragm is positioned very closely to the preliminary stop structure or is already partially bearing against the preliminary stop structure or when the closing element is positioned appropriately, the gas flow, on entering into the breakthroughs of the preliminary stop structure, undergoes a very sharp change in direction. In association with a high gas flow rate, which is inevitably developing because of the reduced flow cross-section, this redirection results in a centrifugal separation of liquid droplets carried along in the flow, for example oil droplets forming an oil mist carried along in the gas flow. Since the preliminary stop structure extends into the structure forming the stop in axial direction, there is a high probability that liquid droplets carried along in the gas flow impinge and settle on one of the surfaces delimiting the preliminary stop structure. If the pressure regulating valve is accordingly arranged and aligned in space, the fluid settled in the preliminary stop structure can be discharged in the direction of the outlet by virtue of gravity and/or due to the effect of the gas flow. Downstream of the preliminary stop structure, as seen in flow direction, the cleaned gas can then be discharged from the pressure regulating valve by an appropriate flow path, independently of the separated fluid. If the preliminary stop structure is designed appropriately, it is possible to achieve separation efficiencies which correspond to the separation efficiencies of conventional independent liquid separators for gas flows to an approximate or even a very large extent.

This is, moreover, to advantage in that, by combining pressure regulation with oil-mist separation and by adjusting the gap between the diaphragm and the preliminary stop, the highest possible gas velocities can be reached largely independently of the extent of the gas volume flow of oil-mist separation.

In order to achieve a distinct liquid separation from the gas flow inside the pressure regulating valve, the length of the axial extension of the preliminary stop structure preferably amounts to at least 25 percent of a clear inside diameter of the structure forming the stop.

In order to achieve a particularly high efficiency in the separation of liquid droplets from the gas flow, it is, furthermore, preferably provided that the length of the axial extension of the preliminary stop structure amounts to 50 percent up to more than 100 percent of the clear inside diameter of the structure.

The fact that the breakthroughs in the preliminary stop structure each preferably comprise an axial length that is great in relation to the respective clear diameter of the breakthroughs further contributes to achieving a high separation efficiency.

In a further embodiment, it is proposed that the breakthroughs in the preliminary stop structure each comprise an axial length that is at least five times as great as the clear diameter of the particular breakthroughs.

If a particularly high separation efficiency is aimed at, it is preferably provided that the breakthroughs in the preliminary stop structure each comprise an axial length that is ten to twenty times as great as the clear diameter of the particular breakthroughs. With such ratios of length to diameter, it is, with a high probability, ensured that the liquid droplets carried along in the gas flow cannot run through the preliminary stop structure without settling on one of the surfaces of the preliminary stop structure.

A further increase in separation can be achieved if the breakthroughs in the preliminary stop structure do not extend linearly in their axial direction, but if the duct extends such that the outlet opening comprises an offset as compared with the inlet opening.

In order to ensure that, on the one hand, the preliminary stop structure does not reduce the flow cross-section through the pressure regulating valve to an impermissible degree and that, on the other hand, the preliminary stop structure can be manufactured with an appropriate mechanical stability and the diaphragm is not damaged by repeatedly contacting the preliminary stop structure, it is preferably provided that the breakthroughs in the preliminary stop structure comprise an overall surface ranging from 20 percent to 80 percent of the overall surface of the structure forming the stop.

The pressure regulating valve according to the invention allows a high degree of freedom with regard to the design of the structure forming the stop and the preliminary stop structure provided therein. The structure forming the stop and the preliminary stop structure provided therein preferably have a circular, elliptical, oval, ovoid, or polygonal outer contour outline. By varying and appropriately selecting the contour outline, the behavior of the pressure regulating valve can be changed, whereby it is possible to manipulate the valve characteristic in the manner desired.

The preliminary stop structure as such can also be designed in manifold ways with regard to its form. A first preferred executive form provides that the preliminary stop structure has the form of a lattice of flat and plane walls that are intersecting each other or of radial and concentric walls that are intersecting each other. Owing to the intersecting walls, the preliminary stop valve has a particularly high mechanical stability, thus even allowing mobile applications, for example on an internal combustion engine of a motor vehicle, without any damage.

In an alternative embodiment, it is proposed that the preliminary stop structure has the form of a grating of flat and plane walls extending in parallel to each other or of walls extending concentrically to each other. This embodiment is to advantage in that the walls occupy a smaller cross-sectional area and a smaller volume within the preliminary stop structure, thus providing as large a flow cross-section as possible with given dimensions of the structure forming the stop.

A particularly large free flow cross-section with given dimensions of the structure forming the stop is achieved if, according to a further embodiment, the preliminary stop structure has the form of a corrugated, layered or wound honeycomb. Honeycombs are, for example, known as such from catalyst technology where large flow cross-sections are required in connection with large surfaces; this design is also of benefit to the effective liquid separation in the preliminary stop structure desired in the present invention.

A further possible design to be mentioned provides that the preliminary stop structure can have the form of a bed of a plurality of parallel longitudinal pins or segments that are spaced apart from each other and the free ends of which are facing the control diaphragm or the closing element. With this embodiment, it can also be ensured that more than 50 percent of the cross-section of the preliminary stop structure is available for the gas flow. At the same time, however, the desired flat design in the region of the free ends of the pins or segments is preserved in order to allow the control diaphragm or the closing element to bear against the surface of the preliminary stop structure in a steadily progressive manner.

The freedom of designing the cross-section of the breakthroughs in the preliminary stop structure is also very wide-ranging preferably, the breakthroughs each have a cross-section that is circular, elliptical, oval, polygonal or slotted or have the shape of a circular sector or circular-ring sector.

A further embodiment of the pressure regulating valve provides that the breakthroughs in the preliminary stop structure all have the same cross-section.

As an alternative, the breakthroughs in the preliminary stop structure can comprise at least two different cross-sections. This creates a further possibility of manipulating the control characteristic and the valve characteristic.

To achieve this, a physical further development proposes that the breakthroughs in the preliminary stop structure are greater on their inside and smaller on their outside, as seen in the radial direction of said breakthroughs. This embodiment is to particular advantage in that, especially with a particularly small opening cross-section, that is when the control diaphragm or the closing element is positioned near its closed position, the pressure is still regulated in a sensitive manner.

If it is not the control diaphragm itself that cooperates with the preliminary stop and the stop within the pressure regulating valve, but the closing element actuated by said control diaphragm, it is appropriate that the closing element carries on its side facing the preliminary stop structure a lining that is elastic and flexible and/or compressible in axial direction. By using this lining, the remaining parts of the closing element can be made of a stable and rigid material, so that said closing element can transfer the movements performed by the control diaphragm without any falsification.

In order to prevent the liquid separated from the gas flow in the pressure regulating valve from re-entering into the gas flow carried away from the pressure regulating valve in an undesired manner, it is appropriately provided that the pressure regulating valve is designed with a liquid collection chamber on its outlet side, wherein at least the liquid separated from the gas flow flowing through the pressure regulating valve at the preliminary stop structure can be collected in a liquid collection region.

By arranging internal attachments, such as partition walls or flow guide walls, in the liquid collection region, any formation of waves or so-called splashing of the liquid separated, caused by the accelerations acting on the liquid column, can be suppressed preferably, these walls can be designed in the form of a lattice or arranged concentrically and comprise a cross-section having the shape of a circle or circle segment.

Furthermore, staggered breakthroughs allowing a uniform distribution of the liquid in the liquid collection region can be provided in the partition walls. As an alternative, open-cellular spongy structures can be used there.

In order to be able to separate liquid from the gas flow within the pressure regulating valve, in addition or as an alternative to the liquid separation in the preliminary stop structure, a further embodiment of the pressure regulating valve provides that the liquid collection chamber is designed as a vortex chamber that is circular in cross-section and that forms a separator in which liquid droplets still contained in the gas flow through the pressure regulating valve downstream of the preliminary stop structure can be separated from said gas flow by centrifugal force.

A further embodiment in respect thereto provides that the part of the liquid collection chamber that is at the top when the latter is in its installation position is designed as a cyclone with a tangential gas inlet, with a cleaned-gas outlet outgoing towards the top both centrally and axially, and with a liquid outlet going down and ending in the liquid collection region positioned underneath the cyclone. In this embodiment of the pressure regulating valve, a cyclone separator is integrated therein, said cyclone separator ensuring an effective separation or subsequent separation of liquid, particularly in the form of fine droplets, from the gas flow.

As has been mentioned above, the liquid separated is preferably collected in a liquid collection region. From there, the collected liquid can be disposed as required according to the volume collected, for example in the course of regular maintenance measures.

As an alternative, the liquid collection region can be connected to a liquid discharge line or liquid return line via a valve, preferably via a check valve that is controlled by differential pressure, such as a reed valve. This solution permits to automatically drain the fluid collection region, which is performed whenever the existing pressure conditions are suitable for draining. If, for example, the pressure regulating valve is used as a crankcase pressure regulating valve on an internal combustion engine, the liquid collection region, which will then be an oil collection region, can be drained whenever the associated internal combustion engine is at standstill, wherein the collected oil is, appropriately, passed into the oil pan of the internal combustion engine.

In order to ensure reliable operation of the pressure regulating valve even at low ambient temperatures, it is furthermore proposed that the preliminary stop structure and/or the control diaphragm or the closing element is provided with a heating device. The heating device can be used to ensure that the preliminary stop structure and/or the control diaphragm or the closing element always comprise(s) such a high temperature that liquid particles from the gas flow cannot freeze thereto and that, thus, any freezing of the pressure regulation valve resulting therefrom is prevented as a whole.

A further measure for ensuring reliable operation of the pressure regulating valve is to arrange a preseparator, preferably an impingement separator or a prescreen, capturing coarse oil droplets and/or contaminants from the gas flow, upstream of the preliminary stop structure as seen in the direction of the gas flow. The prescreen ensures that coarse contaminants which would be able to block the breakthroughs in the preliminary stop structure are prevented from arriving there, but are captured beforehand instead. The impingement separator allows to separate large-size oil droplets with little effort, so that said oil droplets do not affect proper functioning of the downstream components.

Furthermore, it can be provided that the gas inlet in the lower chamber of the pressure regulating valve is arranged tangentially, so that the inflowing gas is caused to rotate. On entry into the breakthroughs of the preliminary stop structure, the translational and rotational movements of the gas and the oil droplets entrained therein superimpose each other, thus increasing the probability that an oil droplet is separated in the breakthroughs.

BRIEF DESCRIPTION OF THE DRAWINGS

Below, exemplary embodiments of the pressure regulating valve according to the invention will be illustrated by means of a drawing, in which:

FIG. 28b is a top view of the outflow cross-section and the preliminary stop according to FIG. 28a;

FIG. 29b is a top view of the outflow cross-section and the preliminary stop of FIG. 29a;

FIG. 30 is a longitudinal sectional view of a closing element together with a section of an outflow cross-section with a preliminary stop;

FIG. 30a is a longitudinal sectional view of a closing element that is modified as compared with FIG. 30;

FIG. 31b is a cross-sectional view of the pressure regulating valve together with the liquid collection chamber of FIG. 31a;

FIG. 32a is a longitudinal sectional view of a further pressure regulating valve with a liquid collection chamber;

FIG. 32b is a cross-sectional view of the pressure regulating valve with the liquid collection chamber of FIG. 32a;

DETAILED DESCRIPTION OF THE PREFERRED EMBODIMENTS

Figure 1:
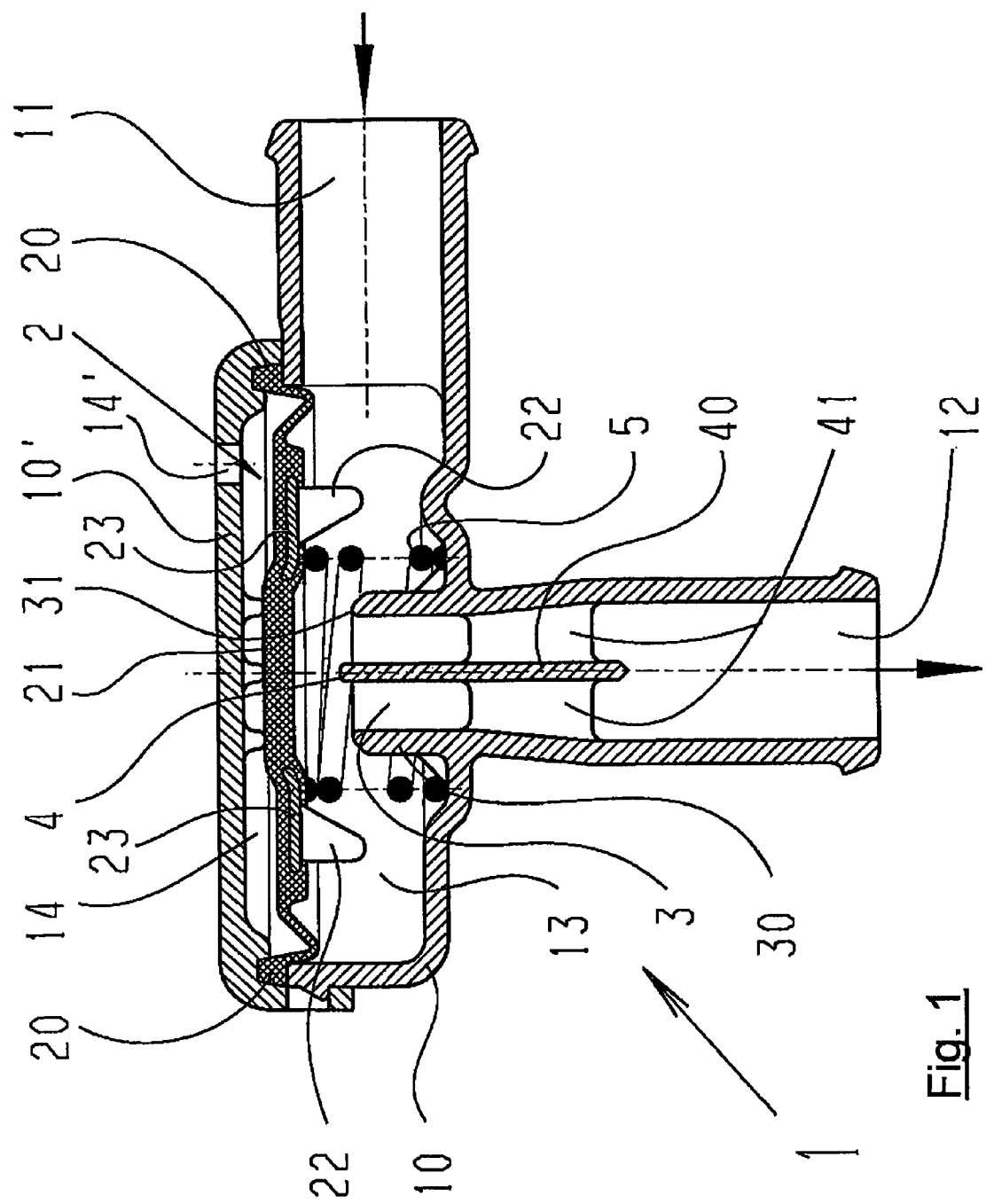
FIG. 1 is a cross-sectional view of a pressure regulating valve in a first embodiment, in its open state.

FIG. 1 is a cross-sectional view of a pressure regulating valve 1. The valve 1 comprises a casing 10 that is closed with a cover 10' on its upper side. A control diaphragm 2 subdividing the inner region of the casing 10 in a lower chamber 13 and an upper chamber 14 is fixed between the casing 10 and the cover 10'. The upper chamber 14 is connected to the atmosphere via a hole 14' in the cover 10', said hole 14' having a matched cross-section.

The lower chamber 13 is connected to a gas inlet 11 in the form of a lateral pipe connection piece. For example, the gas inlet 11 can be connected to the crankcase ventilation line of an associated internal combustion engine (not shown).

Furthermore, the lower chamber 14 is connected to a gas outlet 12 which, in the illustrated instance, points down and also has the form of a pipe connection piece. For example, the gas outlet 12 can be connected to the intake section of an associated internal combustion engine.

With its upper part, the gas outlet 12 projects into the interior region of the lower chamber 13, where it forms an outflow cross-section 3 in the form of a short pipe connection piece 30. The upward pointing front face of the pipe connection piece 30 forms a stop 31 for the control diaphragm 2 as the latter moves down, that is toward the pipe connection piece 30.

A governor spring 5, here in the form of a helical compression spring, is arranged between a lower region of the casing 10 and the bottom side of the control diaphragm 2, said lower region surrounding the pipe connection piece 30. Said spring 5 subjects the control diaphragm to a preloading force acting in upward direction, that is in the opening direction of the pressure regulating valve 1.

In its major part, the diaphragm 2 consists of an elastomeric body in which, here, a diaphragm supporting body 23 is inserted. Said diaphragm supporting body 23 is, on the one hand, provided for stiffening the diaphragm 2 in the diaphragm region subjected to the governor spring 5. On the other hand, the diaphragm supporting body 23 comprises a plurality of projections that are protruding from the bottom side of the diaphragm 2 in downward direction and serve to guide and center the governor spring 5 in relation to the diaphragm 2.

In this pressure regulating valve 1, a pin 40 is furthermore arranged in the pipe connection piece 30 concentrically thereto, wherein said pin 40 is connected to or formed integrally with the internal perimeter of the pipe connection piece 30 via a plurality of connection blades 41 extending in radial direction. The upper end of the pin 40 forms a preliminary stop 4 that protrudes in an upward direction beyond the stop 31 that is formed at the upper end of the pipe connection piece 30.

FIG. 1 shows the pressure regulating valve 1 in its completely open position. In this position, the maximum outflow cross-section 3 through the pipe connection piece 30 is available for the gas, for example the crankcase ventilation gas, flowing through the pressure regulating valve 1. The pressure regulating valve 1 enters this state if the vacuum pressure present in the lower chamber 13 is relatively low. In this state, the control diaphragm 2 is retained in its upper position, as shown in FIG. 1, by the governor spring 5.

Figure 2:
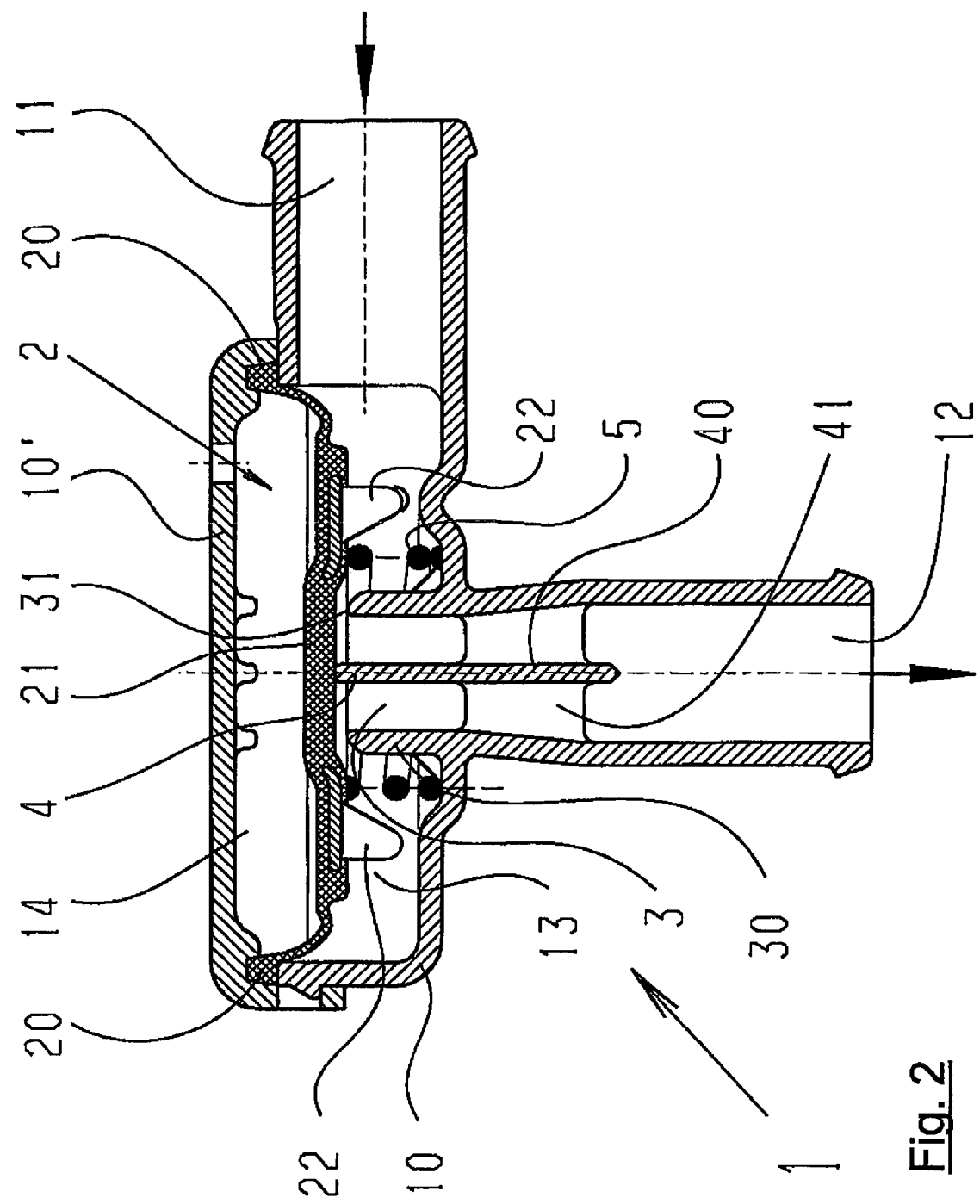
FIG. 2 shows the pressure regulating valve of FIG. 1 in a partially closed state.

FIG. 2 shows the pressure regulating valve 1 of FIG. 1, now in a partially closed position. Owing to a higher vacuum pressure in the lower chamber 13, which is caused by the differential pressure between the two chambers 13, 14, the control diaphragm 2 is, in this state, displaced by a certain distance in downward direction, here to that point where the bottom side of the diaphragm 2 bears against the preliminary stop 4. Therein, the diaphragm 2 is deformed in an elastic and flexible manner, in particular in its radially outward marginal region, wherein said diaphragm 2 is, at its fixing edge 20, retained between the casing 10 and the cover 10' in a sealing manner.

Figure 3:
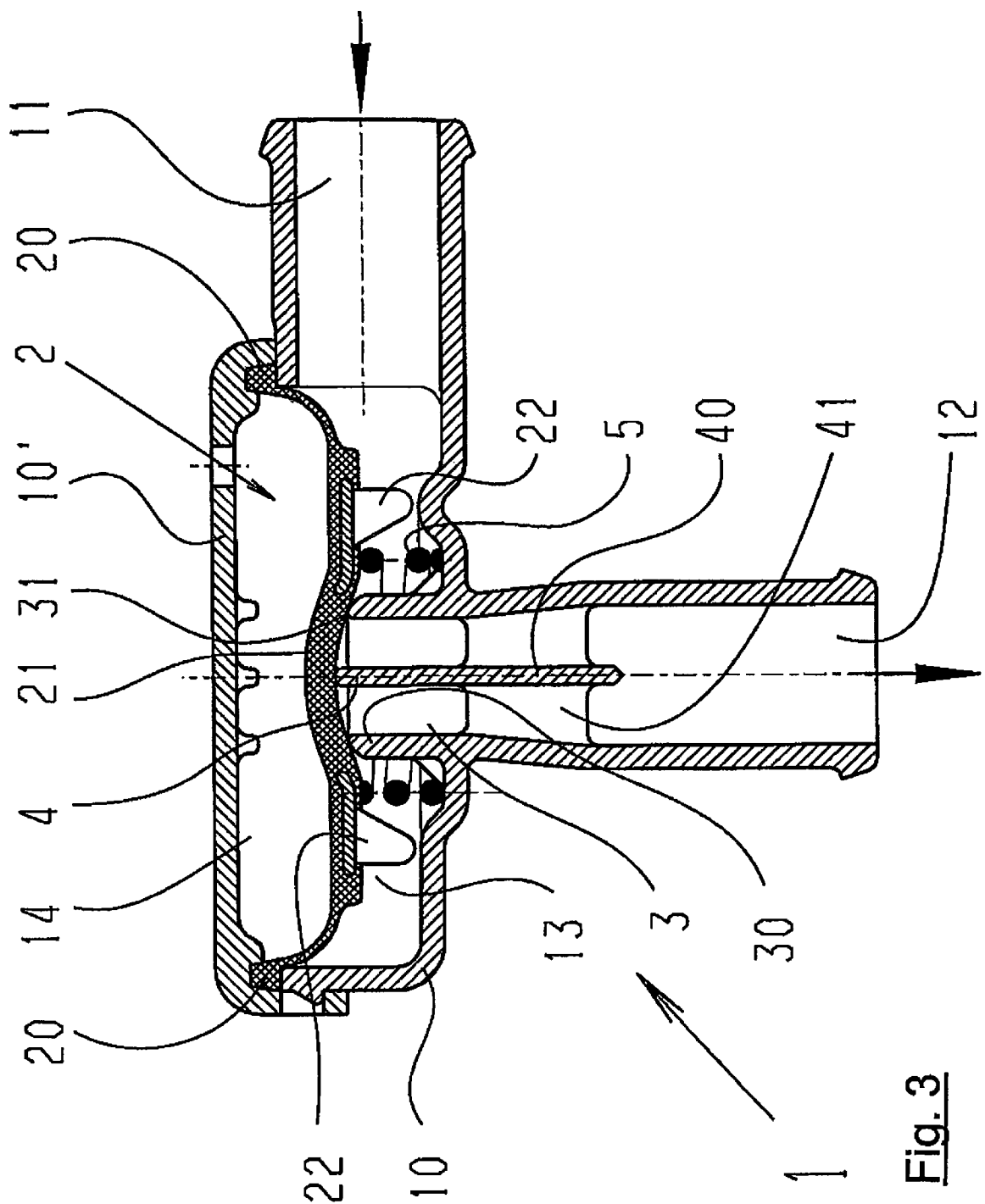
FIG. 3 shows the pressure regulating valve of FIG. 1 and FIG. 2 in its completely closed state.

FIG. 3 shows the pressure regulating valve 1 of FIG. 1 and FIG. 2 in a completely closed state. This state is achieved once the vacuum pressure present in the lower chamber 13 has increased further. The pressure regulating valve 1 can only reach its closed position, if, owing to the differential pressure between the lower and upper chambers 13, 14, the control diaphragm 2 is also deforming in its central region 21, again in an elastic and flexible manner, until it has assumed the shape shown in FIG. 3. In this state, the bottom side of the diaphragm 2 bears not only against the preliminary stop 4, but also against the stop 31. As a result, the outflow cross-section 3 is now completely closed.

In order to move the pressure regulating valve 1 from the state according to FIG. 2 to its state according to FIG. 3, the control diaphragm's 2 own return force, which is necessary to ensure that the diaphragm changes its shape from that shown in FIG. 2 to that shown in FIG. 3, must be overcome in addition to and at the same time with the force of the governor spring 5. With the vacuum pressure in the lower chamber 13 increasing and rising, this allows the pressure regulating valve to achieve a spring characteristic that is stronger than that at the beginning of the adjusting movement of the diaphragm 2 where the latter is only subjected to the governor spring 5. As a result, any premature complete closing of the pressure regulating valve 1, which is undesired in many applications, can, in particular, be prevented without requiring, for example, a second governor spring.

Figure 4:
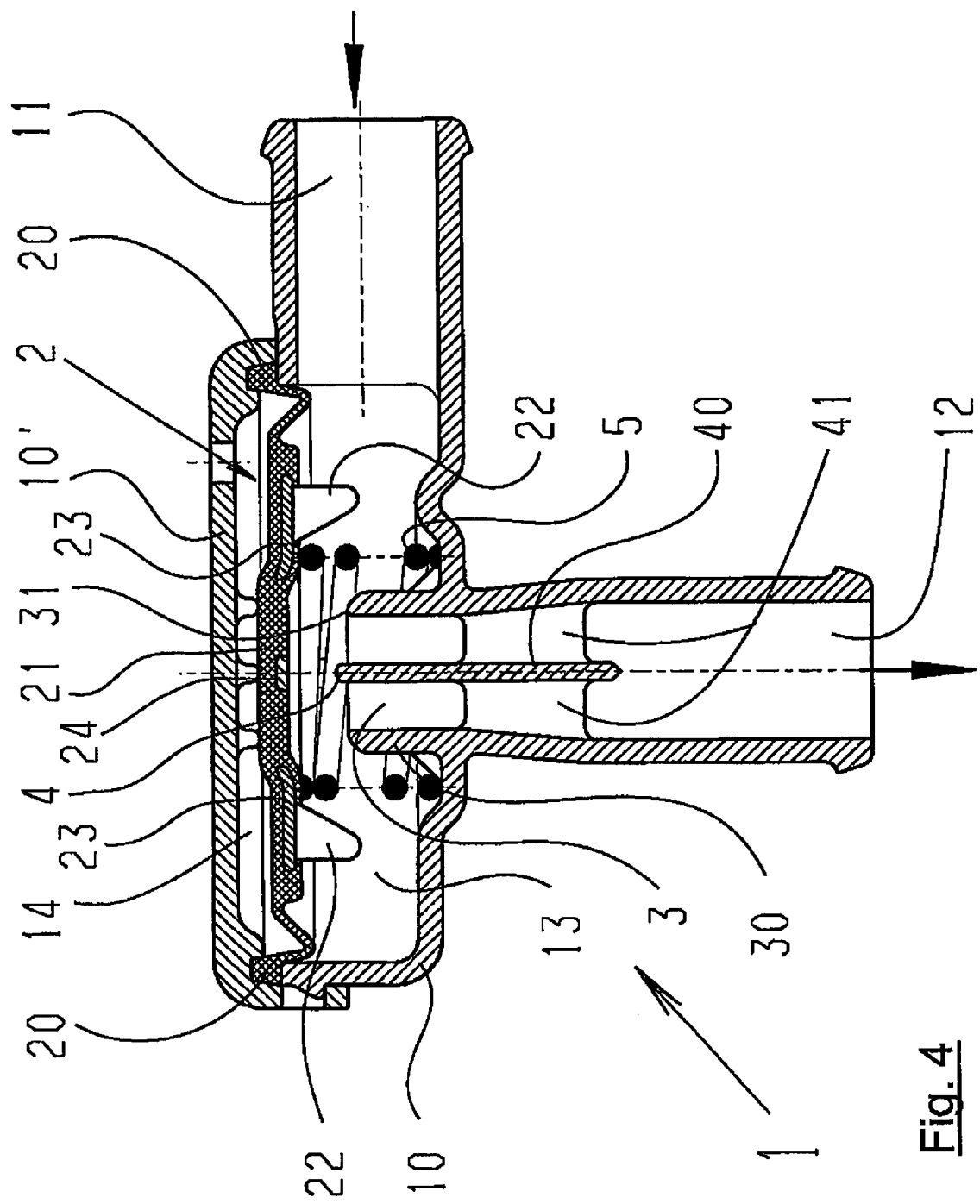
FIG. 4 shows the pressure regulating valve in a second embodiment, in its open state.

FIG. 4 shows a second version of the pressure regulating valve 1; this version corresponds to the executive form of the pressure regulating valve 1 according to FIGS. 1 to 3 in many parts. In contrast thereto, the pressure regulating valve 1 according to FIG. 4, however, is provided with an insert 24 that is arranged centrally in the central region 21 on the bottom side of the diaphragm 2, said insert 24 consisting of a material that is stronger and has a higher resistance to wear than the elastomeric material of which the remaining diaphragm 2 consists predominantly.

Figure 5:
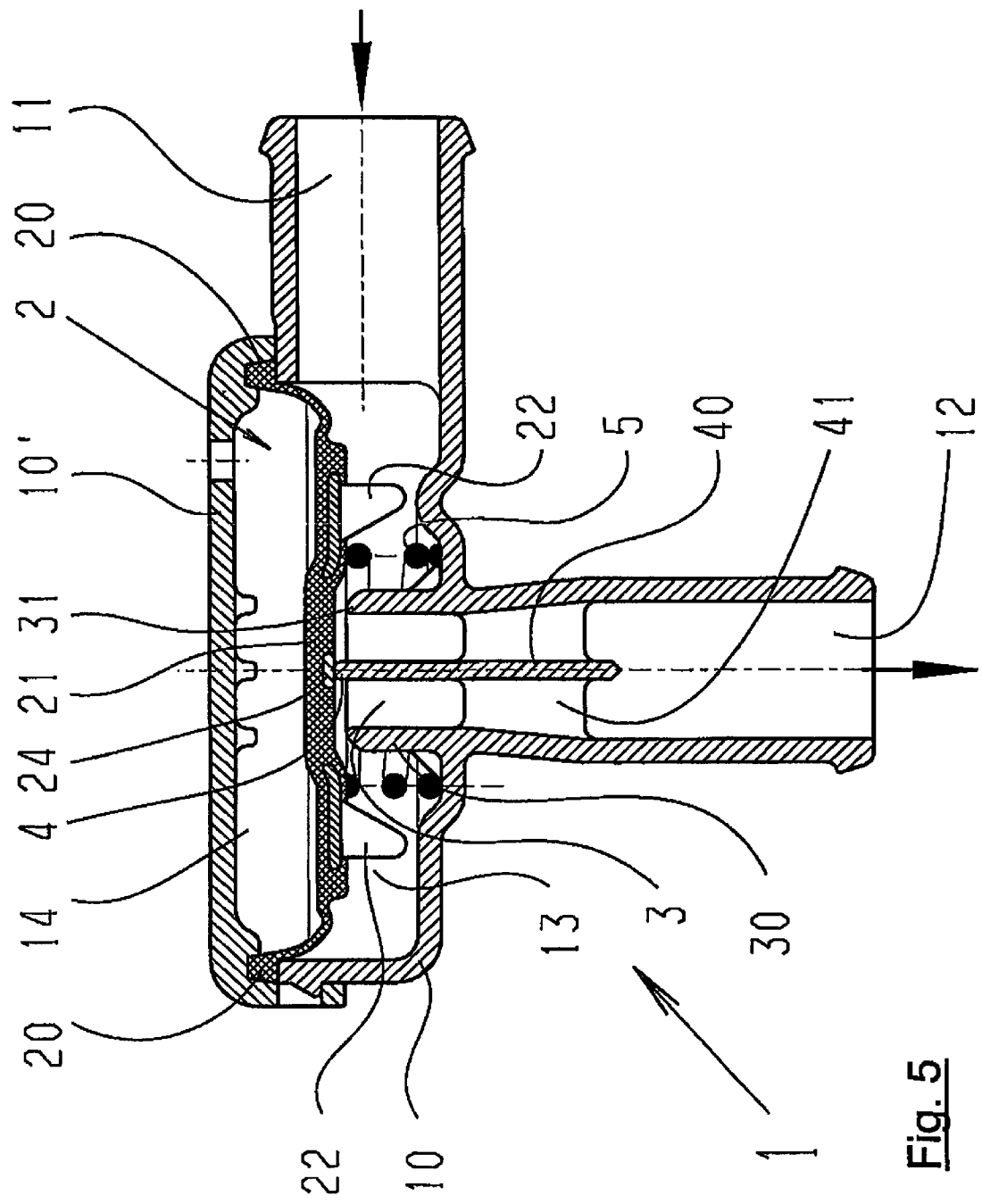
FIG. 5 shows the pressure regulating valve of FIG. 4 in a partially closed state.

FIG. 5 shows the pressure regulating valve 1 of FIG. 4, now in a partially closed state. In this state, the control diaphragm 2 has moved down to a point where the insert 24 at the bottom side of the diaphragm 2 bears against the preliminary stop 4 at the upper end of the pin 40. Herein, the insert 24 ensures that the preliminary stop 4 does not cause any mechanical damage to the diaphragm 2 even in case of prolonged operating times.

Figure 6:
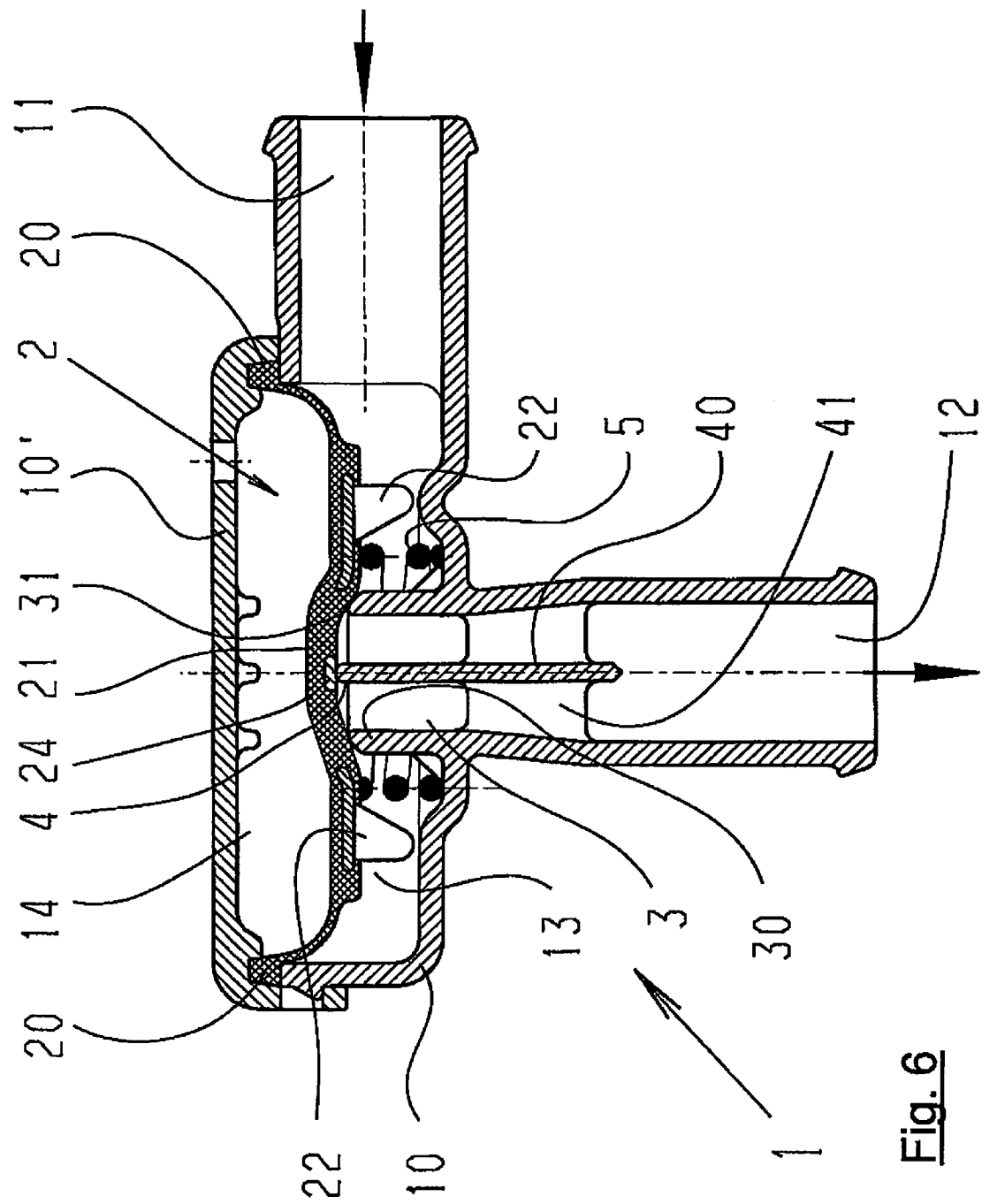
FIG. 6 shows the pressure regulating valve of FIG. 4 and FIG. 5 in its completely closed state.

FIG. 6 shows the pressure regulating valve 1 of FIG. 4 and FIG. 5, now in its completely closed state. In its central region 21, the diaphragm 2 still bears against the preliminary stop 4 with its insert 24. In a radially outward direction from this insert 24, the central region 21 of the diaphragm 2 has moved down while being further deformed in an elastic and flexible manner, now also bearing against the stop 31 at the upper end of the pipe connection piece 30. Thus, the outflow cross-section 3 is now completely closed.

In its remaining parts, the pressure regulating valve 1 according to FIGS. 4 to 6 corresponds to the pressure regulating valve 1 according to FIGS. 1 to 3, for which reason reference is made to the description of FIGS. 1 to 3, as regards the further component parts of the pressure regulating valve 1 according to FIGS. 4 to 6.

Figure 6A:
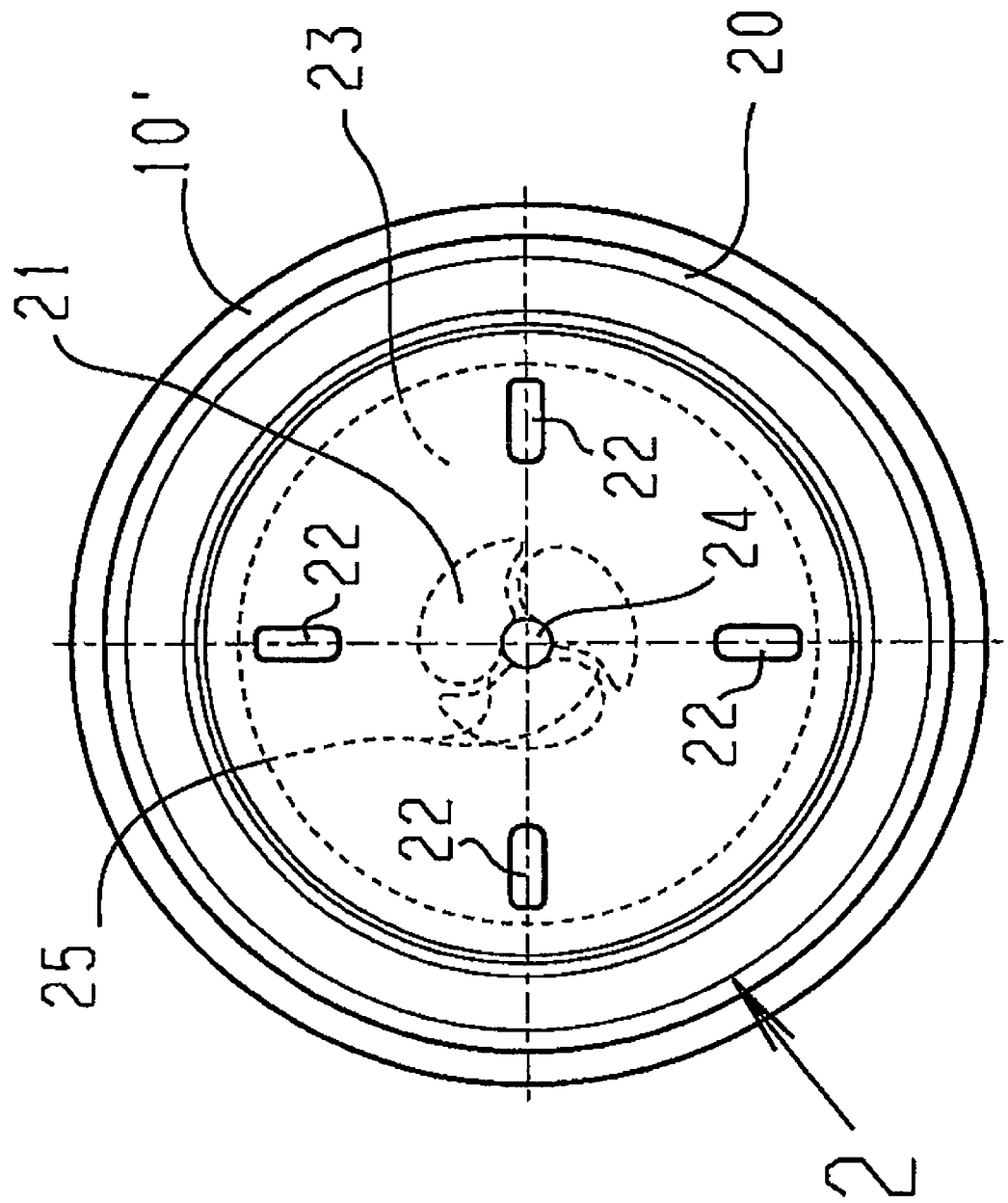
FIG. 6a is a bottom view of a diaphragm of the pressure regulating valve according to FIGS. 4 to 6.

FIG. 6a is a bottom view of the control diaphragm 2 of the pressure regulating valve 1 of FIGS. 4 to 6. The fixing edge 20 of the diaphragm 2 is visible in outermost radial direction. The insert 24 that cooperates with the preliminary stop 4 is positioned in the center of the diaphragm 2. The central region 21 of the diaphragm 2 is arranged around the insert 24. The projections 22, here a total of four, that serve to guide and center the governor spring 5 in relation to the diaphragm 2 and are pointing in a downward direction, that is towards the viewer, can be seen in an even further radially outward direction.

The dashed lines in FIG. 6a represent the diaphragm supporting body 23 which is embedded in the elastomeric material of the diaphragm 2. Therein, the projections 22 and the insert 24 are integral parts of the diaphragm supporting body 23 and designed in one piece therewith. Therein, the insert 24 is in communication with the remaining diaphragm supporting body 23 via connection webs 25 that are extending along a curved path. This ensures an appropriate elasticity and flexibility of the central region 21 of the diaphragm 2, said elasticity and flexibility being necessary for proper functioning of the pressure regulating valve 1.

Figure 7:
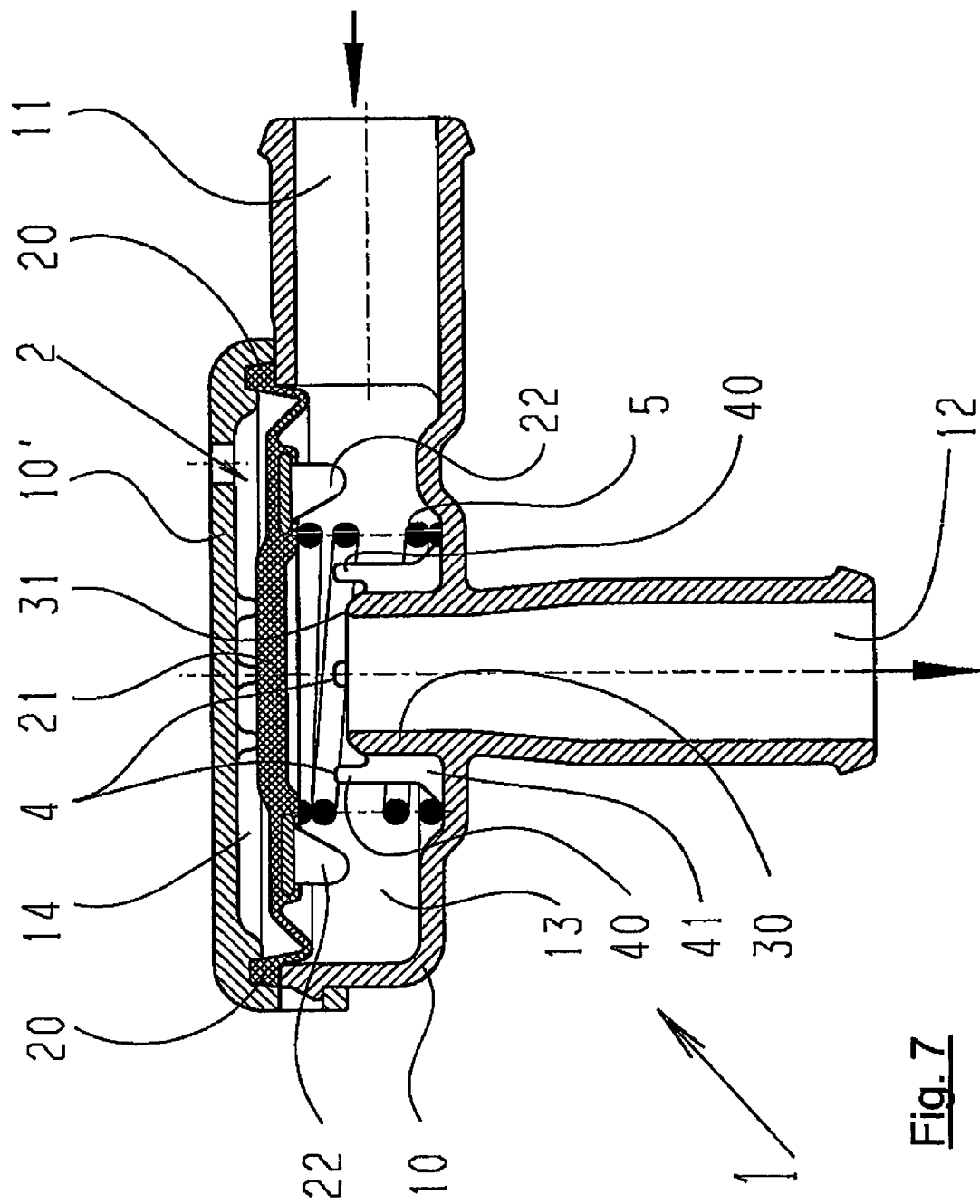
FIG. 7 shows the pressure regulating valve in a third embodiment, in its open state.
Figure 8:
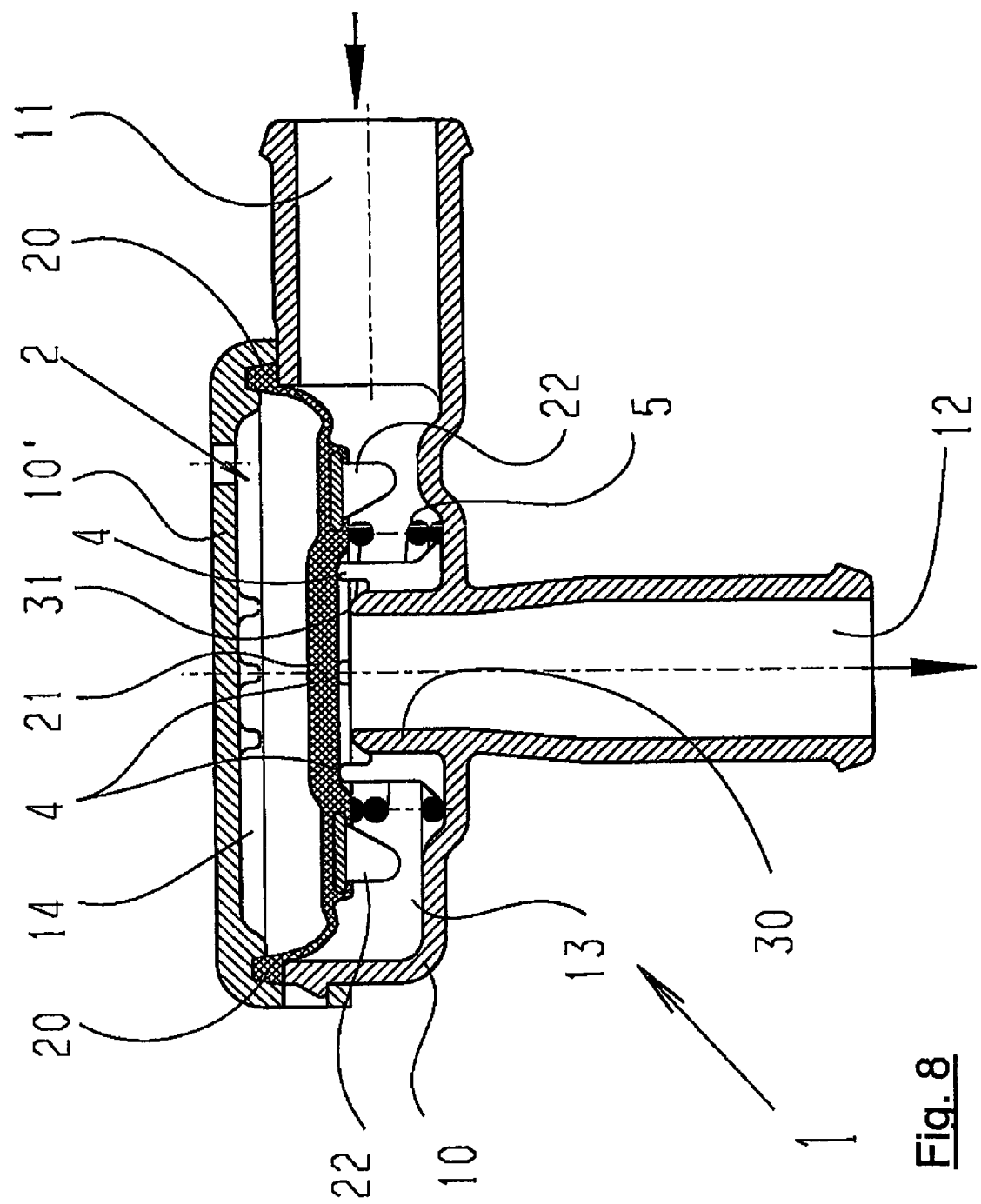
FIG. 8 shows the pressure regulating valve of FIG. 7 in a partially closed state.
Figure 9:
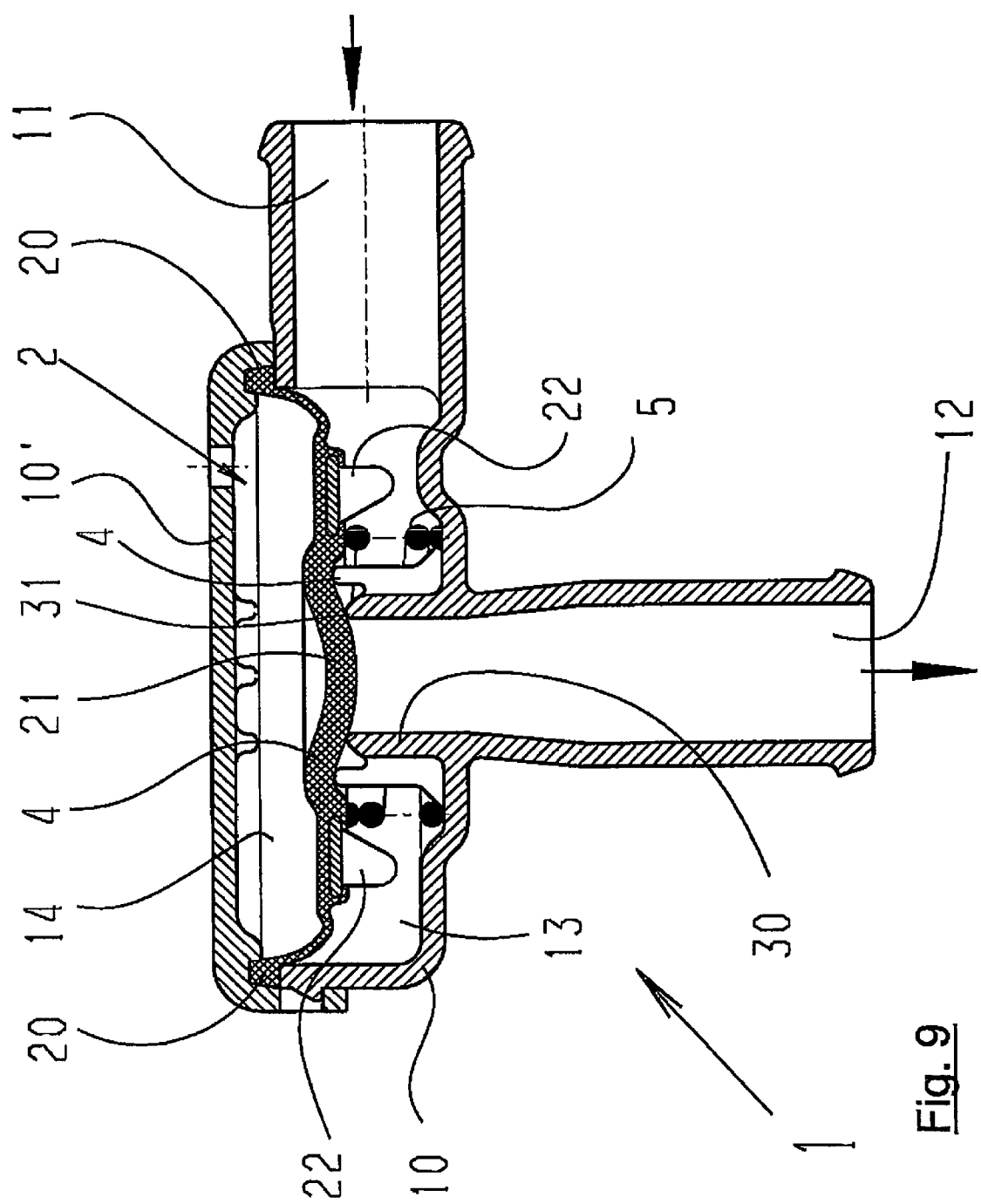
FIG. 9 shows the pressure regulating valve of FIG. 7 and FIG. 8 in its completely closed state.

A third version of the pressure regulating valve 1 is shown in FIGS. 7, 8 and 9 in the "open", "partially closed" and "closed" states. This version of the pressure regulating valve 1 is different from the two versions of the pressure regulating valve 1 described above in that the preliminary stop 4 is now displaced out of the pipe connection piece 30 and into a position arranged in a radially outward direction from the pipe connection piece 30. In the illustrated instance, the preliminary stop is formed by a total of four pins 40 which are uniformly spaced apart from each other and are arranged around the upper end of the pipe connection piece 30 and are integrally formed with the casing 10 via connection blades 41. Here as well, the upper ends of the pins 40 jointly forming the preliminary stop 4 project beyond the upper front end of the pipe connection piece 30, said upper front end forming the stop 31.

In the open state of the pressure regulating valve 1 shown in FIG. 7, the diaphragm 2 is at its upper end position and has, at its bottom side, lifted off from both the preliminary stop 4 and the stop 31. This provides the maximum possible flow cross-section through the pressure regulating valve 1.

In the partially closed position of the pressure regulating valve 1 shown in FIG. 8, the diaphragm 2 is displaced in downward direction and now bears against the preliminary stop 4 at its bottom side. Now, the available flow cross-section through the pressure regulating valve 1 is reduced.

In FIG. 9, the control diaphragm 2 has moved further in downward direction so that, now, the bottom side of the diaphragm 2 bears not only against the preliminary stop 4 but, at the same time, also against the stop 31. As is clearly illustrated in FIG. 9, this requires an elastic and flexible deformation of the central region 21 of the diaphragm 2. Hence, this shows that, in order to achieve a further adjustment of the diaphragm 2 from a position where it only bears against the preliminary stop 4 to a position where the bottom side of the diaphragm 2 also bears against the stop 31, an additional adjusting force or an adjusting force that is different from that having to be exerted for the first part of the travel distance of the control diaphragm 2 must be exerted.

In its function and also in its remaining component parts, the pressure regulating according to FIGS. 7 to 9 corresponds to the versions described above, while reference to the above description is made with regard to the further component parts of the pressure regulating valve 1 according to FIGS. 7 to 9.

Figure 10:
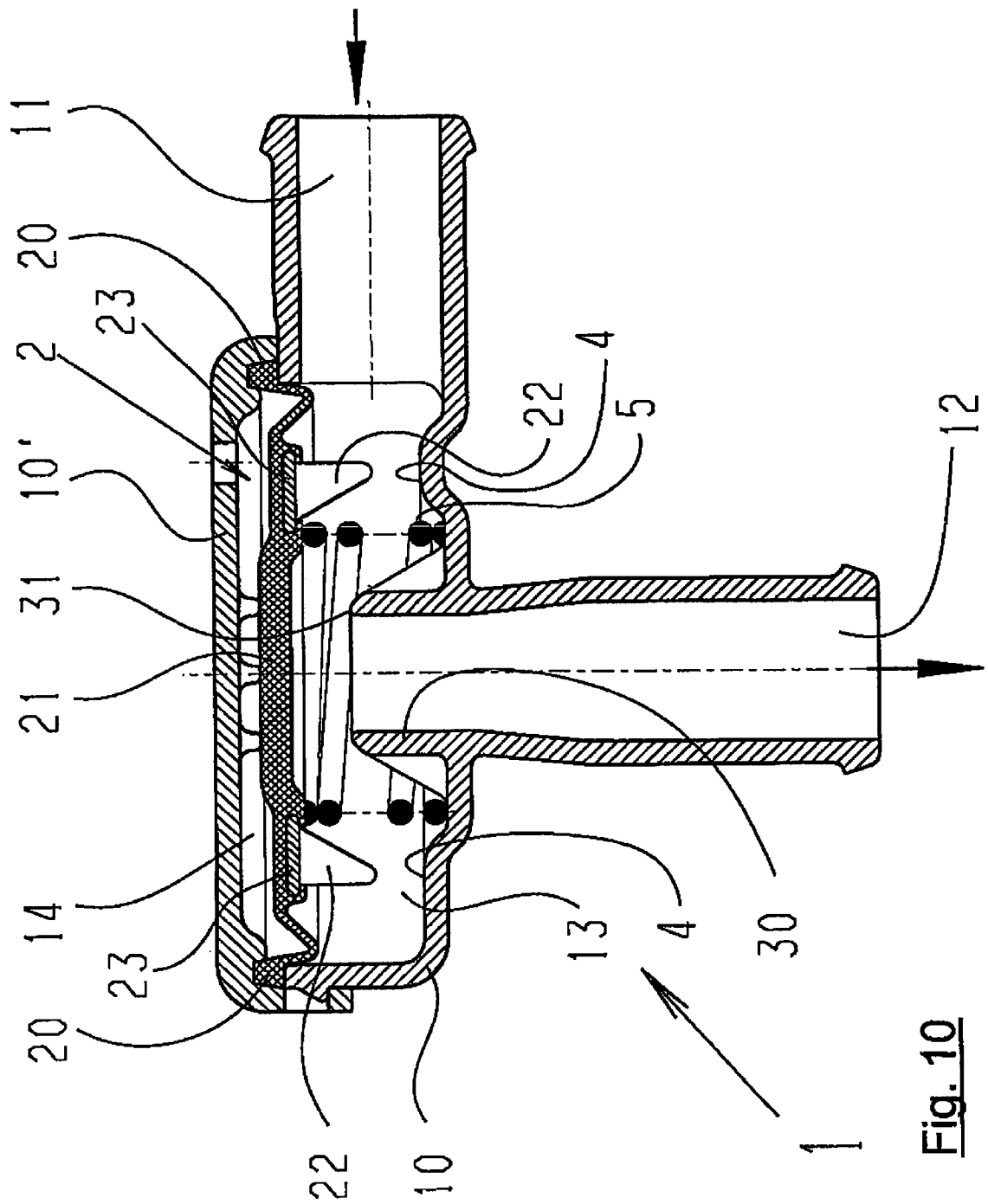
FIG. 10 shows the pressure regulating valve in a forth embodiment, in its open state.
Figure 11:
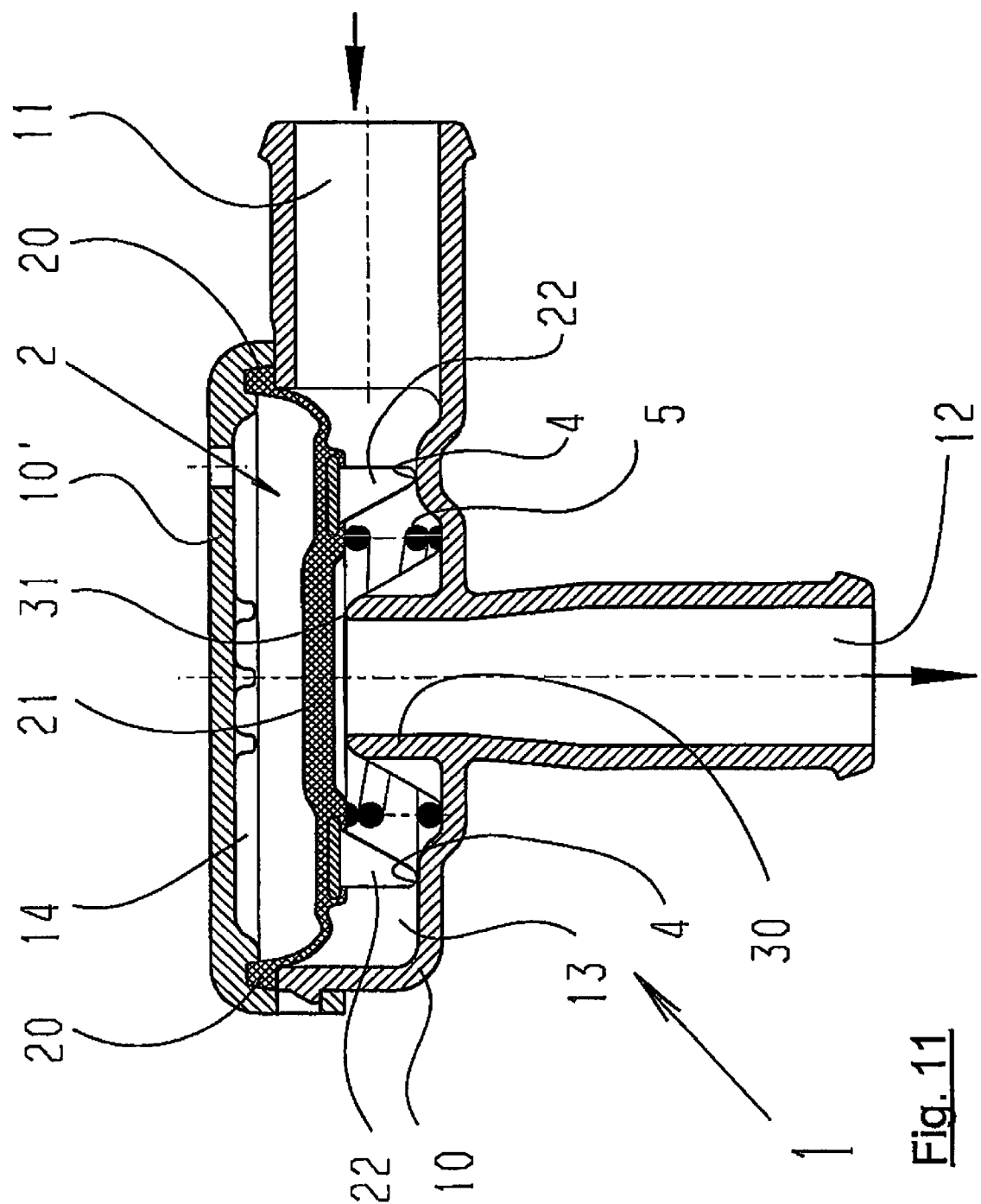
FIG. 11 shows the pressure regulating valve of FIG. 10 in a partially closed state.
Figure 12:
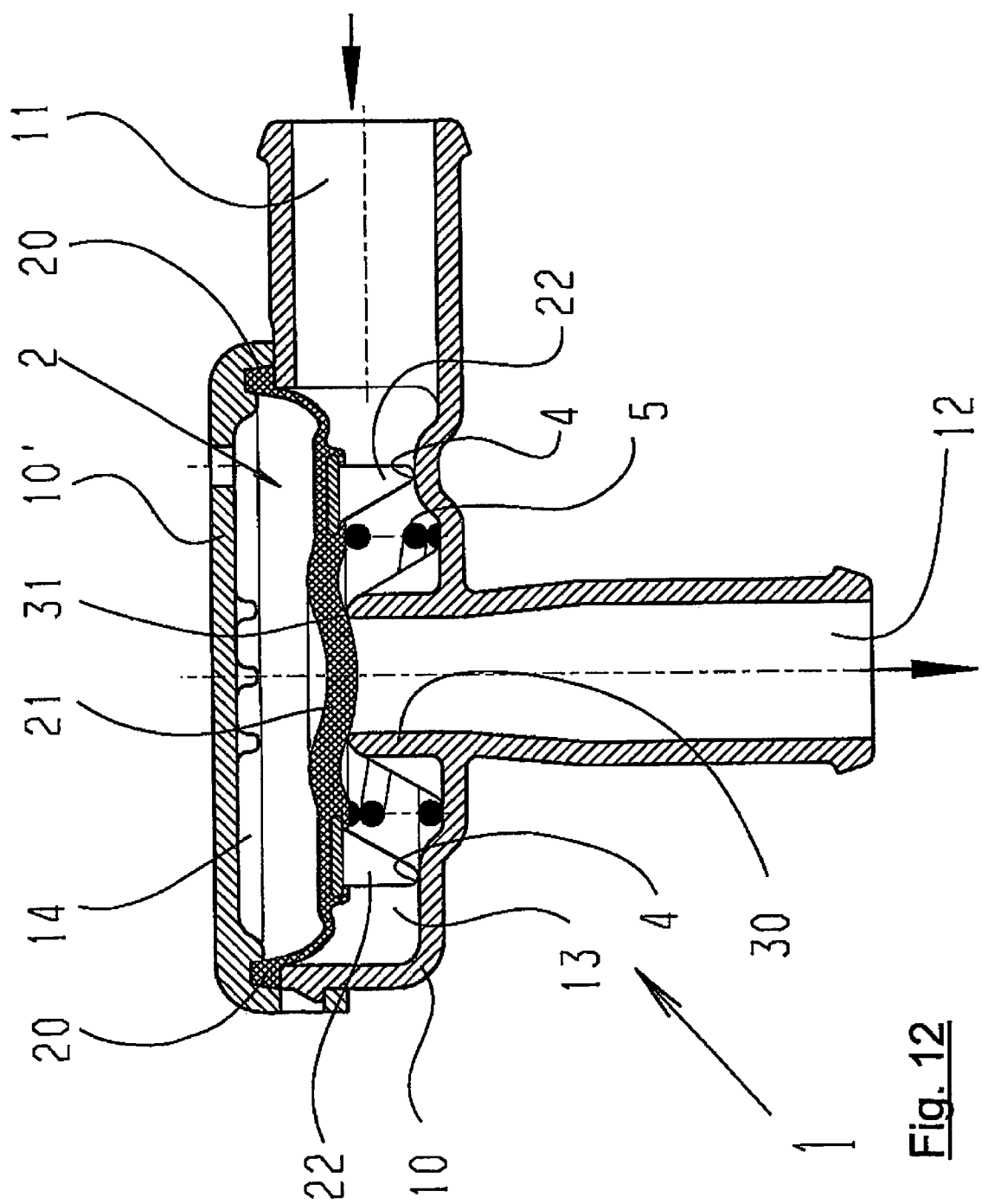
FIG. 12 shows the pressure regulating valve of FIG. 10 and FIG. 11 in its completely closed state.

FIGS. 10 to 12 show a forth version of the pressure regulating valve 1. In this version of the pressure regulating valve 1, the preliminary stop 4 is formed by an annular region of the casing 10, said region pointing in upward direction. This region forming the preliminary stop 4 is positioned opposite to the projections 22 protruding out of the bottom side of the control diaphragm 2 in downward direction.

In the completely open state of the pressure regulating valve 1 shown in FIG. 10, the diaphragm 2 has reached its upper position and the downward projections 22 are spaced apart from the preliminary stop 4.

In the partially closed state of the pressure regulating valve 1 shown in FIG. 11, a differential pressure has caused a downward movement of the diaphragm 2 until the lower front ends of the projections 22 come into bearing against the preliminary stop 4.

FIG. 12 shows the closed state of the pressure regulating valve 1 of FIG. 11 wherein, now, the central region 21 of the diaphragm 2 has been further deformed in an elastic and flexible manner and has, thus, moved in downward direction to a position where its bottom side also bears against the stop 31 at the upper end of the pipe connection piece 30.

In the pressure regulating valve 1 according to FIGS. 10 to 12, the adjustment of the diaphragm 2 in its closing direction from the upper position of the diaphragm to the position where the projections 22 contact the preliminary stop 4 is effected only against the force of the governor spring 5. To be further adjusted, the diaphragm 2 must, in itself, be additionally deformed in its central region 21 in an elastic and flexible manner; this requires a higher force than is necessary for merely adjusting against the return force of the governor spring 5. As a result, this allows manipulation of the control characteristic of the pressure regulating valve 1 here as well, thus preventing any premature and undesired complete closing of the pressure regulating valve 1.

In each of the pressure regulating valves I described above by way of example, the control diaphragm 2 itself is the element of the pressure regulating valve 1 that, as a closing element, cooperates with the pipe connection piece 30 and the outflow cross-section 3 extending therethrough. In the version of the pressure regulating valve 1 according to FIGS. 13 to 15, a separate closing element 2' is now provided as opposed to the previous versions. In the illustrated instance, this separate closing element 2' is designed like a stamp with a lower disk-shaped part the diameter of which slightly exceeds the clear diameter of the outflow cross-section 3. At its bottom side, the closing element 2' is provided with an elastomeric lining 26'. The closing element 2' is formed integrally with the diaphragm supporting body 23 and the insert 24 forming a part thereof via a stem-shaped connection element 24'.

Here as well, a pin 40 the upper end of which projects beyond the upper end of the pipe connection piece 30 and forms the preliminary stop 4 is arranged centrally in the pipe connection piece 30.

Figure 13:
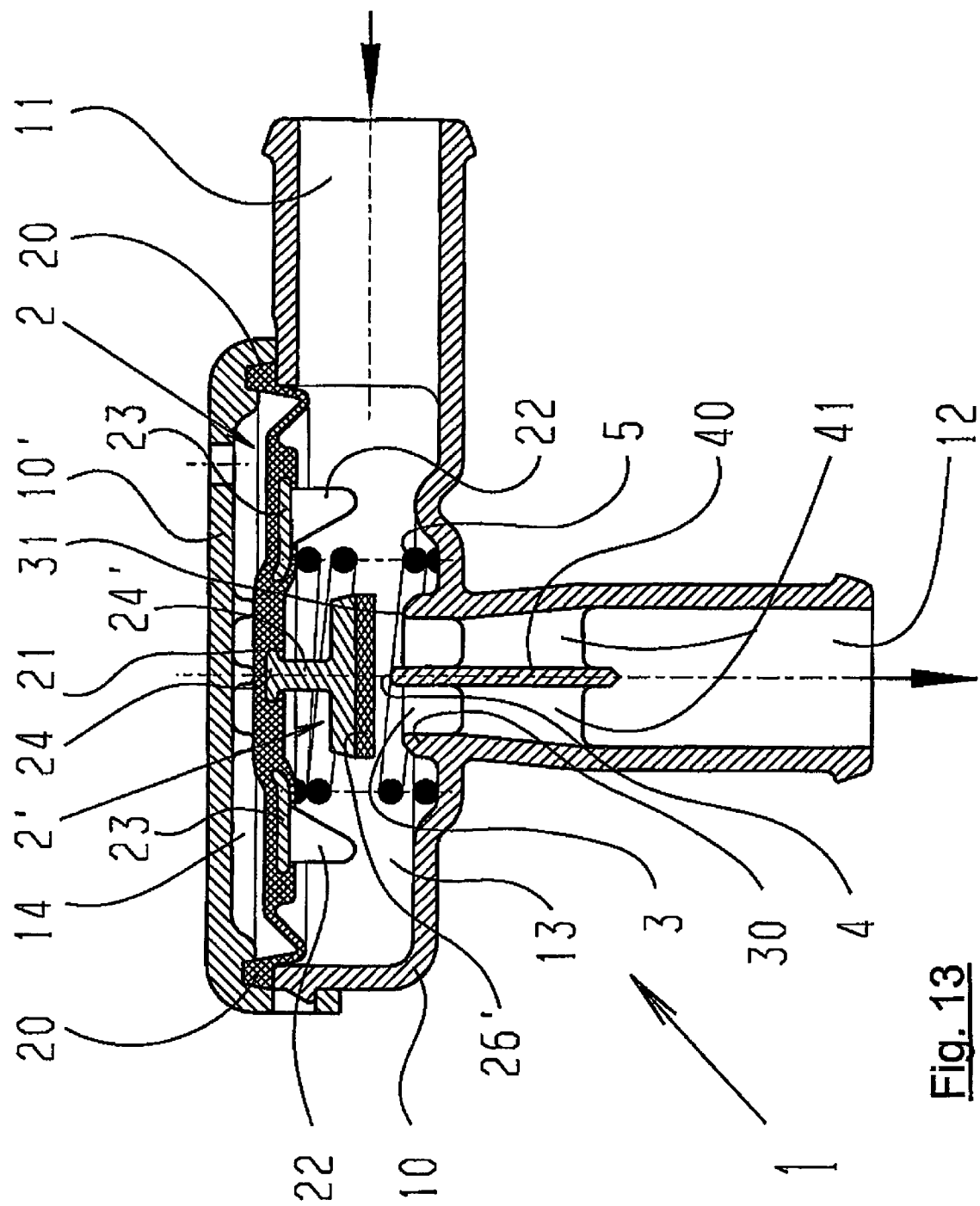
FIG. 13 shows the pressure regulating valve in a fifth embodiment, in its open state.

In the open state shown in FIG. 13, the diaphragm 2 is arranged in its upper position and the closing element 2' has lifted off in upward direction from the preliminary stop 4 and the stop 31 by the maximum possible distance. Hence, the pressure regulating valve 1 now has its maximum free flow cross-section.

Figure 14:
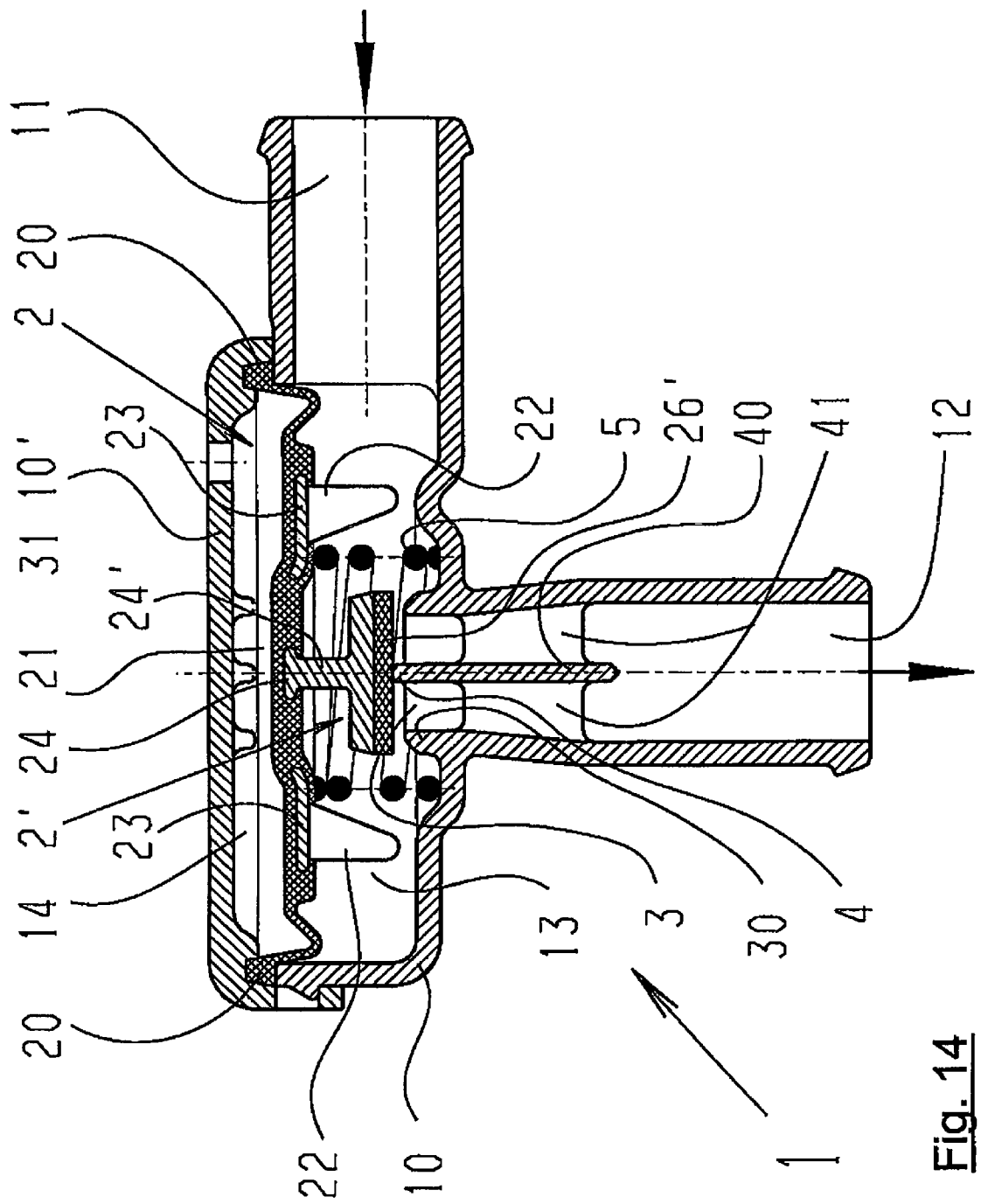
FIG. 14 shows the pressure regulating valve of FIG. 13 in a partially closed state.

FIG. 14 shows the pressure regulating valve 1 of FIG. 13 in a partially closed state. Here, an appropriate differential pressure has moved the control diaphragm 2 in downward direction to a position where the bottom side of the elastomeric lining 26' of the closing element 2' bears against the preliminary stop 4, however not against the stop 31. Hence, the flow cross-section 3 that is now available through the pressure regulating valve 1 is reduced.

Figure 15:
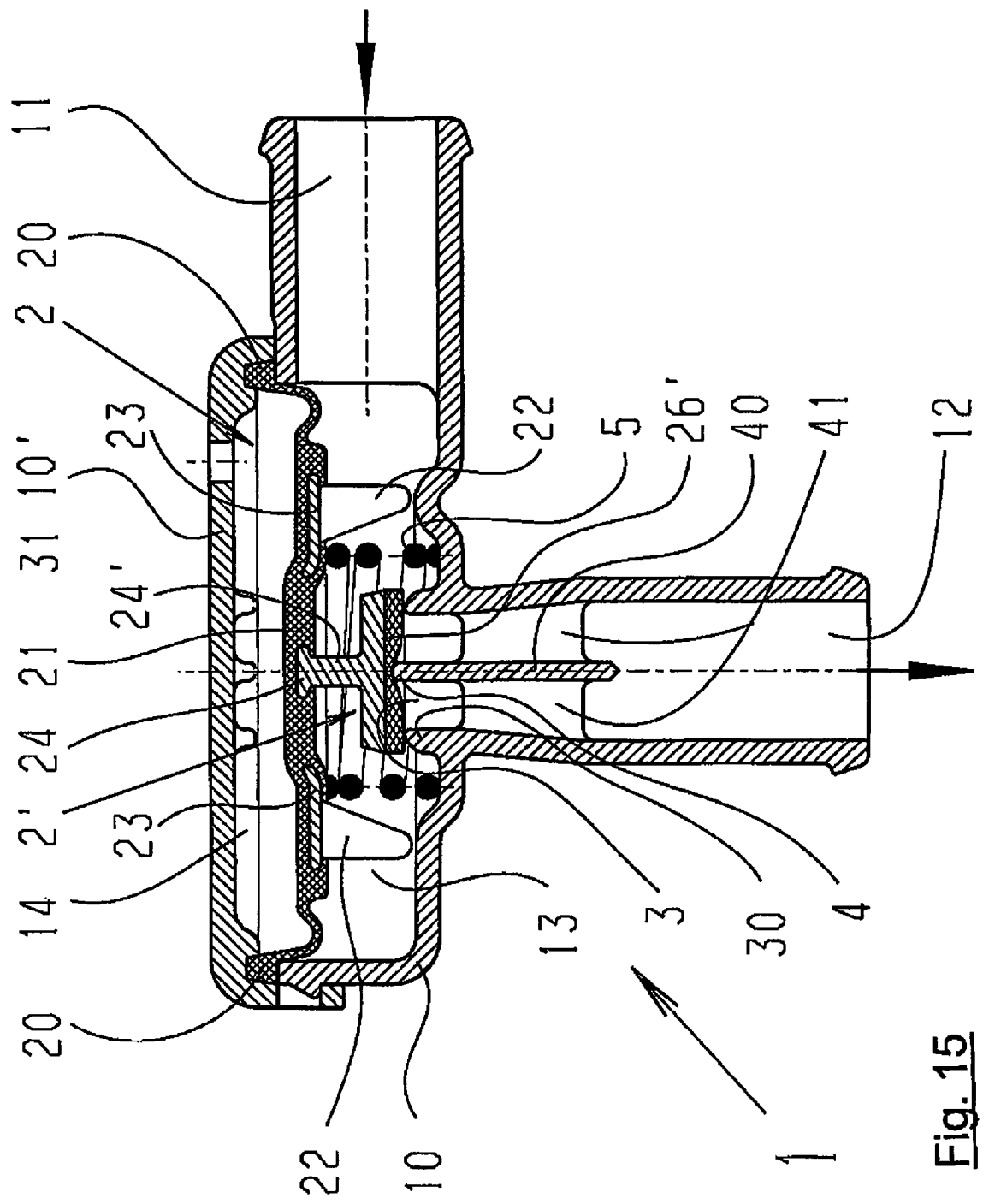
FIG. 15 shows the pressure regulating valve of FIG. 13 and FIG. 14 in its completely closed state.

FIG. 15 shows the pressure regulating valve 1 of FIGS. 13 and 14 in its completely closed state. Here, an increasing differential pressure has moved the control diaphragm 2 even further in downward direction. As a result, the elastomeric lining 26' is compressed in the region where it contacts the preliminary stop 4, until the radially outward region of the elastomeric lining 26' of the closing element 2' bears against the stop 31. As a result, the flow cross-section of the pressure regulating valve 1 is now closed.

In this version of the pressure regulating valve 1 as well, the adjusting motion of the control diaphragm 2 in the first adjustment range between the completely open position and that position where the elastomeric lining 26' of the closing element 2' comes into bearing against the preliminary stop 4 is effected only and exclusively against the force of the governor spring 5. To ensure further adjustment, the elastic return force of the elastomeric lining 26' of the closing element 2' must be overcome in addition to the force of the governor spring 5.

Hence, the pressure regulating valve 1 according to FIGS. 13 to 15 also achieves a control characteristic which prevents any undesired and premature complete closing of the pressure regulating valve 1.

In its remaining component parts, the pressure regulating valve 1 according to FIGS. 13 to 15 corresponds to the pressure regulating valve according to FIGS. 1 to 3, with reference being made to the latter's description.

Figure 16:
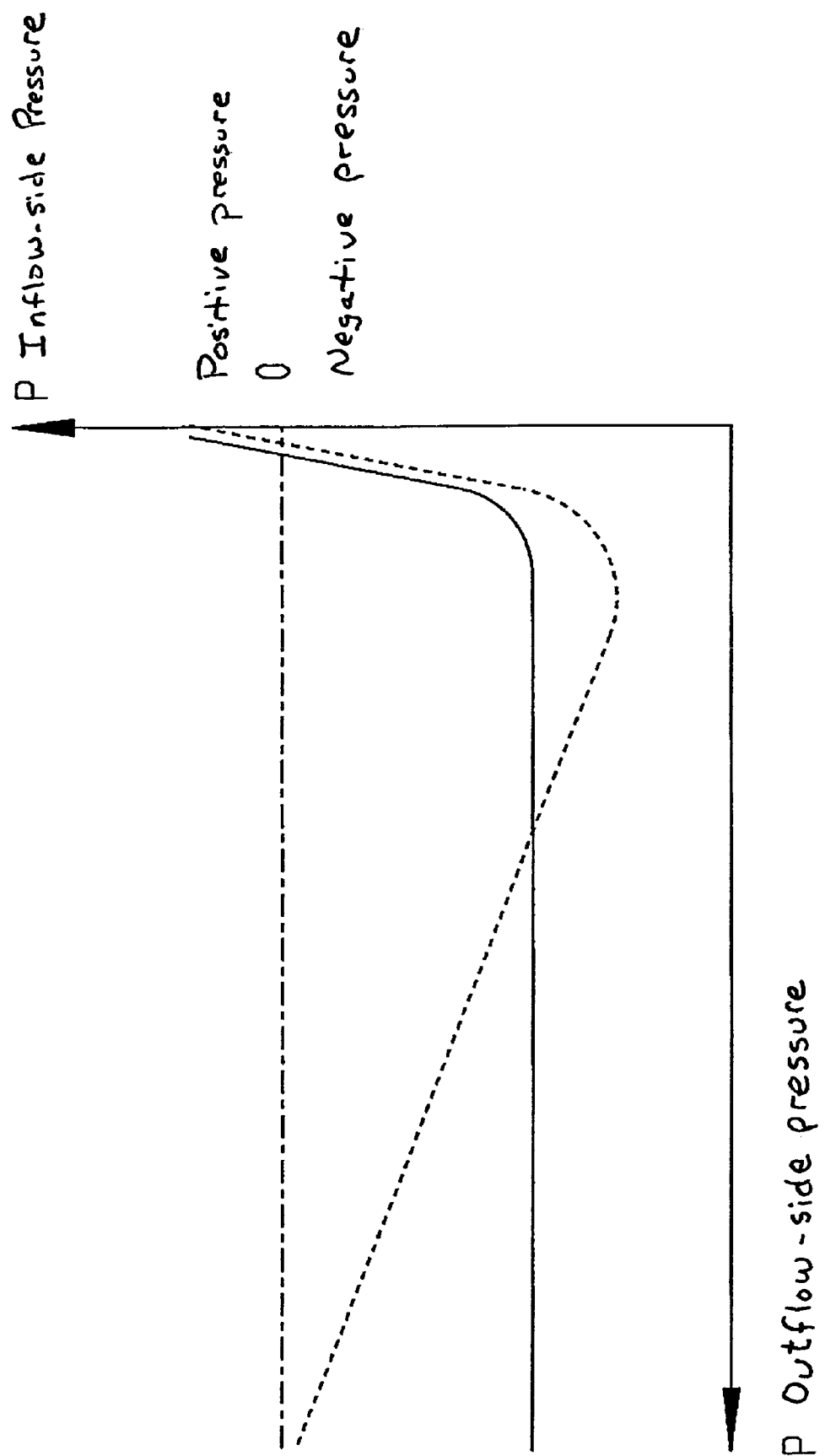
FIG. 16 shows a pressure diagram for a conventional pressure regulating valve as compared with a pressure regulating valve according to the invention.

FIG. 16 shows a pressure diagram illustrating the effect of the pressure regulating valves 1 described above as compared with a conventional pressure regulating valve. In the pressure diagram, the outflow-side pressure in the lower chamber 13 is opposed against the inflow-side pressure in the gas inlet 11. The dash-dotted line represents the reference pressure, e.g. the ambient or atmospheric pressure, in the gas inlet 11.

The dashed line shows a typical control behavior of a conventional pressure regulating valve. With the pressure in the lower chamber 13 decreasing, the pressure in the gas inlet 11 initially decreases rapidly. Thereafter, however, the pressure in the gas inlet 11 steadily rises again while the pressure in the lower chamber 13 further decreases. This rise in pressure in the gas inlet 11 with decreasing pressure in the lower chamber 13 is not desired in many applications.

In such cases, the pressure regulating valve 1 according to the invention is a remedy a typical control characteristic of which is represented by the continuous line. Here as well, the pressure in the gas inlet 11 rapidly drops as the pressure in the lower chamber 13 decreases. After a specific vacuum pressure has been reached in the gas inlet 11, the pressure in the gas inlet 11 is, however, kept at a constant level, even if the outflow-side pressure in the lower chamber 13 decreases further. The pressure regulating valve 1 according to the invention reliably prevents the development of any high, disturbing or even harmful pressure on the inflow side in the gas inlet 11.

Figure 17:
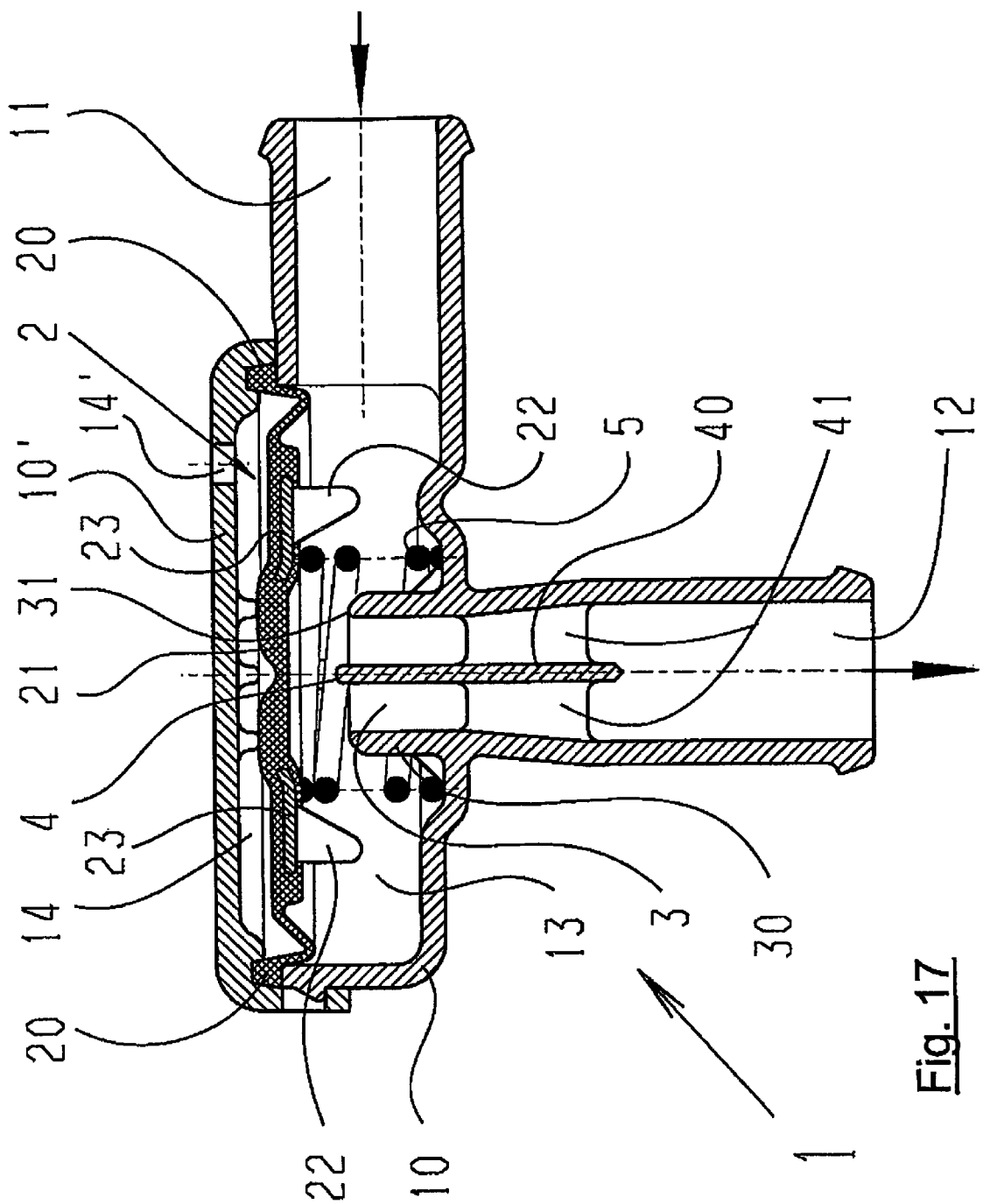
FIG. 17 shows the pressure regulating valve in a sixth embodiment, in its open state.
Figure 18:
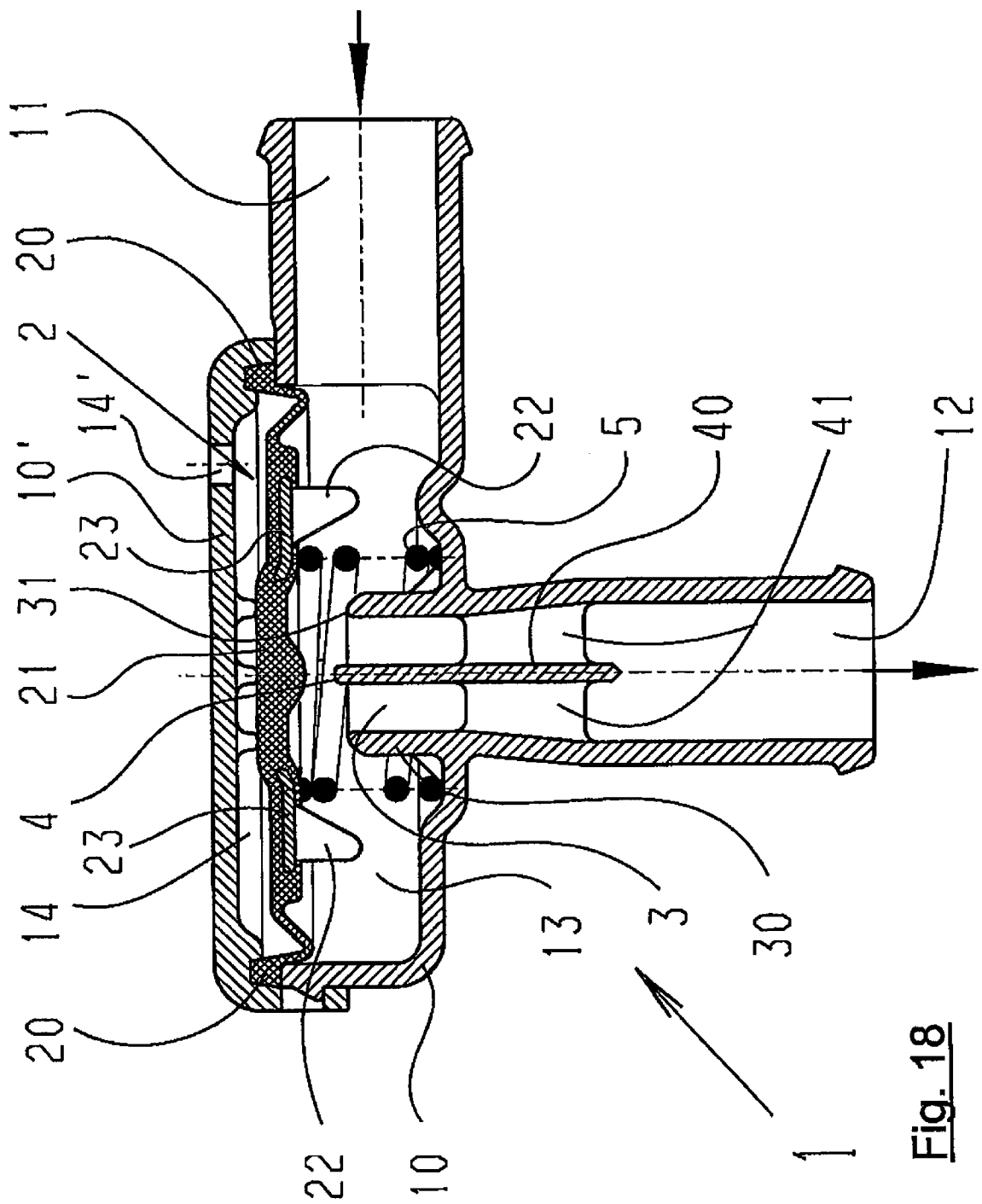
FIG. 18 shows the pressure regulating valve in a seventh embodiment, in its open state.

FIGS. 17 and 18 show two modifications of the pressure regulating valve 1 of FIGS. 1 to 3.

The pressure regulating valve 1 according to FIG. 17 provides in the central region 21 of the control diaphragm 2 a weakening of the material on the upper side, said weakening altering the elastic and flexible properties of the control diaphragm 2 in this region. In this executive form, the diaphragm 2 can, in particular, be deformed in its central region 21 with only low efforts.

Contrary thereto, the control diaphragm in the pressure regulating valve 1 according to FIG. 18 comprises a thickening of the material in its central region 21. As a result, increased efforts are required for further deforming the central region 21 of the diaphragm 2. Using these two measures, the efforts for further adjusting the diaphragm 2 from the position where it bears against the preliminary stop 4 to the position where it bears against the stop 31 can be altered in different directions.

In addition or as an alternative thereto, it is also possible to make the positions of the preliminary stop 4 and the stop 31 adjustable in relation to each other. This measure can also be used to manipulate the efforts required for further adjusting the control diaphragm 2, with the result that the control characteristic of the pressure regulating valve 1 is manipulated accordingly.

In their further component parts that have not been illustrated above, the pressure regulating valves 1 according to FIGS. 17 and 18 correspond to the pressure regulating valve according to FIGS. 1 to 3.

Figure 19:
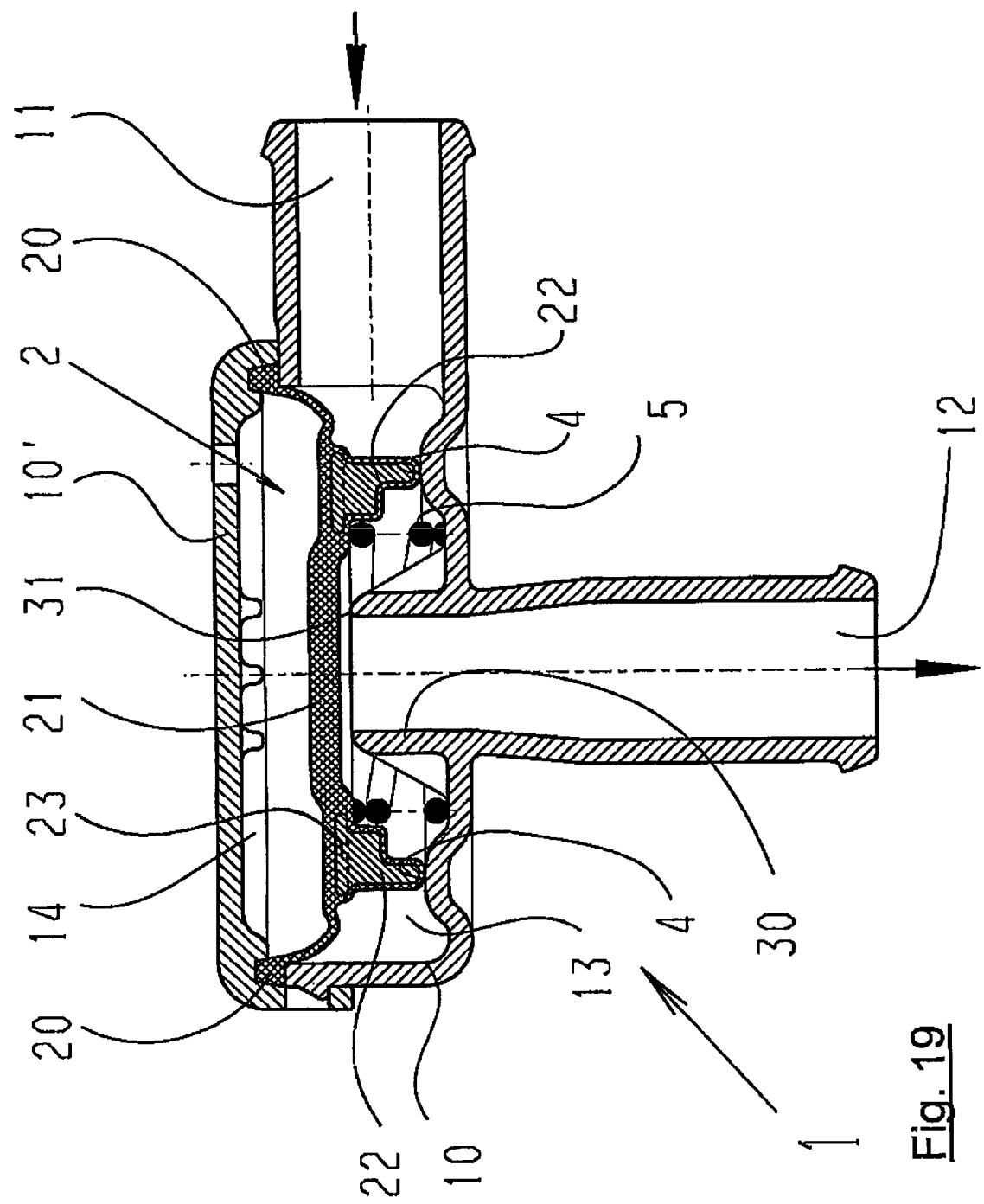
FIG. 19 shows the pressure in an eighth embodiment, in a partially closed state.

FIG. 19 shows an eighth version of the pressure regulating valve 1. In this version, which is comparable to the forth version of the pressure regulating valve 1 according to FIGS. 10 to 12, the preliminary stop 4 is provided on the upper side of a lower wall of the casing 10, here in the form of an annular elevation extending around the pipe connection piece 30 and resembling the shape of a bead.

Here, the control diaphragm 2 is designed with an integrated diaphragm supporting body 23, from which projections 22 are again protruding in downward direction. At their outer surface, said projections 22 are provided with an elastomeric lining formed integrally with the elastomeric material from which the diaphragm 2 is made predominantly.

In the partially closed state of the pressure regulating valve 1 shown in FIG. 19, the projections 22 bear against the preliminary stop 4 with their lower front end. Here, the central region 21 of the diaphragm 2 is still spaced apart from the stop 31 at the upper front end of the pipe connection piece 30.

In order to put this pressure regulating valve 1 in its completely closed position, the central region 21 of the control diaphragm 2 must be elastically and flexibly deformed in downward direction until the bottom side of the central region 21 of the diaphragm 2 bears against the stop 31. Hence, it is, here as well, possible to generate different counterforces for the first section of the travel distance of the diaphragm 2 and for the second section of the travel distance of the diaphragm 2, thereby facilitating an appropriate and selective manipulation of the control characteristic of the pressure regulating valve 1. In its further component parts, the pressure regulating valve 1 according to FIG. 19 corresponds to the pressure regulating valve according to FIGS. 10 to 12.

In the executive forms of the pressure regulating valve described above, the control diaphragm 2 and its supporting body 23 are made as an integral injection-molded part. Therein, a prefabricated supporting body 23 is coated with the elastic and flexible diaphragm material in a injection mold during production. As a result, the diaphragm supporting body 23 is embedded in the elastic and flexible diaphragm material in the regions provided to that end.

Figure 20:
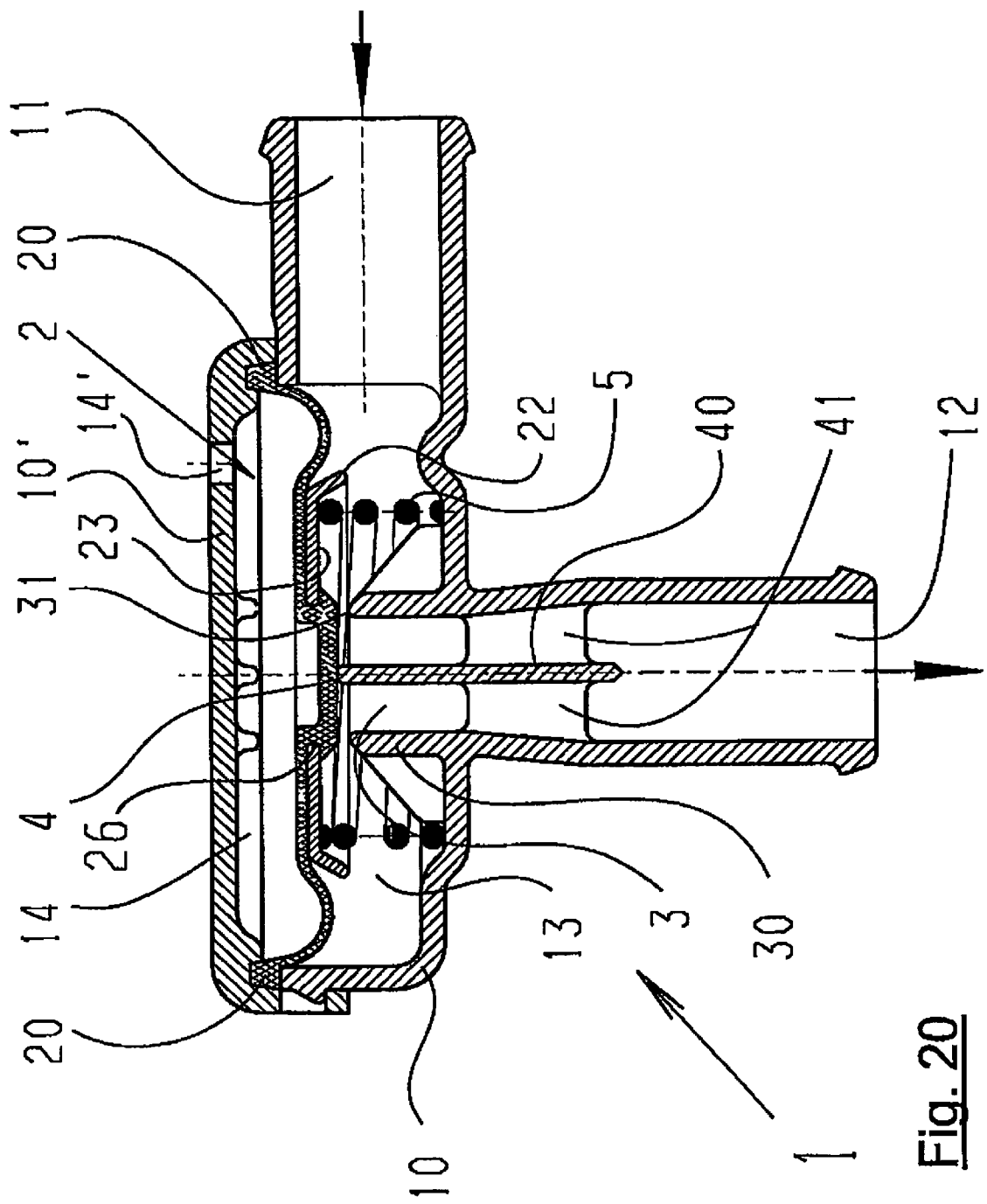
FIG. 20 shows the pressure regulating valve in a ninth embodiment, in a partially closed state.

FIG. 20 shows a further exemplary embodiment of the pressure regulating valve 1 which differs from the pressure regulating valve described above with regard to the design and the manufacture of the control diaphragm 2 and its supporting body 23. In the pressure regulating valve 1 according to FIG. 20, the diaphragm supporting body 23 and the remaining, elastic and flexible part of the control diaphragm 2 are component parts, here injection-molded parts, that are initially manufactured separately. After having been manufactured, these two parts 2, 23 are connected to each other, in order to form the complete component comprising the control diaphragm 2 and the associated diaphragm supporting body 23, which is visible in FIG. 20.

In order to connect the diaphragm supporting body 23 to the remaining control diaphragm 2, the latter comprises in its central region a projection with a circumferential groove-shaped undercut 26 that is open in a radially outward direction, said projection pointing in downward direction, that is towards the supporting body 23. Here, the diaphragm supporting body 23 is designed in the form of a ring, that is with a central breakthrough. The central region of the control diaphragm 2 that is made of the elastic and flexible material and is projecting in downward direction can be pressed through said breakthrough under compression, until the radially inward edge of the diaphragm supporting body 23 is positioned in the undercut 26. In this state, the diaphragm supporting body 23 and the remaining control diaphragm 2 are then connected to each other in an appropriately firm and permanent manner.

At its upper end, the governor spring 5 is supported against the bottom side of the diaphragm supporting body 23 that is, in turn, arranged underneath the elastic and flexible control diaphragm 2. As is the case in the exemplary embodiment of the pressure regulating valve 1 according to FIGS. 1 to 3, a central pin 40 the upper end of which forms a preliminary stop 4 for the control diaphragm 2 and which projects beyond the stop 31 at the upper end of the pipe connection piece 30 surrounding the outflow cross-section 3 is also arranged in the exemplary embodiment according to FIG. 20.

FIG. 20 shows the pressure regulating valve 1 in its partially closed state where the control diaphragm 2 just bears against the preliminary stop 4 with its central region. Before it has reached this position, the control diaphragm 2 had to overcome only the force of the governor spring 5, when it was moved out of its completely open position in closing direction. Here as well, the force for this adjustment is produced by a specific vacuum pressure in the lower chamber 13 of the casing 10, that is a pressure that is lower than the reference pressure, here the atmospheric pressure, in the upper chamber 14.

With increasing vacuum pressure in the lower chamber 13, the central region of the control diaphragm 2 deforms in an elastic and flexible manner in a radially outward direction of the preliminary stop 4 until, finally, the bottom side of the control diaphragm 2 also comes into bearing against the stop 31. In this position of the control diaphragm 2, the pressure regulating valve 1 is closed completely. For this second part of the movement of the control diaphragm 2, the elastic and flexible return force of the central region of the control diaphragm 2 must be overcome in addition to the force of the governor spring 5, with the result that the control characteristic is changed as compared to the first adjustment range of the control diaphragm 2 from the completely open position to the partially closed position.

In its remaining parts and in its function, the pressure regulating valve 1 according to FIG. 20 corresponds to the exemplary embodiment of the pressure regulating valve 1 according to FIGS. 1 to 3.

Figure 21:
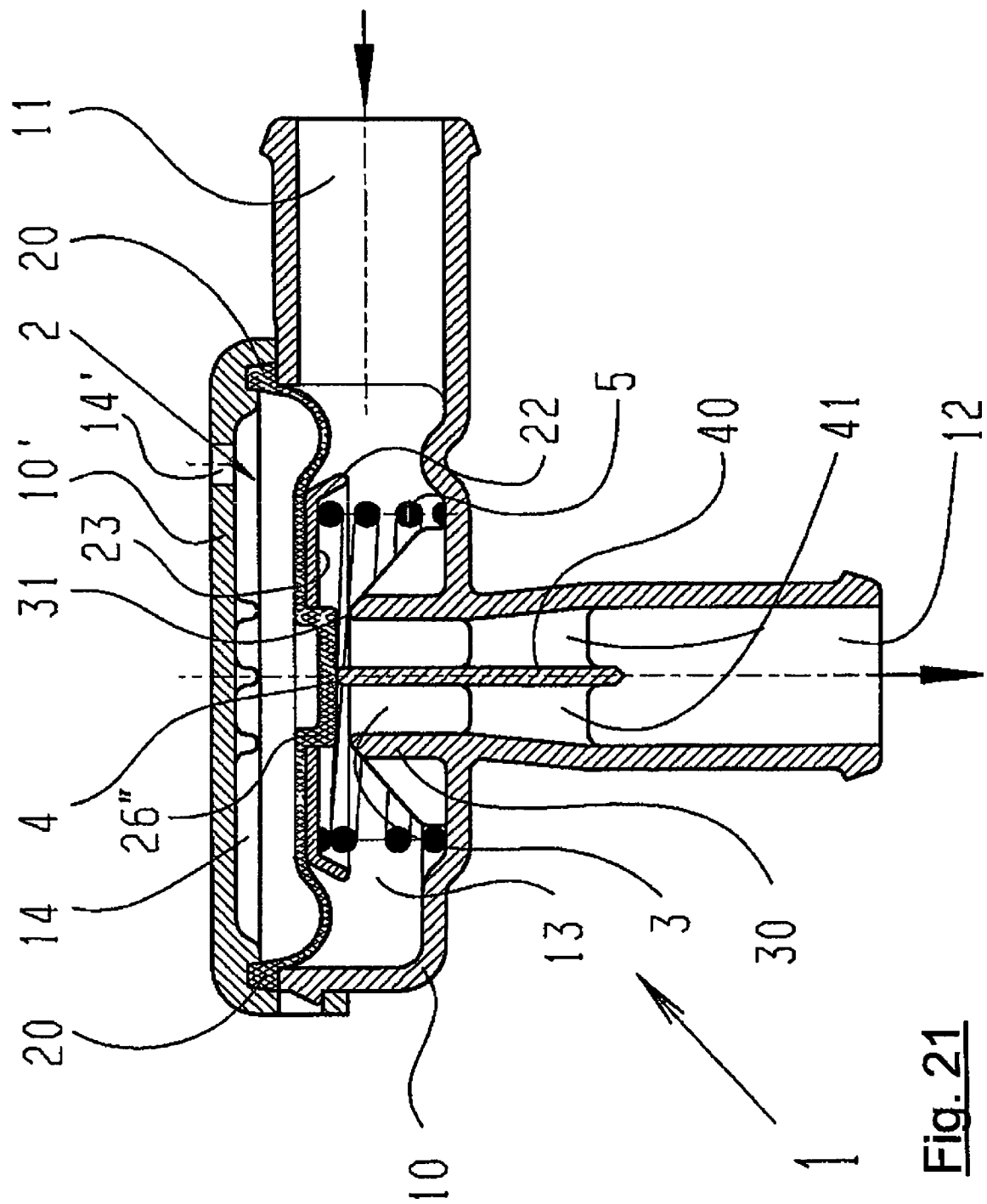
FIG. 21 shows the pressure regulating valve in a tenth embodiment, in a partially closed state.

In the exemplary embodiment of the pressure regulating valve 1 according to FIG. 21, the diaphragm supporting body 23 and the remaining control diaphragm 2 are again initially manufactured as separate component parts. In its central region, the elastic and flexible control diaphragm 2 possesses a projection 26″ that is pointing in downward direction, that is towards the stop 31, but does not comprise an undercut, as opposed to the executive form according to FIG. 20. With this projection 26″, the control diaphragm 2 projects through a central breakthrough in the diaphragm supporting body 23 that is annular here as well. With its upper end, the governor spring 5 is supported against the bottom side of the diaphragm supporting body 23 from below. In this manner, the diaphragm supporting body 23 is always retained in its bearing position against the bottom side of the control diaphragm 2 without a separate connection being provided between the diaphragm supporting body 23 and the remaining control diaphragm 2. The bearing of the diaphragm supporting body 23 against the bottom side of the control diaphragm 2 is preserved with each movement of the control diaphragm 2 in upward or downward direction, because the upper end of the governor spring 5 follows each adjusting motion of the control diaphragm 2.

In its remaining component parts and functions, the pressure regulating valve 1 according to FIG. 21 corresponds to the pressure regulating valve 1 according to FIGS. 1 to 3.

Figure 22:
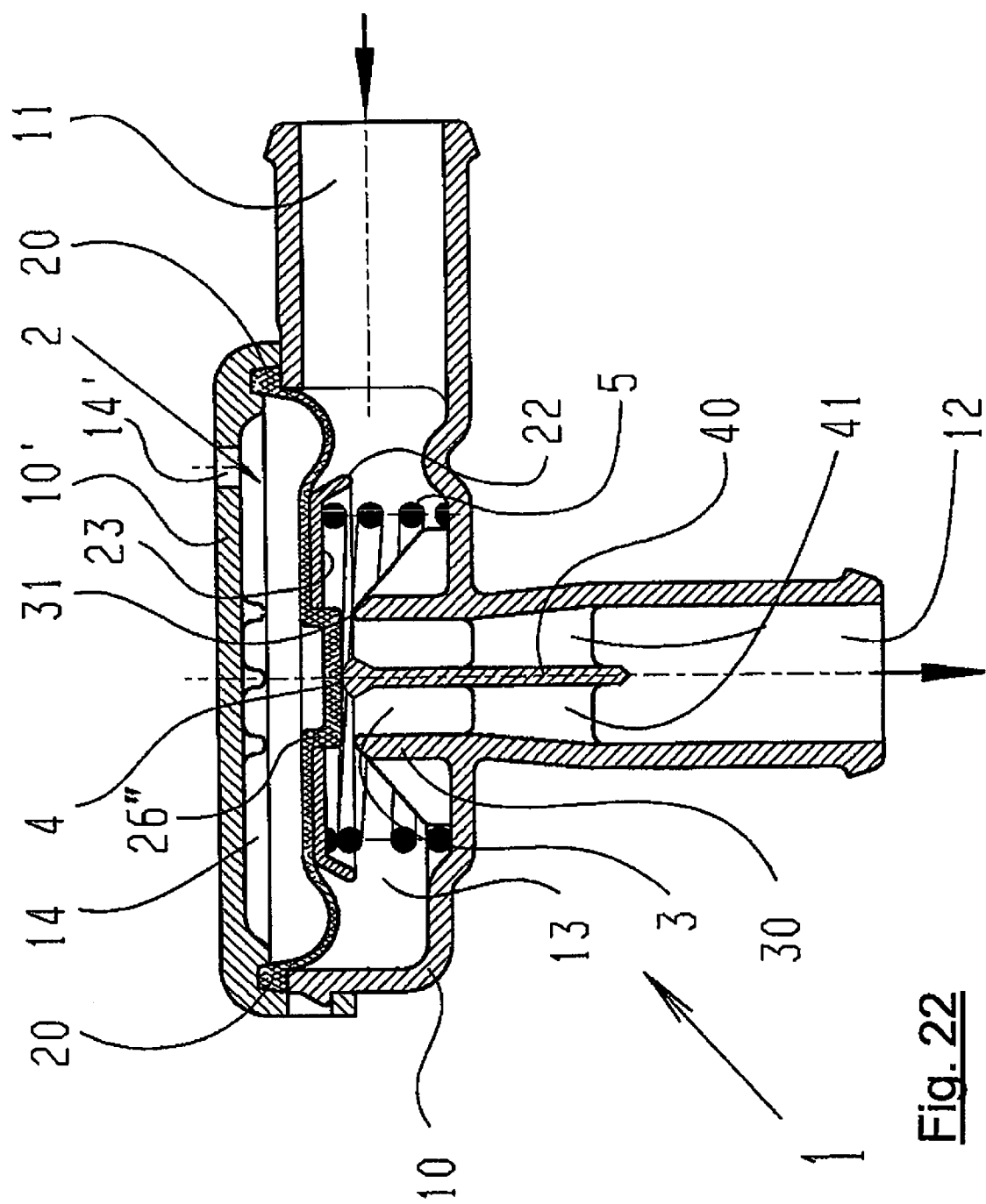
FIG. 22 shows the pressure regulating valve in an eleventh embodiment, in a partially closed state.

A further exemplary embodiment of a pressure regulating valve 1 is shown in FIG. 22. In this exemplary embodiment, the control diaphragm 2 and the diaphragm supporting body 23 are designed in the same manner as in the exemplary embodiment according to FIG. 21.

In its upper region, the pin 40 which is arranged concentrically in the outflow cross-section 3 and the upper end of which forms the preliminary stop 4 comprises a design that is different from the exemplary embodiments described above. Here, the pin 40 possesses in its upper end region a tapered outer contour, wherein the diameter of the pin 40 becomes smaller from top to bottom, that is as seen in the flow direction of the gas through the outflow cross-section 3. Here, the preliminary stop 4 is designed in the shape of a lens with a rounded cap at its side facing the control diaphragm 2.

The contour of the pin 40 shown in FIG. 22 ensures an improved flow path when the gas flows out of the chamber 13, through the passage between the control diaphragm 2 and the stop 31 and into the outflow cross-section 3. Therein, the contour of the pin 40 becomes to particular advantage for the gas flow when the pressure regulating valve 1, as shown in FIG. 22, is in its partially closed position. Here, the contour of the pin 40 ensures a favorable flow path and redirection of the gas flow that is initially extending in radial direction from without inward and then in axially downward direction.

In its further component parts and functions, the pressure regulating valve 1 according to FIG. 22 corresponds to the exemplary embodiment according to FIG. 21 and to the exemplary embodiment according to FIGS. 1 and 3.

Figure 23:
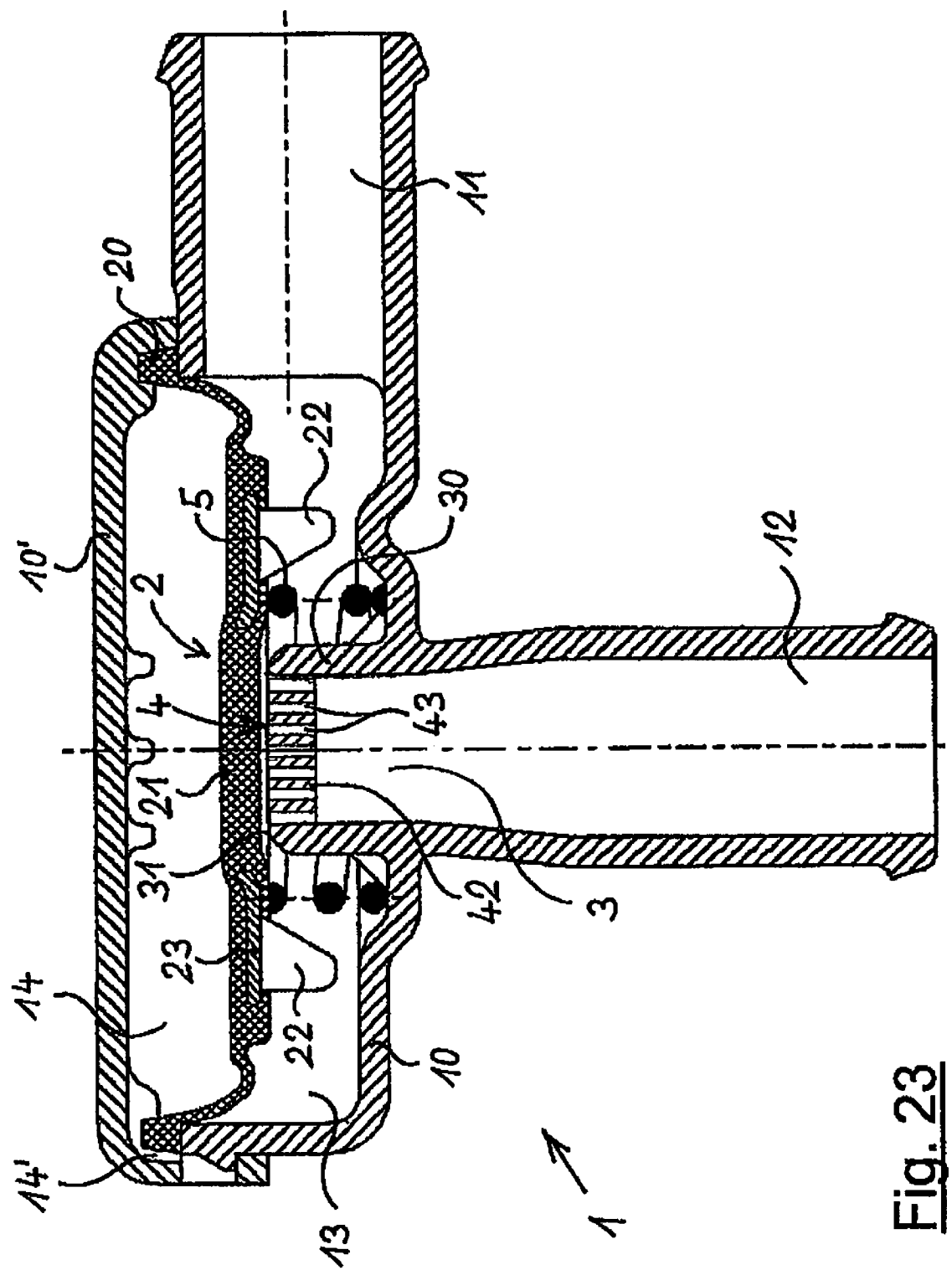
FIG. 23 is a longitudinal sectional view of the pressure regulating valve in a further embodiment.

FIG. 23 shows a further exemplary embodiment of a pressure regulating valve 1 comprising a casing 10 that is closed with a cover 10′ at its top. An elastic and flexible control diaphragm 2 is, in a sealing manner, fixed between the casing 10 and the cover 10′ by means of a fixing edge 20.

The control diaphragm 2 subdivides the interior region of the casing 10 in a lower chamber 13 and an upper chamber 14. The lower chamber 13 is connected to a gas inlet 11 which is, in turn, connected to the source of a gas flow, for example the crankcase of an internal combustion engine. The upper chamber 14 is in communication with the free atmosphere via a small duct 14′.

Furthermore, an outflow cross-section 3 formed by a short pipe connection piece 30 comes out of the lower chamber 13, wherein the upper front face of said pipe connection piece 30 forms a stop 31 for the control diaphragm 2 when the control diaphragm 2 completely closes the outflow cross-section 3. In the operating state of the pressure regulating valve 1 shown in FIG. 23, the control diaphragm 2 is spaced apart from the stop 31, so that the gas flow passing through the gas inlet 11 and into the chamber 13 can flow out through the outflow cross-section 3 and, thereafter, through the gas outlet 12. For example, the gas outlet 12 is connected to the intake section of an associated internal combustion engine.

A governor spring 5 having the form of a helical spring surrounding the pipe connection piece 30 and preloading the control diaphragm 2 with a force that is acting in upward, i.e. in opening direction, is arranged between the bottom side of the control diaphragm 2 and a surface of the casing 10 that is pointing in upward direction.

As is furthermore shown in FIG. 23, a preliminary stop 4 the upper edge of which is positioned at the level of the stop 31 and which is, here, formed by a preliminary stop structure 42 is arranged in the pipe connection piece 30. This preliminary stop structure 42 comprises breakthroughs 43 that are extending in parallel to each other in axial direction of the outflow cross-section 3, wherein the breakthroughs 43 each form a small duct.

Within the control diaphragm 2, only an elastomeric material that is elastic and flexible is provided in the central region 21 of said control diaphragm 2. Here, a diaphragm supporting body 23 is arranged in a radially outward direction of the central region 21 in the control diaphragm 2, said diaphragm supporting body 23 comprising a plurality of projections 22 that are pointing in downward direction and are distributed along its perimeter. These projections 22 serve to center the upper end of the governor spring 5 in relation to the control diaphragm 2.

During operation of the pressure regulating valve 1, differential pressures between a lower pressure in the lower chamber 13 and a higher, here atmospheric, pressure in the upper chamber 14 cause an adjustment and, at the same time, also a deformation of the control diaphragm 2. Therein, a convex diaphragm region that is pointing in downward direction is forming, in particular in the central region 21 of the control diaphragm 2. When the control diaphragm 2 moves in closing direction, that is in downward direction and towards the pipe connection piece 30 in the illustrated instance, the central region 21 of the control diaphragm 2 will, as a result, initially bear against the central region of the preliminary stop structure 42, while the diaphragm 2 is still spaced apart from the preliminary stop structure 42 and the stop 31 in a radially outward direction of the already bearing diaphragm region. Only when the pressure in the lower chamber 13 decreases further, will the control diaphragm 2, progressing from within outward in radial direction, initially bear against the preliminary stop structure 42 in an increasing manner and finally against the stop 31 as well.

This process is illustrated in FIGS. 23a to 23d with various positions of the control diaphragm 2. Therein, each of these figures only show a detail of the control diaphragm 2 together with the outflow cross-section 3.

Figure 23A:
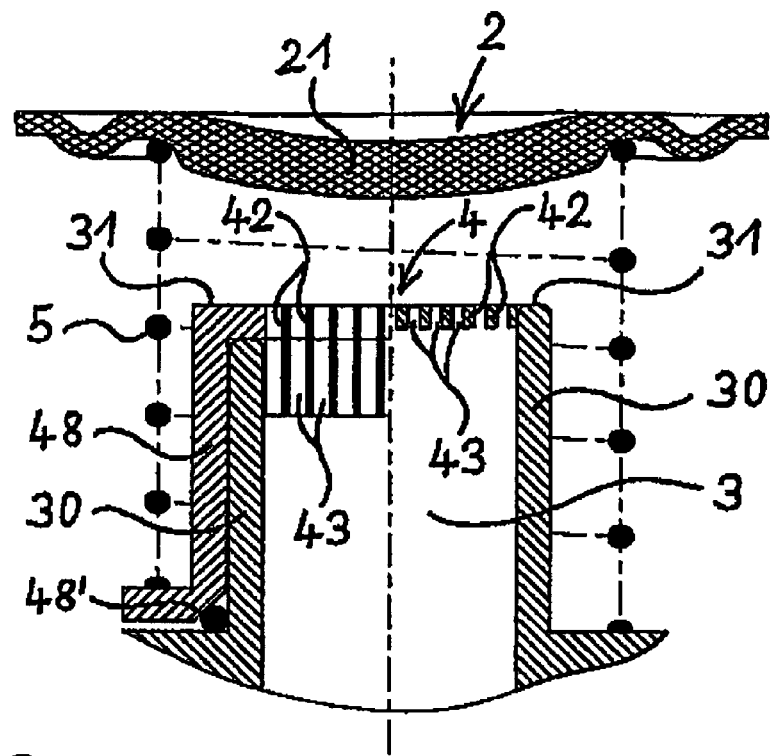
FIG. 23a to FIG. 23d each show a detail of the pressure regulating valve in four different operating states.

FIG. 23a shows the control diaphragm 2 in its completely open position where it is spaced apart from the stop 31 and the preliminary stop 4 arranged therein as far as possible. Here, the control diaphragm 2 possesses a central region 21 which is designed with a convex camber that is pointing in downward direction, i.e. towards the outflow cross-section 3.

The left-hand and right-hand sections of FIGS. 23a to 23d each show two different executive forms of the outflow cross-section 3 and the preliminary stop 4. In each right-hand section, the pipe connection piece 30 is, at its upper end, that is at the level of the stop 31, integrally formed with the preliminary stop structure 42 forming the preliminary stop 4. Here, the preliminary stop structure 42 is formed by webs that are extending in parallel to each other and perpendicularly to the drawing plane and leave breakthroughs 43 between each other.

In each left-hand section, a two-piece executive form is shown, wherein a sleeve part 48 provided as a separate component part is fitted onto the pipe connection piece 30, with a sealing ring 48' being placed intermediately. The upper region of the sleeve part 48 forms the stop 31 and, at the same time, also the preliminary stop 4 with the preliminary stop structure 42. Here as well, the preliminary stop structure 42 consists of webs or walls which are extending in parallel to each other and perpendicularly to the drawing plane but which, here, comprise a greater axial length than in the preliminary stop structure 42 in each of the right-hand sections. In each of the left-hand sections, breakthroughs 43 for the gas flow path are kept free between the walls forming the preliminary stop structure 42.

In the state shown in FIG. 23a, the complete flow cross-section through all breakthroughs 43 in the preliminary stop structure 42 is available.

Figure 23B:
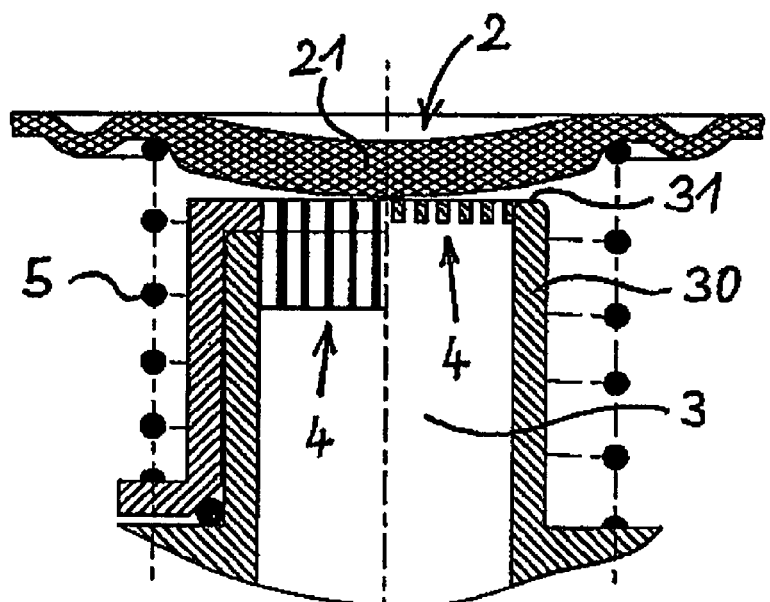

In the state shown in FIG. 23b, the control diaphragm 2, owing to different pressure conditions below and above the control diaphragm 2, has approached the preliminary stop 4, wherein a first contact between the control diaphragm 2 and the preliminary stop structure 42 is just occurring in the center of the central region 21 of the control diaphragm 2. As a result, the flow cross-section through the preliminary stop 4 has already been reduced a little.

Figure 23C:
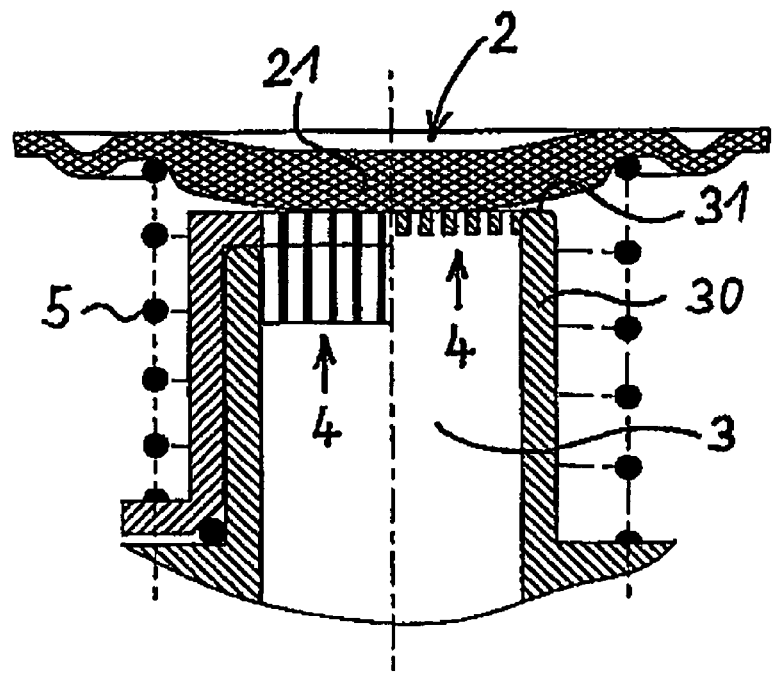

As shown in FIG. 23c, the control diaphragm 2 has moved even further in the direction of the preliminary stop 4 wherein, starting from its center and progressing in a radially outward direction, the central region 21 of the control diaphragm 2 has further borne against the preliminary stop 4 and now closes a part of the breakthroughs 43, whereas the radially outward breakthroughs 43 are still clear. Owing to its elasticity and flexibility, the central region 21 of the control diaphragm 2 is, therein, bearing against the surface of the preliminary stop structure 42, which is flat in the illustrated instance. In this manner, a part of the force acting on the diaphragm 2, that is the part of the force that acts in the surface region that is already bearing against the preliminary stop structure 42, is diverted directly onto the pipe connection piece 30 and, thus, onto the casing 10 of the pressure regulating valve 1. This promotes a desired control characteristic of the pressure regulating valve 1, which is unaffected by the vacuum pressure in the gas outlet to a large extent.

Figure 23D:
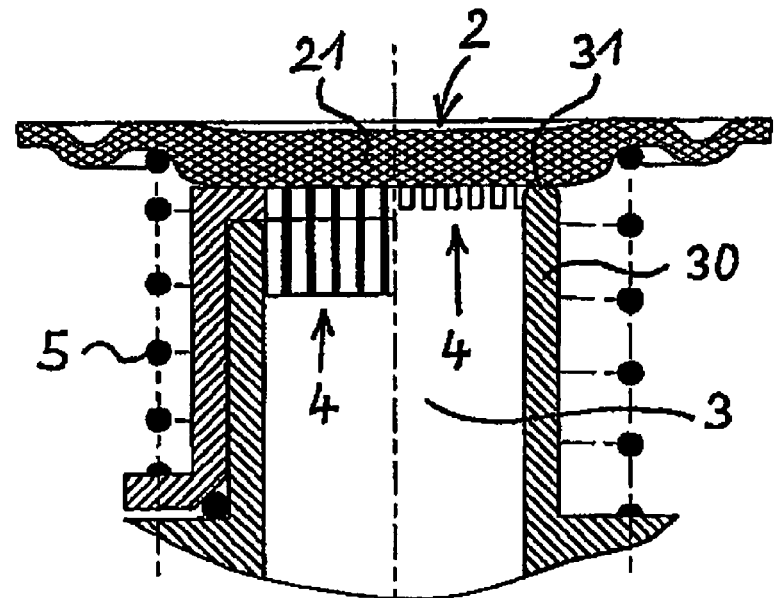

In FIG. 23d, the control diaphragm 2 is now fully bearing against the preliminary stop structure 4 and the stop 31 of the outflow cross-section 3, with the result that the closed position where there is no gas flow any longer has been reached.

Figure 24:
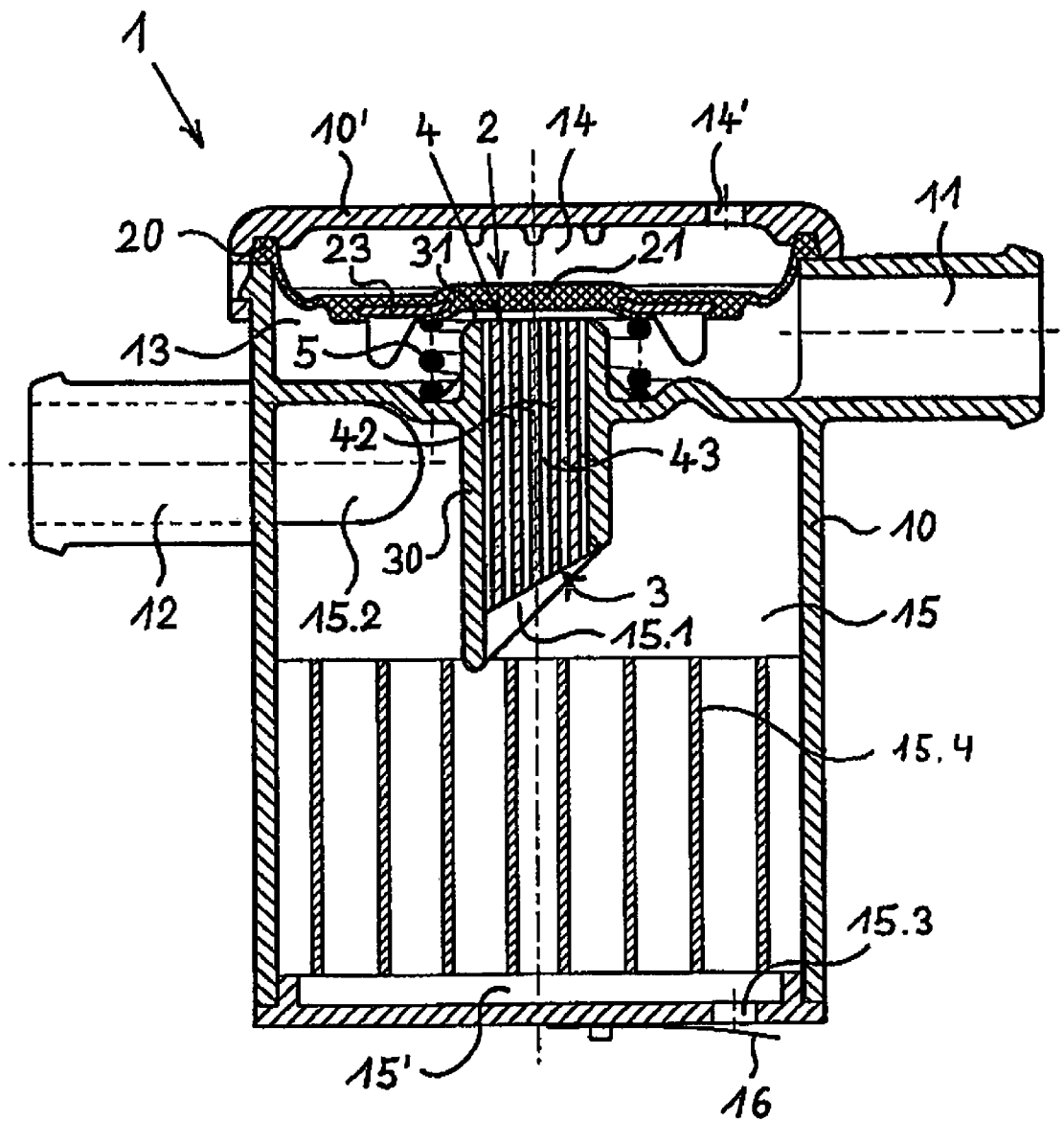
FIG. 24 is a longitudinal sectional view of a further pressure regulating valve.

FIG. 24 shows a second pressure regulating valve 1 which, in contrast to the example according to FIG. 23, is now additionally provided with a liquid collection chamber 15.

The liquid collection chamber 15 comprises a grid-shaped insert 15.4 which prevents the separated liquid from splashing and being entrained into the gas outlet piece 12.

Here as well, the casing 10 is provided with a cover 10' that retains the control diaphragm 2 in the casing 10 by means of a fixing edge 20 in a sealing manner. Here as well, the diaphragm 2 subdivides the interior region of the casing 10 in a lower chamber 13 and an upper chamber 14. The lower chamber 13 is in communication with the gas inlet 11. The upper chamber 14 is in communication with the free atmosphere via a small hole 14'.

Here as well, the central region 21 of the control diaphragm 2 is made of an elastic and flexible material, such as an elastomer. In a radially outward direction from the central region 21, an annular diaphragm supporting body 23 serving to center and support the upper end of the governor spring 5 is arranged in the control diaphragm 2.

Here as well, a pipe connection piece 30 enclosing an outflow cross-section 3 is arranged in the lower chamber 13. The upper front end of the pipe connection piece 30 forms a stop 31 for the control diaphragm here as well.

Here as well, a preliminary stop 4 again formed by a preliminary stop structure 42 practically extending along the entire axial length of the outflow cross-section 3 is arranged in the outflow cross-section 3. Here as well, the preliminary stop structure 42 comprises a plurality of ductlike breakthroughs 43 that are extending in parallel to each other and in the axial direction of the outflow cross-section 3.

The lower part of the casing is occupied by the liquid collection chamber 15 the lower part of which forms a liquid collection region 15'. The upper part of the liquid collection chamber 15 serves to separate gas from liquid. Liquid particles carried along in the gas, e.g. oil mist or oil droplets, are separated in the region of the preliminary stop structure 42, caused by the sharp change in direction that is inevitably occurring when the gas flows out of the lower chamber 13, passes underneath the control diaphragm 2 and flows into the breakthroughs 43. Owing to inertia, this sharp redirection causes the entrained liquid droplets to impinge on the preliminary stop structure 42 delimiting the ductlike breakthroughs 43. The settled liquid follows gravity and the gas flow in downward direction and flows via a gas inlet 15.1 and into the liquid collection chamber 15. From there, the liquid drops down and into the liquid collection region 15'. In this exemplary embodiment, the ductlike breakthroughs 43 have a different axial extension, that means that the geodetically lower end of the ductlike breakthroughs spreads a plane that extends at an angle in relation to the horizontal. Therein, the lower front end of the pipe connection piece 30 may also be inclined in relation to the central axis of the pipe connection piece. As a result, the settled liquid can be selectively passed to the geodetically bottommost point of the outflow cross-section 3, from where it can drop down into the liquid collection region 15'. In this manner, separated oil droplets are prevented from being entrained in the flow.

The gas from which the liquid content has been separated flows through the cleaned-gas outlet 15.2 to the upper left in the liquid collection chamber 15 into the gas outlet 12 and from there, for example, into the intake section of an associated internal combustion engine.

Here, a reed valve 16 that is positioned underneath a liquid outlet 15.3 serves to discharge the liquid collected from the liquid collection region 15'. Appropriately, a line that is not shown here removes the liquid that is flowing out when the valve 16 is open from said liquid outlet 15.3 and returns it, for example, into the crankcase of an associated internal combustion engine.

Figure 24A:
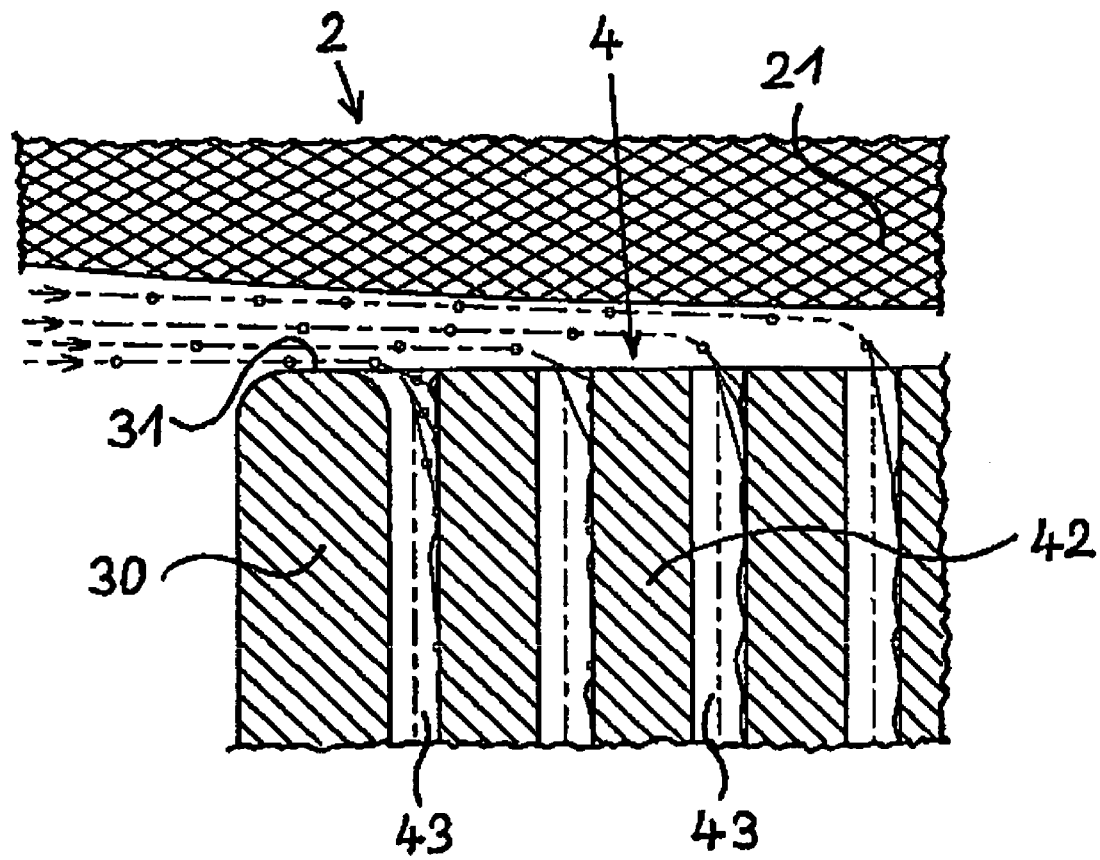
FIG. 24a is a longitudinal sectional view of an enlarged detail of the pressure regulating valve according to FIG. 24.

FIG. 24*a* is an enlarged detail illustrating the separation of entrained liquid droplets from the gas flow in the region of the preliminary stop 4. At the top in FIG. 24*a*, a detail of the control diaphragm 2, here of its central region 21, can be seen. Therein, the separation mechanism is similar to that of an impactor.

The pipe connection piece 30 whose upper front side facing the control diaphragm 2 forms the stop 31 can be seen in the lower part of FIG. 24*a*.

The preliminary stop 4 that consists of the preliminary stop structure 42 comprising the breakthroughs 43 is arranged in the pipe connection piece 30.

The dashed lines indicate the flow of a gas carrying liquid droplets and flowing from a radially outward direction, that is from the left according to FIG. 24*a*, to the region underneath the control diaphragm 2 where it flows into the breakthroughs 43 after having undergone a sharp change in direction by approximately 90 degrees and then continues its flow through said breakthroughs in downward direction. As illustrated in the diagrammatic representation, the liquid droplets carried along in the gas flow can follow the sharp redirection of the gas when it enters into the breakthroughs 43 only incompletely, with the result that the liquid droplets impinge on the preliminary stop structure 42 delimiting the breakthroughs 43. The liquid droplets collect at the preliminary stop structure 42 and, following gravity and the gas flow in the breakthroughs 43, flow as a liquid film in downward direction.

In this manner, a liquid separation from the gas flowing through the pressure regulating valve 1 is achieved in addition to the pressure regulation in the pressure regulating valve 1, without any complicated independent liquid separator.

Figure 25:
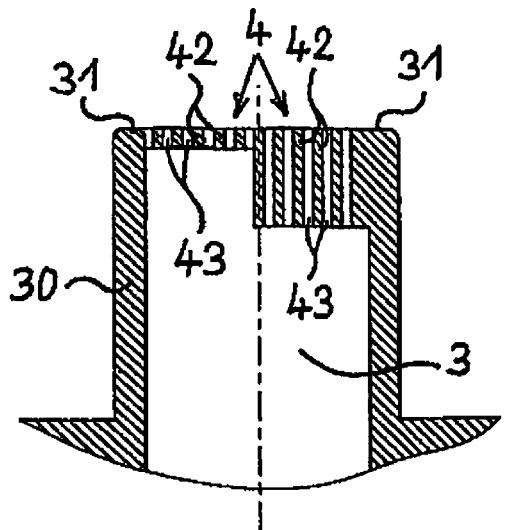
FIG. 25 is a longitudinal sectional view of an outflow cross-section together with a preliminary stop as a part of a pressure regulating valve.

FIG. 25 is a longitudinal sectional view of a pipe connection piece 30 as a component part of a pressure regulating valve. The left-hand section of FIG. 25 shows a preliminary stop structure 42 that is arranged in the outflow cross-section 3 and is relatively short in axial direction, while the right-hand section of FIG. 25 shows a preliminary stop structure 42 comprising a length that is considerably longer in axial direction. By selecting the axial length of the preliminary stop structure and, thus, of the breakthroughs 43, in an appropriate manner, the desired liquid separation from the gas flowing therethrough can be manipulated and optimized.

FIGS. 25*a* to 25*d* each are top views of the pipe connection piece 30 in various executive forms of the preliminary stop 4 and its preliminary stop structure 42.

Figure 25A:
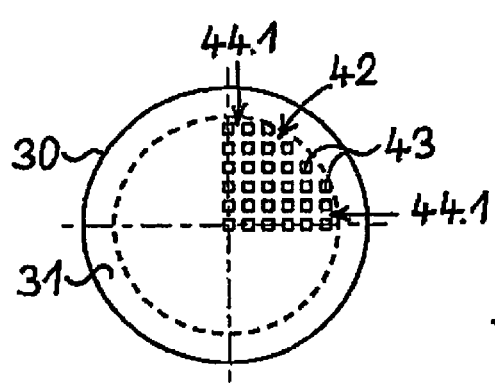
FIG. 25a to FIG. 25d each are top views of four different preliminary stops.

According to FIG. 25*a*, the preliminary stop structure is formed by flat walls 44.1 that are intersecting each other at right angles, wherein the breakthroughs 43, having a square cross-section, extend between said walls 44.1.

Figure 25C:
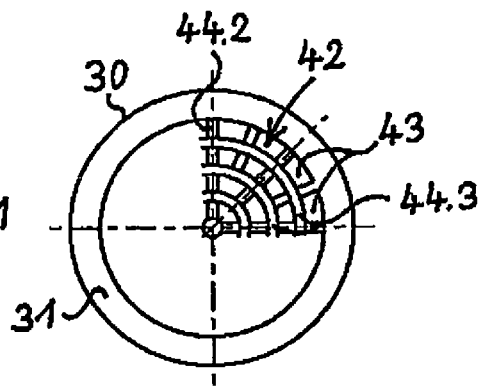
Figure 25B:
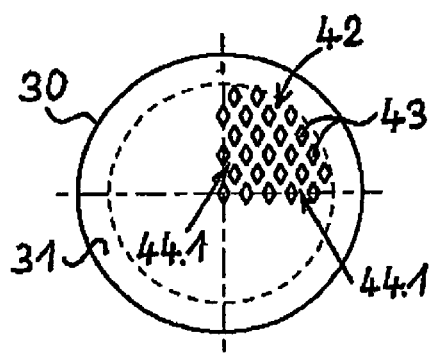

According to FIG. 25*b*, the preliminary stop structure 42 also consists of intersecting flat walls 44.1 wherein here, however, the intersection angle selected is an acute angle resulting in a rhomboid cross-section of the breakthroughs 43.

According to FIG. 25*c*, the preliminary stop structure 42 comprises walls 44.2 extending in radial direction and walls 44.3 extending in circumferential direction, with the breakthroughs 43 being arranged therebetween.

Figure 25D:
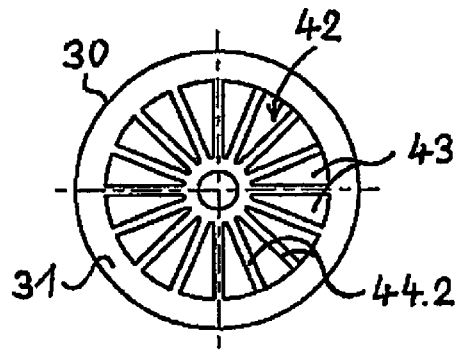

FIG. 25*d* shows an example of a preliminary stop structure 42 where walls 44.2 are provided which are, in essence, extending in radial direction and are converging in a radially inward ring that is smaller in diameter.

FIGS. 26*a* to 26*d* show further appropriate executive forms of the pipe connection piece 30 and the preliminary stop 4 provided therein.

Figure 26A:
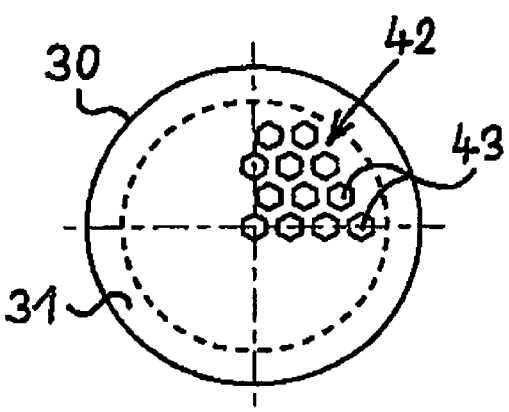
FIG. 26a to FIG. 26d each are top views of four further different preliminary stops.

According to FIG. 26*a*, the breakthroughs 43 in the preliminary stop structure 42 are designed with a hexagonal cross-section, resulting in a honeycomb structure of sorts.

Figure 26B:
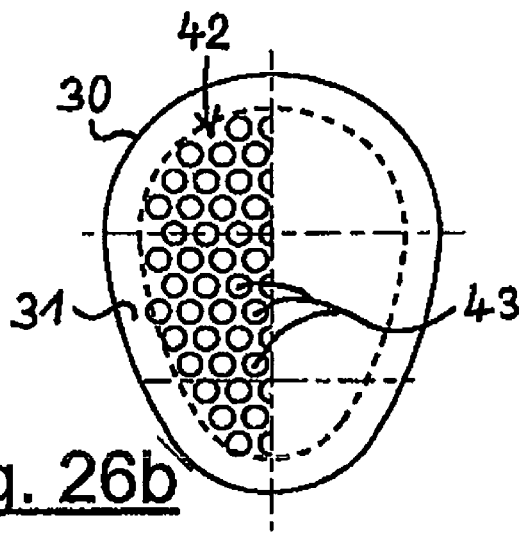

According to FIG. 26*b*, the breakthroughs 43 in the preliminary stop structure 42 are designed as circular holes. This example is characteristic in that the pipe connection piece 30 is, here, not circular, but ovoid in cross-section. This special design also allows to manipulate the control characteristic of the pressure regulating valve 1 in a selective manner.

Figure 26C:
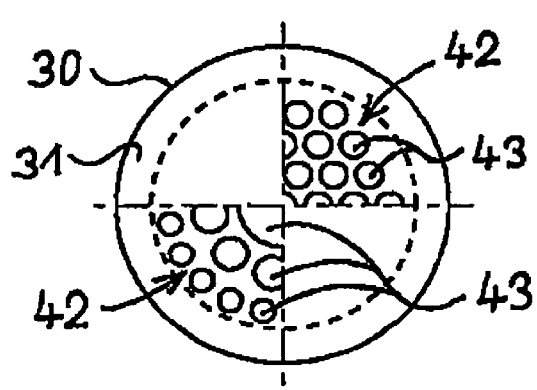

FIG. 26*c* shows two different executive forms to the upper right and the lower left. To the upper right, the breakthroughs 43 are designed as circular holes all being equal in diameter. To the lower left in FIG. 26*c*, the breakthroughs 43 are designed as holes that are differing in their diameters, wherein the diameter becomes smaller from a radially inward direction to a radially outward direction. The outer contour of the pipe connection piece 30 is again circular in FIG. 26*c*.

Figure 26D:
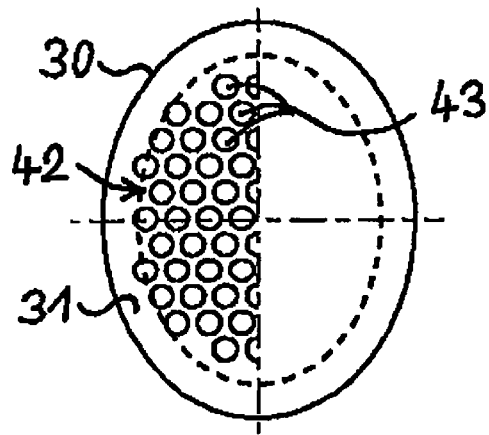

FIG. 26*d* shows an executive form where the pipe connection piece 30 has an elliptic contour. Here, the breakthroughs 43 in the preliminary stop structure are again designed as circular holes that are equal in size.

Figure 27:
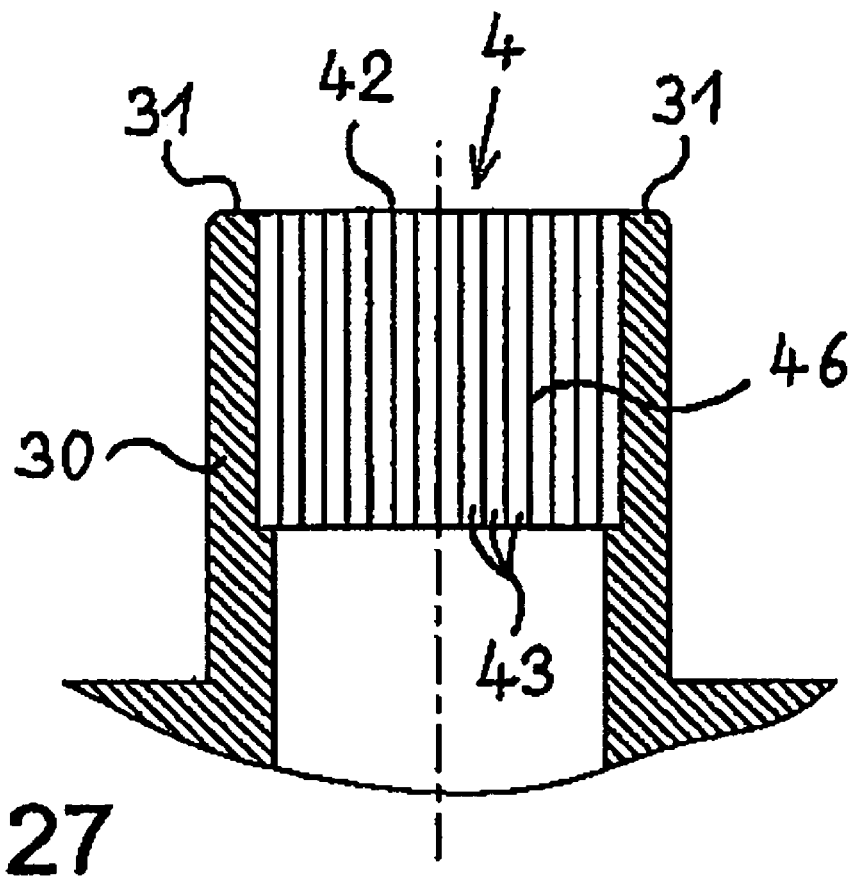
FIG. 27 shows an outflow cross-section with a modified preliminary stop, in the same type of representation as in FIG. 25.

FIGS. 27, 27*a*, 27*b*, and 27*c* again show a pipe connection piece 30 with three further executive forms of the preliminary stop structure 42. FIG. 27 is a longitudinal sectional view of the pipe connection piece 30 with its stop 31 on the top and with the inserted preliminary stop 4. Here, the preliminary stop structure 42 is again designed with a flat surface on its top. For that reason, the control diaphragm 2 (not shown) cooperating with said preliminary stop structure 42 should preferably be convex in shape.

The preliminary stop structure 42 according to FIG. 27 again forms breakthroughs 43 that are extending in parallel to each other and in axial direction of the pipe connection piece 30. Here, the preliminary stop structure 42 is formed by a honeycomb 46.

Figure 27A:
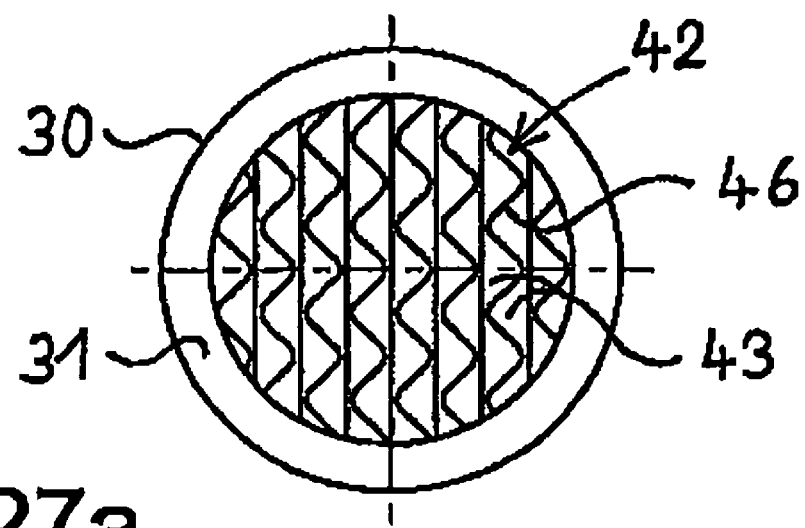
FIG. 27a and FIG. 27b each are top views of two further different preliminary stops.
Figure 27C:
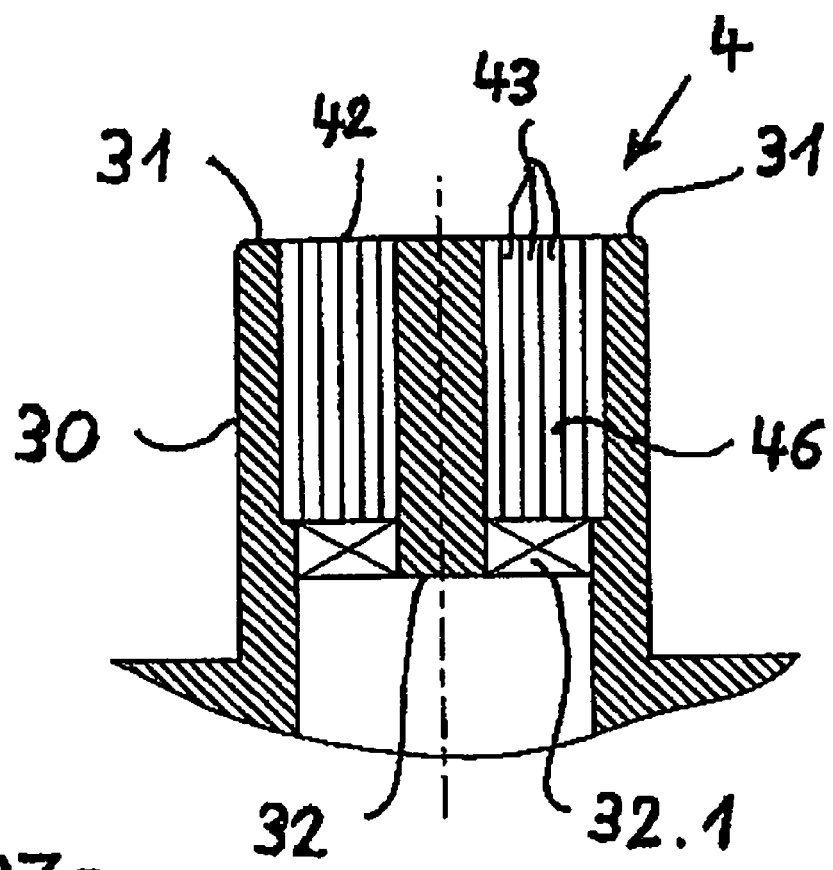
FIG. 27c shows an outflow cross-section with a modified preliminary stop, in the same type of representation as in FIG. 27.
Figure 27B:
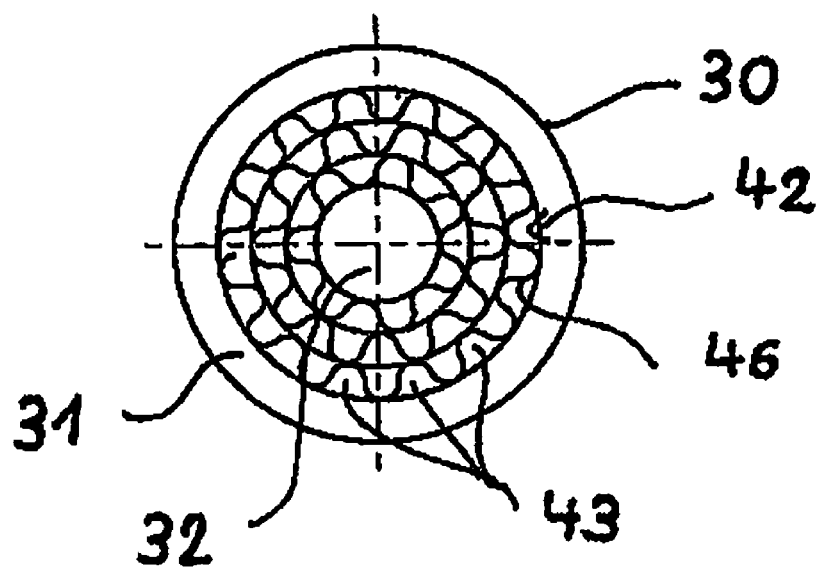

FIG. 27a and FIG. 27b are top views of two possible executive forms of this honeycomb 46. The honeycomb 46 according to FIG. 27a is a layered honeycomb structure. In the example according to FIG. 27b, the honeycomb structure 46 is designed concentrically to the center of the pipe connection piece 30.

FIG. 27c shows a pipe connection piece 30 with a central core 32 that is connected to or formed integrally with the pipe connection piece 30 via ribs 32.1. A honeycomb 46 is fitted on said central core 32.

Figure 28A:
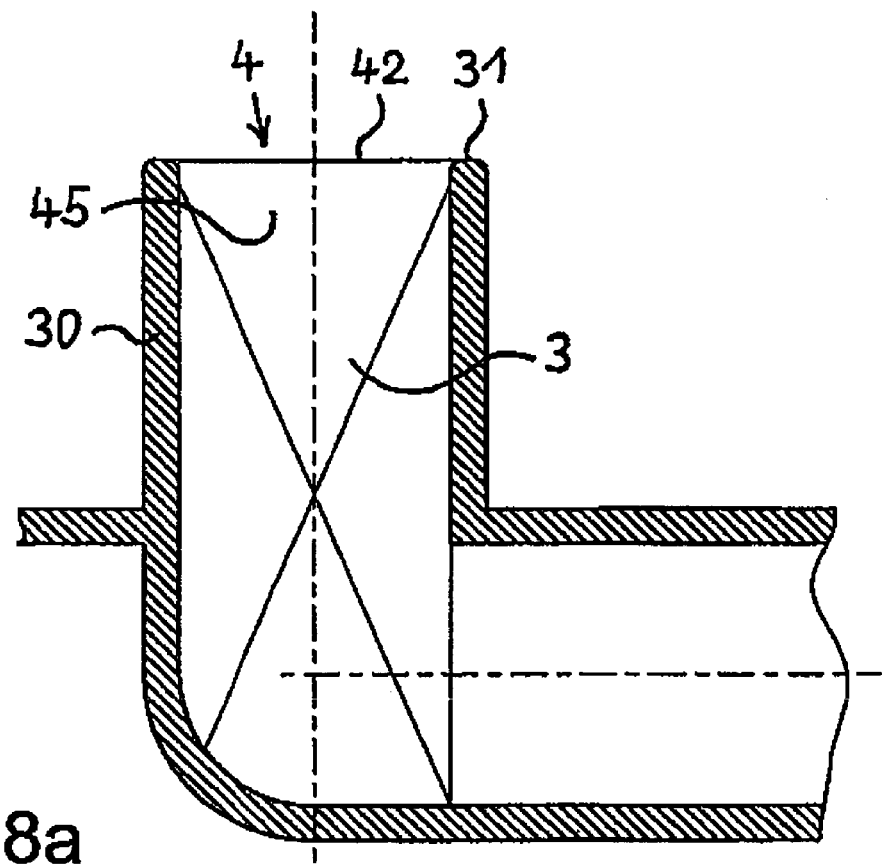
FIG. 28a is a longitudinal sectional view of a further outflow cross-section with a further preliminary stop.
Figure 28B:
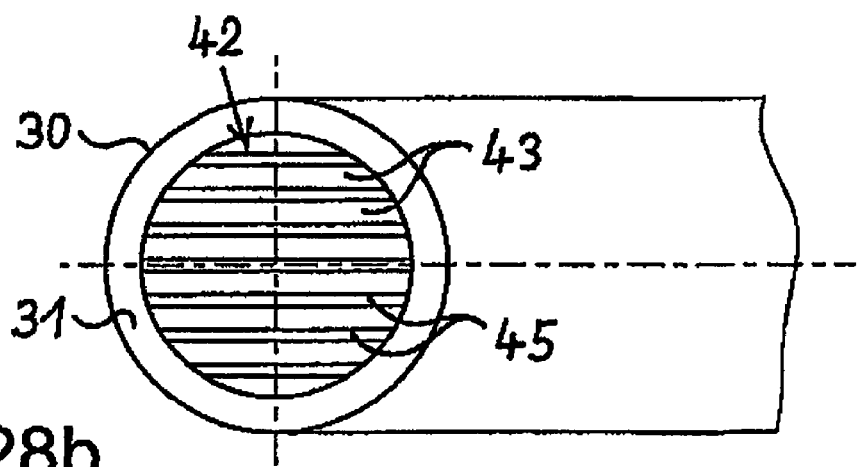

FIG. 28a and FIG. 28b show a further example of a pipe connection piece 30 for the outflow cross-section 3 with the preliminary stop 4. FIG. 28a is a longitudinal sectional view of the pipe connection piece 30 delimiting the outflow cross-section 3. Here, the preliminary stop structure 42 is arranged in the outflow cross-section 3 along the entire vertical length wherein, in the illustrated instance, the preliminary stop structure 42 is formed by flat walls 45 that extend in parallel to each other and in parallel to the drawing plane.

FIG. 28b is a top view of the walls 45 showing their parallel arrangement in a particularly clear manner. A free breakthrough 43 for guiding the gas flow is arranged between every two walls 45.

In the same type of representation as in FIGS. 28a and 28b, FIGS. 29a and 29b each show a further example of a pipe connection piece 30 for the outflow cross-section 3 with the preliminary stop 3 provided therein. This example is characteristic in that the preliminary stop structure 42 is formed by a plurality of pins 47 extending in parallel to each other and in axial direction of the pipe connection piece 30, said pins 47 being integrally formed with the pipe connection piece 30 during production of the latter. For example, such a production is achievable without any problems when thermoplastic material is used.

Figure 29A:
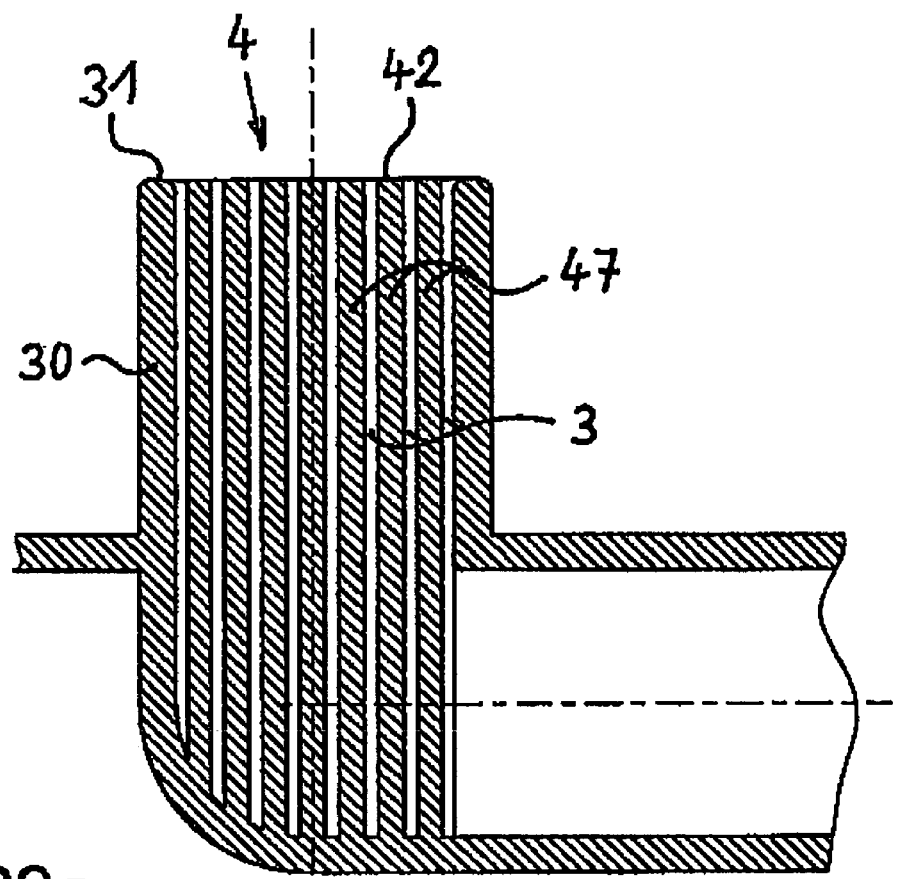
FIG. 29a is a longitudinal sectional view of a further outflow cross-section with a preliminary stop.
Figure 29B:
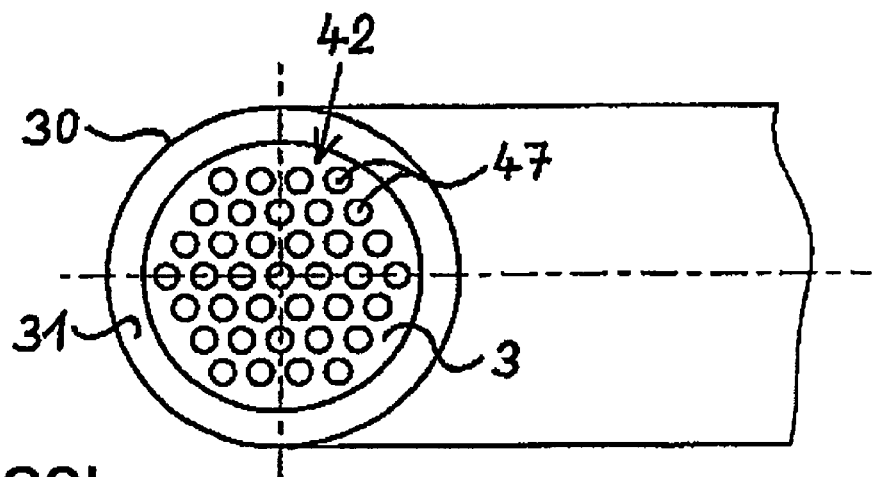

FIG. 29b is a top view of the pipe connection piece 30 with the preliminary stop 4. The parallel pins 47 form the preliminary stop structure 42, wherein the diaphragm 2 can come into bearing against the surface of said structure 42, said surface being formed by the free pin ends, in the way and manner described above by means of FIGS. 23a to 23d and to a more or less pronounced degree. Between the pins 47, a free flow cross-section remains as outflow cross-section 3 for the gas.

FIG. 30 is a partially sectional view of an executive form of a pressure regulating valve in which it is not the control diaphragm 2 itself that cooperates with the outflow cross-section 3 and the preliminary stop 4 provided therein, but a closing element 2' that is actuated by said control diaphragm 2.

At its bottom, FIG. 30 shows the upper end region of the pipe connection piece 30, which encloses the outflow cross-section 3 and the upper front side of which forms the stop 31. Here as well, a preliminary stop structure 42 forming the preliminary stop 4 is arranged in the outflow cross-section 3. Here, said preliminary stop structure 42 consists of short webs extending in parallel to each other and perpendicularly to the drawing plane, with breakthroughs 43 serving to guide the gas being kept free between said webs.

Here, the closing element 2' consists of a connection element 24' that is enlarged in the form of a plate at its bottom and is connected to the control diaphragm 2 at its upper end that is not visible here. The lower part of the closing element 2' is provided with an elastomeric lining 26' having a convex shape that points in downward direction in the unloaded state. The lining 26' is elastic and flexible and, on approaching the preliminary stop 4, initially bears against the latter with its center. As it approaches further, the lining 26' then increasingly comes into bearing with the preliminary stop 4, progressing from within outward in a radial direction, until it is finally also bearing against the stop 31, thus reaching the closed position.

In the unloaded state of the elastomeric lining 26' that is shown in FIG. 30, there is a cavity 27' between the top side of the elastomeric lining 26' and the bottom side of the connection element 24'. In order to ensure that the gas present in said cavity can escape when the elastomeric lining 26' approaches and bears against the preliminary stop 4, a hole 28' is provided, said hole 28' extending from the cavity 27' through the disk-shaped enlarged lower end of the connection element 24' to the latter's top side.

FIG. 30a shows a modified elastomeric lining 26'. On its side pointing in downward direction, that is to the preliminary stop 4, this second elastomeric lining 26' is also convex in its unloaded state. Here as well, the elastomeric lining 26' is elastic and flexible but, at the same time, also compressible. As a result, the cavity 27' with the hole 28' is not necessary.

Figure 31A:
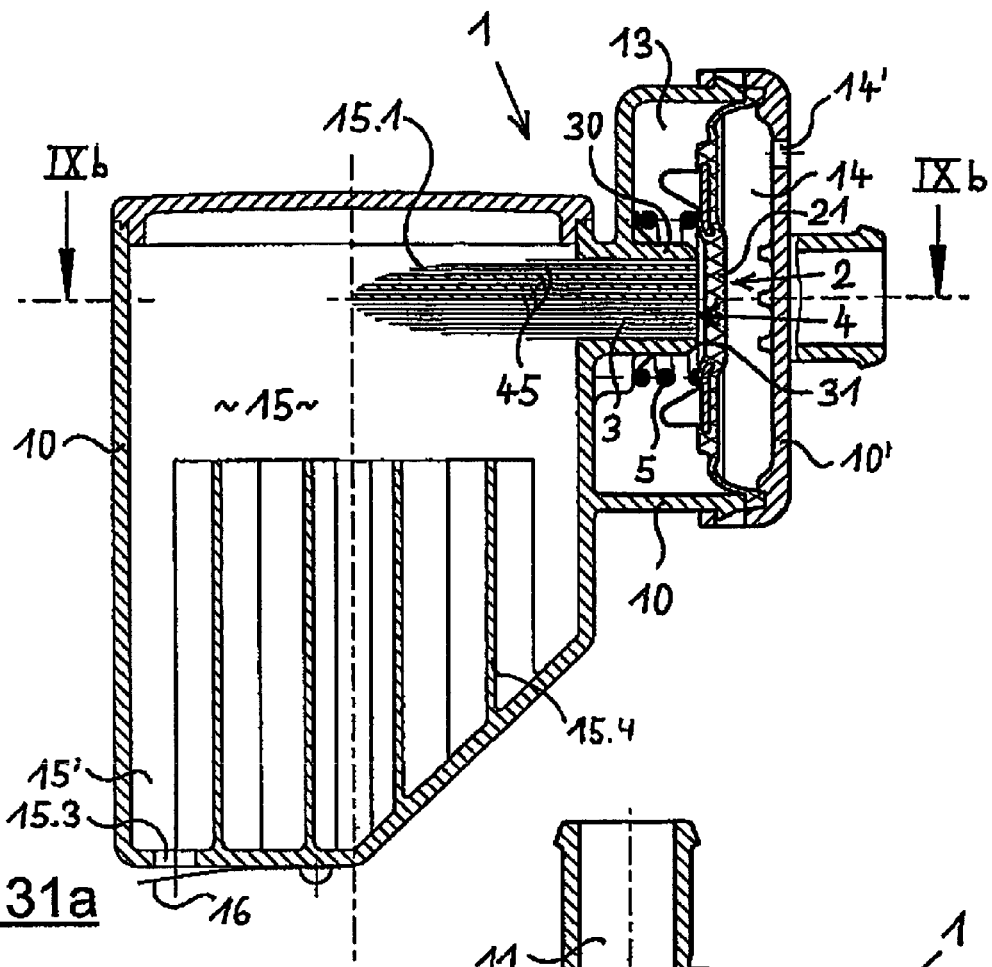
FIG. 31a is a longitudinal sectional view of a further pressure regulating valve together with a liquid collection chamber.
Figure 31B:
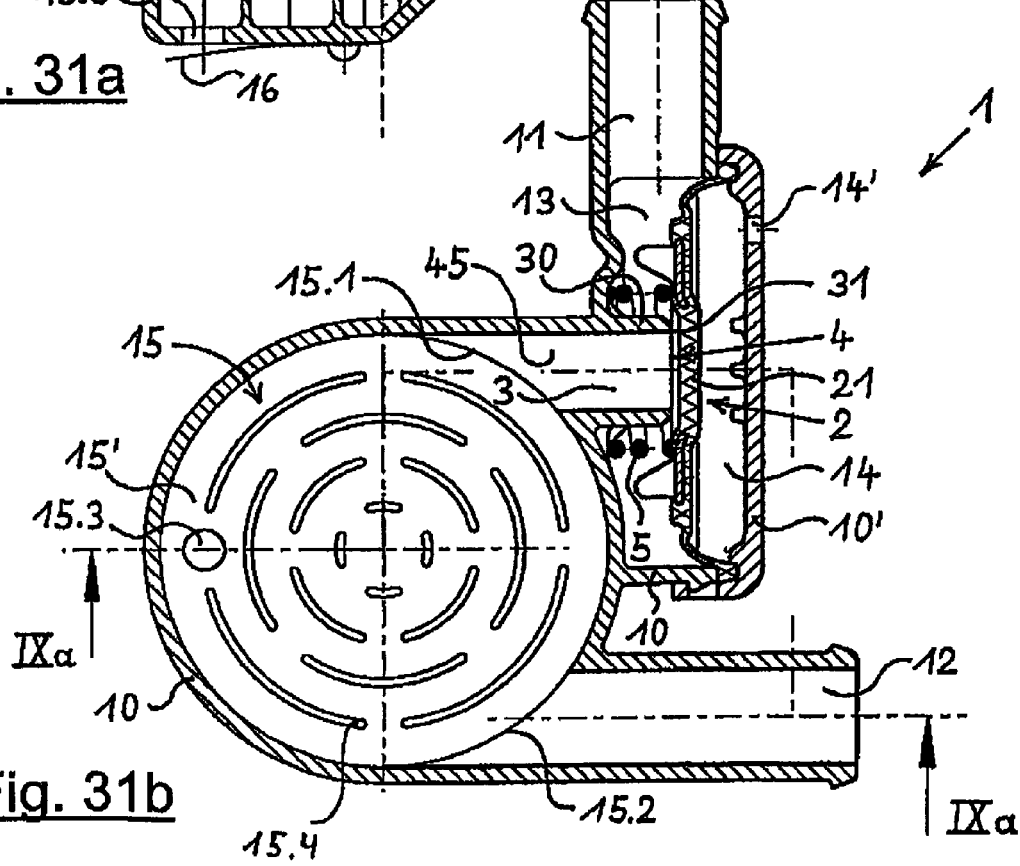

FIGS. 31a and 31b are a longitudinal sectional view and a cross-sectional view respectively of a further pressure regulating valve 1 provided with a liquid collection chamber 15.

To its upper right, the longitudinal view according to FIG. 31a shows the control diaphragm 2 in the casing 10, wherein said control diaphragm 2 is, here, arranged in a vertical plane, this being of no irrelevance to the function of the control diaphragm 2. In this example, the chamber 13 that is connected to a gas source via a gas inlet that is not visible in FIG. 31a is arranged to the left of the control diaphragm in the casing 10. The chamber 14 that is connected to the free atmosphere via the hole 14' is arranged to the right of the control diaphragm 2. Here, the control diaphragm 2 corresponds to the executive form according to FIG. 23. Here as well, the control diaphragm 2 is subjected to the governor spring 5 in opening direction.

In the region bordered by the governor spring 5, the pipe connection piece 30 forming the outflow cross-section 3 for the gas that is flowing out of the chamber 13 in a controlled manner is arranged coaxially to said governor spring 5. Here as well, a preliminary stop structure, here consisting of parallel walls 45 extending perpendicularly to the drawing plane, is arranged in the pipe connection piece 30.

Here as well, the front side of the pipe connection piece 30 facing the control diaphragm 2 forms the stop 31 for the closed position of the control diaphragm 2. The preliminary stop 4 is arranged radially inward of the stop 31, wherein the control diaphragm, when approaching the outflow cross-section 3, can come into bearing with said preliminary stop 4, starting radially inward and then progressing in a radially outward direction.

Here, the liquid collection chamber 15 is designed as a liquid separator; to achieve this, it is circular in shape as is illustrated in the cross-sectional view shown in FIG. 31b. The gas flowing out through the outflow cross-section 3 flows through a gas inlet 15.1 and then tangentially into the liquid collection chamber 15, thereby causing a rotating flow of the gas. By virtue of centrifugal force, said rotating flow causes entrained liquid droplets to settle on the internal surface of the part of the casing 10 that delimits the liquid collection space 15. By virtue of gravity, the settled liquid flows in downward direction and collects in the liquid collection chamber 15'. From there, the collected liquid can be discharged via the liquid outlet 15.3 with the reed valve 16 being open. Internal attachments prevent the separated liquid from splashing.

The gas exits the liquid collection chamber 15 through a cleaned-gas outlet 15.2, which is also extending in tangential direction, and then flows out through the gas outlet 12.

Figures 32A, 32B:
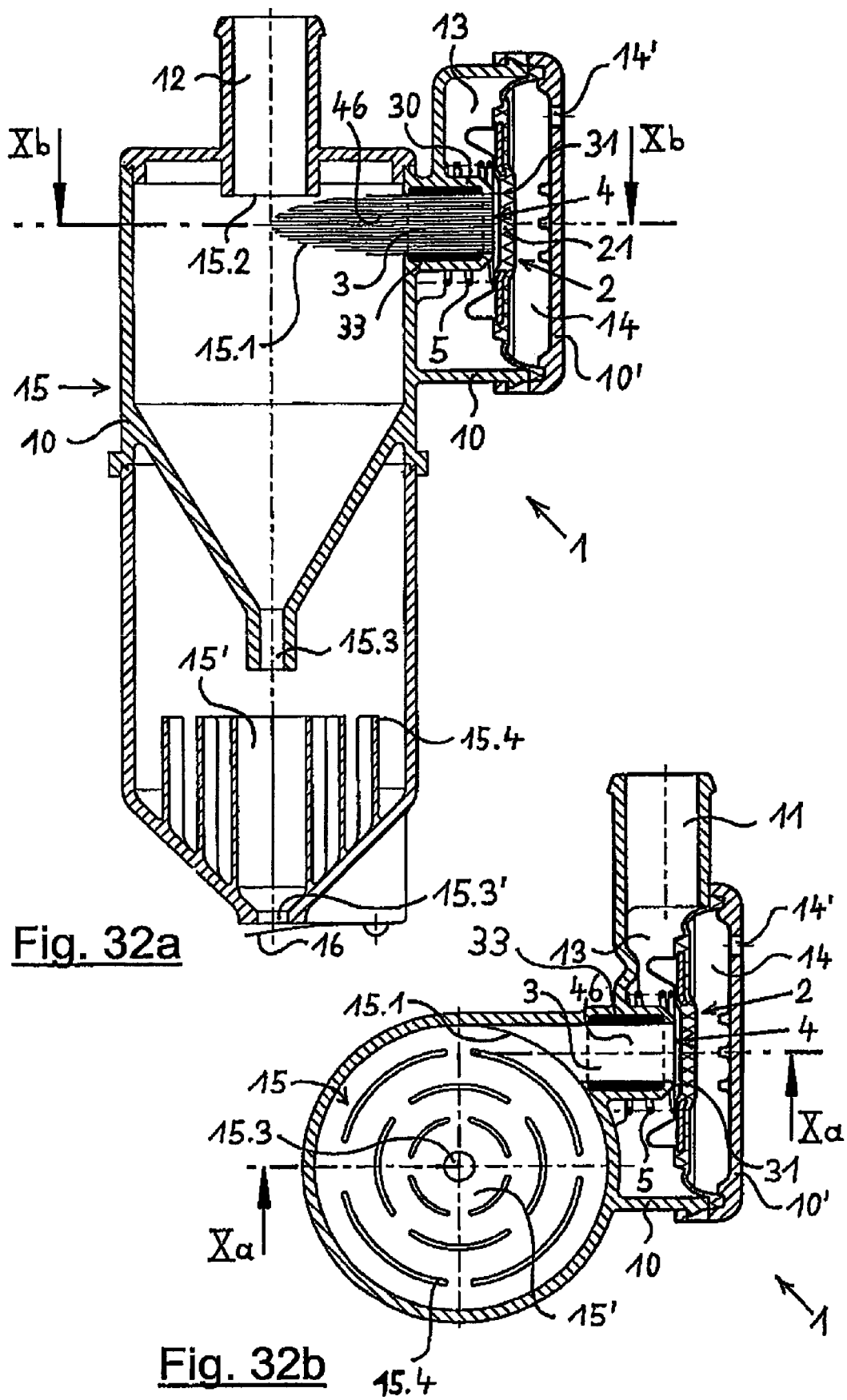

A further example of a pressure regulating valve 1 with integrated liquid collection chamber 15 is shown in FIGS. 32*a* and 32*b*, wherein FIG. 32*a* is a longitudinal sectional view and FIG. 32*b* is a cross-sectional view.

The control diaphragm 2 and the part of the casing 10 accommodating it correspond to the executive form according to FIGS. 31*a* and 31*b*. Here, a honeycomb 46 that is provided as an insert is fitted in the pipe connection piece 30 delimiting the outflow cross-section 3, said honeycomb 46 separating at least a part of the liquid droplets from the gas flowing therethrough, as has already been illustrated above.

As shown particularly clearly in FIG. 32*b*, the outflow cross-section 3 changes into a tangential gas inlet 15.1 ending in the liquid collection chamber 15 that is circular in cross-section here as well. The part of the casing 10 forming the liquid collection chamber 15 is designed in the form of a cyclone, in order to allow further liquid separation from the gas flow. Owing to the tangential inlet 15.1, the gas flow inside the liquid collection chamber 15 is forced into a rotatory direction, whereby entrained liquid droplets settle on the internal surface of the liquid collection chamber 15 by virtue of centrifugal force.

The cleaned gas exits the liquid collection chamber 15 that acts as a cyclone through a cleaned-gas outlet 15.2 arranged centrally in the upper region of said liquid collection chamber 15 and changing into the gas outlet 12.

By virtue of gravity, the settled liquid flows in downward direction inside the liquid collection chamber 15, through the liquid outlet 15.3 and into the liquid collection region 15'. Here as well, internal attachments may be provided in order to prevent the separated liquid from splashing. Via a reed valve 16, the collected liquid can be discharged through a further liquid outlet 15.3' arranged at the bottommost point of the liquid collection region 15'. In order to prevent the ducts of the honeycomb 46 from freezing under unfavorable operating conditions, an electrically heatable heater element, the electric feeder of which is not shown in the illustrated instance, is arranged around the outflow piece 30.

Figure 33A:
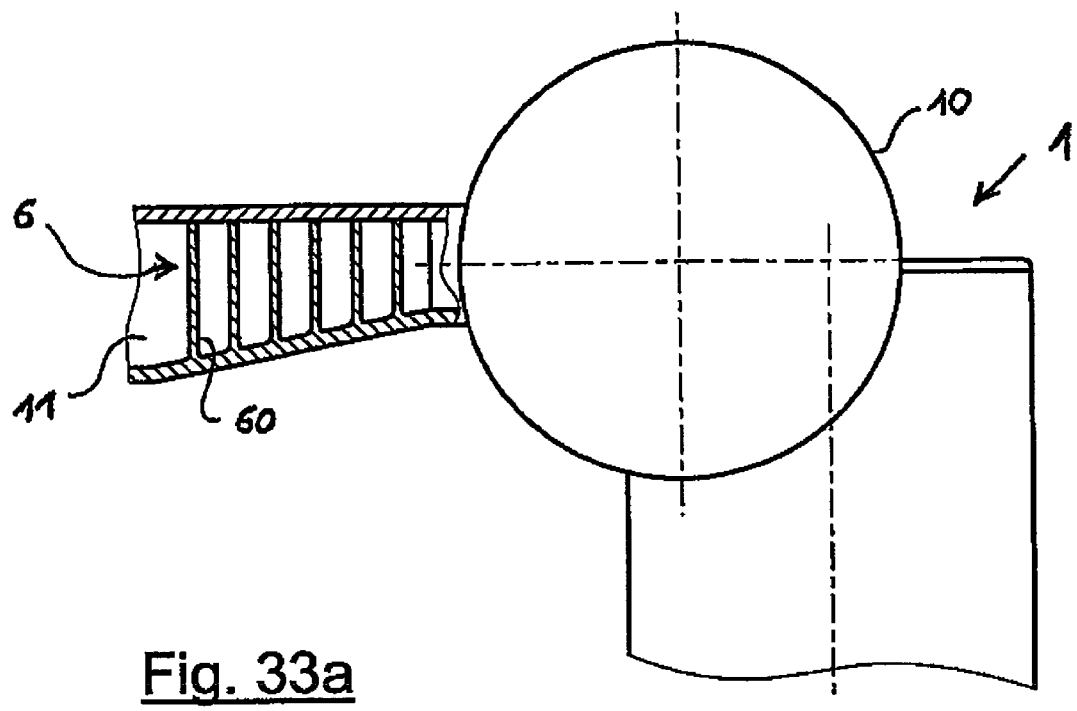
FIG. 33a shows the pressure regulating valve with a longitudinal sectional view of a preseparator.
Figure 33B:
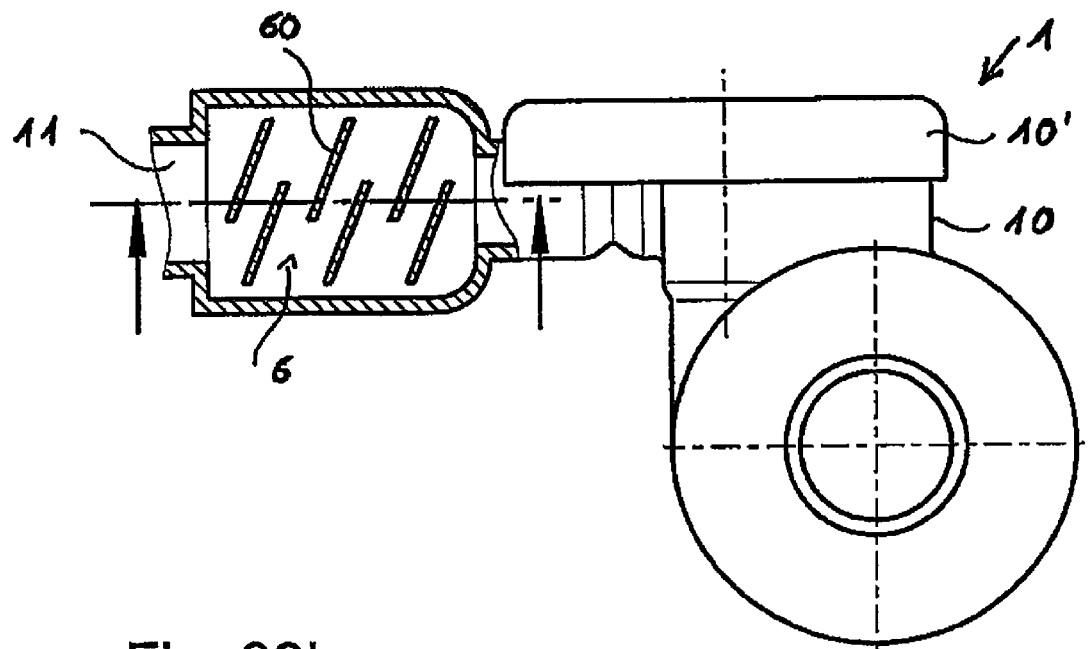
FIG. 33b shows the pressure regulating valve with a cross-sectional view of the preseparator.

FIGS. 33*a* and 33*b* show a further example of a pressure regulating valve 1. Therein, FIG. 33*a* is a longitudinal sectional view of the arrangement with a preseparator 6 and FIG. 33*b* is a cross-sectional view of said preseparator 6. In this variant, an impingement or lamellar separator is arranged as preseparator 6 in the gas inlet 11. Said preseparator 6 can, to advantage, be provided whenever the gas flow contains a high concentration of relatively large-size oil droplets. By arranging the deflecting walls 60 in the gas inlet 11, the coarse portions of the oil mist can be separated in an effective manner. Therein, it can be preferably provided that at least the geodetically lower wall of the gas inlet duct 11 is inclined in relation to the horizontal such that any oil droplets having separated in the preseparator 6 can return into the crankcase counter to the flow direction.

Figure 34:
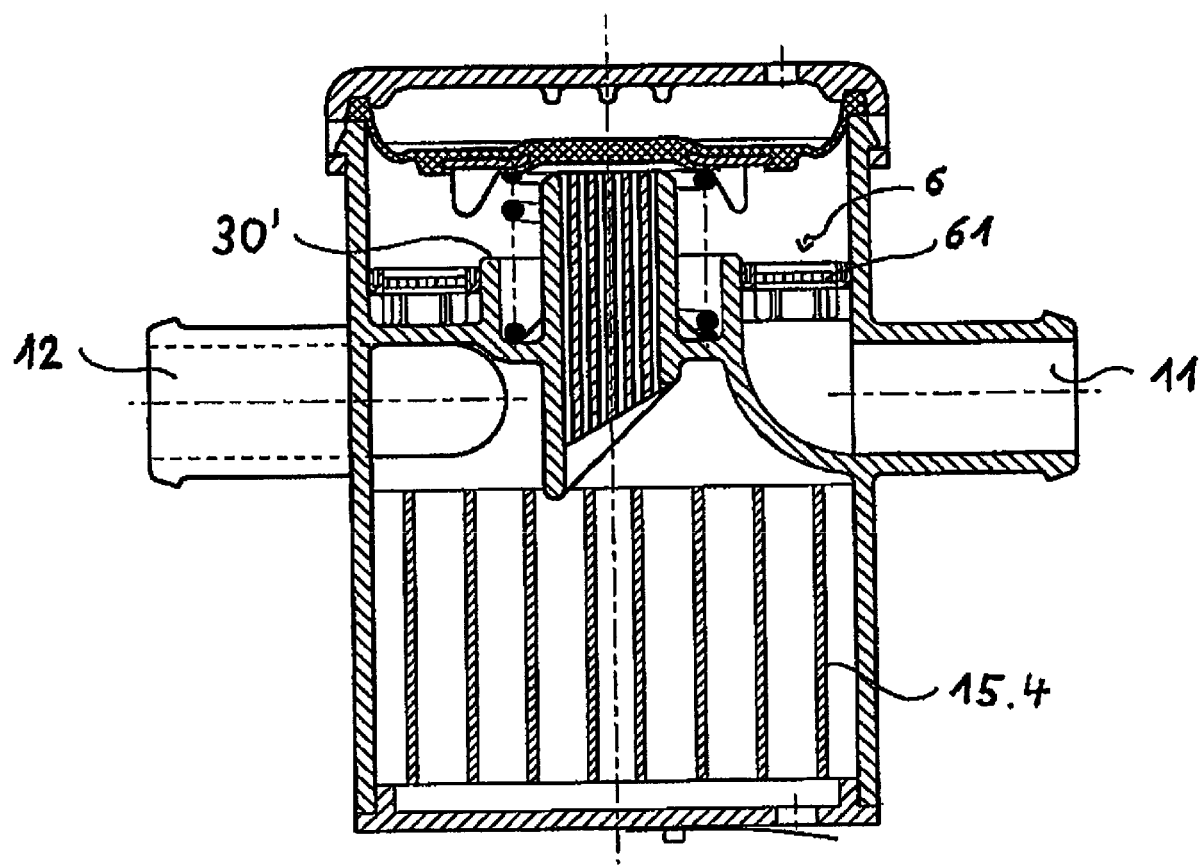
FIG. 34 shows the pressure regulating valve with a longitudinal sectional view of a screen body.

FIG. 34 is a longitudinal sectional view of a further variant of a preseparator. Here, the preseparator 6 is designed as a screen structure 61 arranged concentrically to the pipe connection piece 30' and, as seen in flow direction, between the gas inlet 11 and the preliminary stop 4. Therein, the pores of the screen structure 61 can be dimensioned such that particles from the gas flow which might close the ducts 43 of the preliminary stop structure are retained.

Figure 35A:
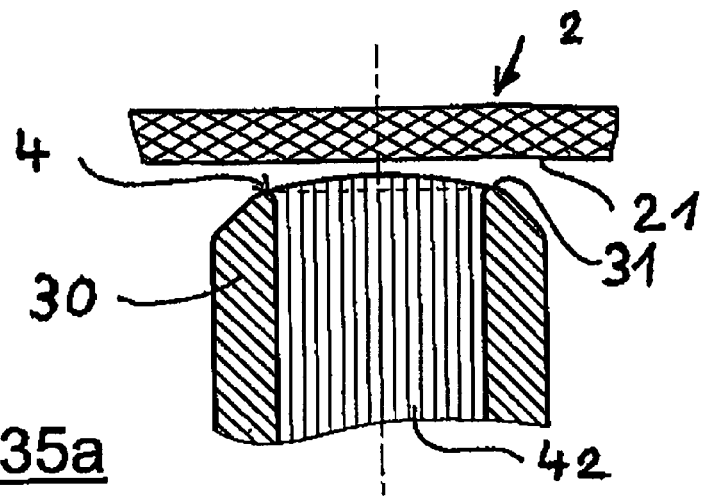
FIG. 35a and FIG. 35b each are longitudinal sectional views of the pipe connection of the outflow cross-section together with a preliminary stop as a part of a pressure regulating valve.
Figure 35B:
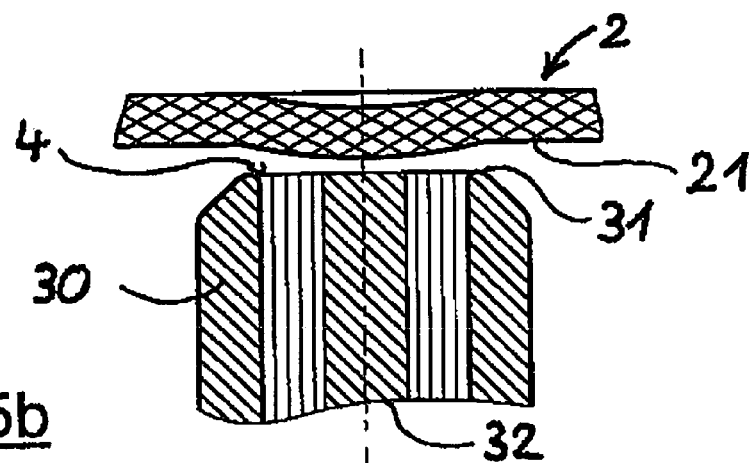
Figure 35C:
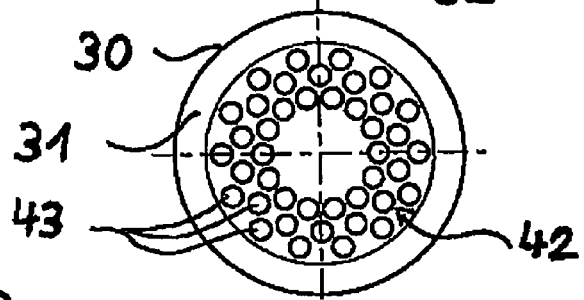
FIG. 35c and FIG. 35d each are top views of preliminary stops of the pressure regulating valve.
Figure 35D:
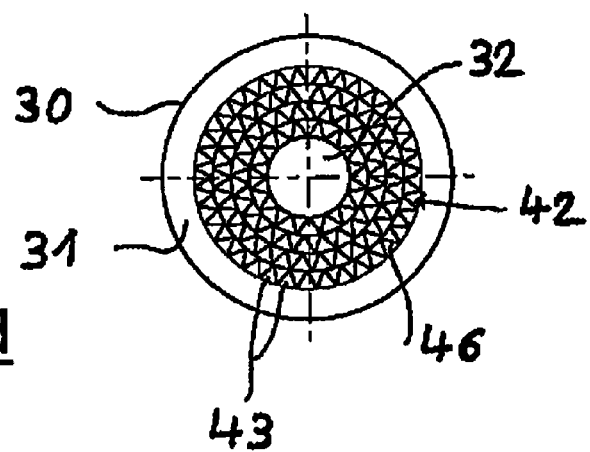

FIGS. 35*a* and 35*b* show two further forms of the preliminary stop 4. FIG. 35*a* comprises a convex design of the preliminary stop structure 42, which can, for example, be to advantage if use is made of a somewhat stiffer diaphragm. In the executive form according to FIG. 35*b*, a core 32 is arranged centrally in the pipe connection piece 30 of the outflow cross-section 3.

Figure 36:
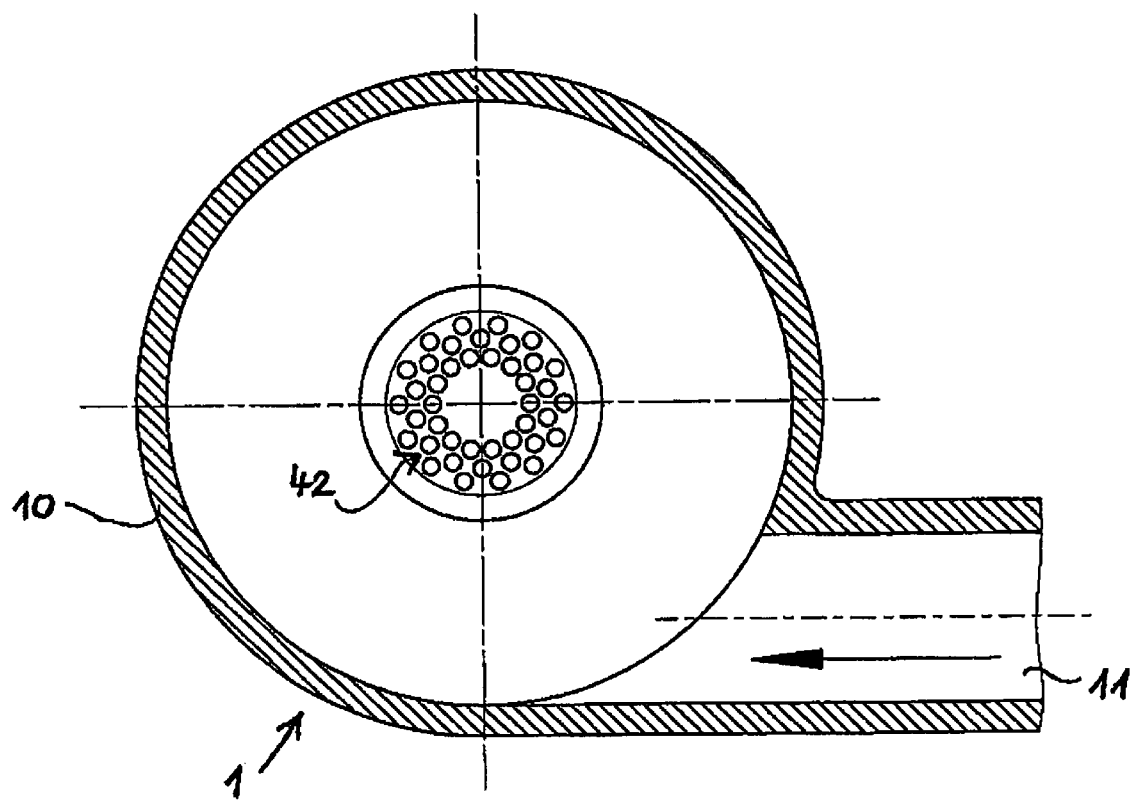
FIG. 36 shows a final variant of the pressure regulating valve with a tangential gas inlet.

In the tangentially arranged gas inlet 11 according to FIG. 36, the air column is caused to rotate inside the upper chamber 13. When entering into the breakthroughs 43 of the preliminary stop structure 42, the resulting gas vortex ensures an optimized separation of the oil droplets carried along in the gas flow, even if the gaps between the diaphragm and the preliminary stop structure are larger in size.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A pneumatic crankcase pressure regulating valve for regulating gas pressure in a crankcase of an internal combustion engine, the pressure regulating valve being arranged in the path of a crankcase ventilation line and having an opening which can be automatically changed by means of the pressure regulating valve in relation to a differential pressure between a reference pressure and one or more gas pressures applied to at least one inlet of the pressure regulating valve, comprising a control diaphragm including a closing element located in the pressure regulating valve,
the control diaphragm being subjected to the reference pressure on one side thereof and being subjected to the gas pressure as well as to a governor spring on an opposite side, wherein a change in the differential pressure between regions adjacent to the control diaphragm causes an adjustment of the control diaphragm in the form of a movement of the control diagram, and the movement of the control diaphragm increases or reduces an outflow cross-section of the valve opening,
a structure of the pressure regulating valve arranged adjacent to the outflow cross-section on the diaphragm side to form a valve seat stop for the closing element of the control diaphragm in a closed position of the control diaphragm,
at least one rigid, non-elastic and non-flexible preliminary stop arranged in the pressure regulating valve such that, when the control diaphragm is moving in its closing direction, the control diaphragm first comes into contact with the preliminary stop, the preliminary stop comprising a single pin in the interior of the valve seat stop,
the control diaphragm having at least a portion that is formed of an elastomeric material that is elastic and flexible, such that when the control diaphragm is moving further in its closing direction, the control diaphragm will then, while being subjected to elastic and flexible deformation, further reduce the cross-section of the valve opening and, in a final position, also come into contact with the valve seat stop.

2. A pressure regulating valve according to claim 1, wherein the preliminary stop is formed by a circle of pins arranged in a radially outward direction from and concentrically to the stop.

3. A pressure regulating valve according to claim 1, wherein the preliminary stop is arranged in a radially outward direction from the stop and is designed in the form of at least a segment of a ring.

4. A pressure regulating valve according to claim 1, wherein the preliminary stop is one of connected to and formed integrally with, a casing of the pressure regulating valve.

5. A pressure regulating valve according to claim 4, wherein the casing including the valve seat stop and the preliminary stop is a one-piece part made by one of injection-molding of plastic and die casting of light metal.

6. A pressure regulating valve according to claim 1, wherein the control diaphragm is reinforced with a diaphragm supporting body.

7. A pressure regulating valve according to claim 6, wherein the diaphragm supporting body is a prefabricated component part and the remaining control diaphragm is molded around the diaphragm supporting body.

8. A pressure regulating valve according to claim 6, wherein the diaphragm supporting body is a prefabricated component part and it is one of buttoned to the control diaphragm, engaged with the control diaphragm and is loose, and is pressed onto the control diaphragm by means of and on the side of the governor spring.

9. A pressure regulating valve according to claim 1, wherein one or more elements are one of formed to fit to and are attached, to the control diaphragm side facing the stop, the element cooperating with the preliminary stop.

10. A pressure regulating valve according to claim 9, wherein the element is a projection formed one of integrally with and connected to, a diaphragm supporting body forming a part of the control diaphragm.

11. A pressure regulating valve according to claim 1, wherein the region of the surface of one of the control diaphragm and the closing element, that cooperates with the preliminary stop, is formed with one of a thickening, a lining and an insert.

12. A pressure regulating valve according to claim 1, wherein the region of the surface of one of the control diaphragm and the closing element, that cooperates with the preliminary stop, is formed with one of a reduction in thickness and a weakening of the material.

13. A pressure regulating valve according to claim 1, wherein the preliminary stop is one of rounded, lenticular, spherical, conical, and stepped, on its front face.

14. A pressure regulating valve according to claim 1, wherein the pin arranged in the stop is formed with a diminishing outside diameter, as seen in the direction of the gas flow through the stop.

15. A pressure regulating valve according to claim 1, wherein one of the preliminary stop, the valve seat stop and the region of the surface of the control diaphragm that cooperates with one of the preliminary stop and the valve seat stop, is provided with one of an anti-stick lining and an antiabrasion layer.

16. A pressure regulating valve according to claim 1, wherein the pressure regulating valve is a crankcase pressure regulating valve for regulating the gas pressure in the crankcase of an internal combustion engine and the pressure regulating valve is arranged in the path of a crankcase ventilation line.

17. A pressure regulating valve according to claim 16, wherein the pressure regulating valve, together with further components of the internal combustion engine, is arranged in a module that is connectable to the internal combustion engine.

18. A pressure regulating valve according to claim 17, wherein the further components of the module are devices for one of separating oil mist from the crankcase ventilation gas of the internal combustion engine and for filtering lubricating oil and fuel of the internal combustion engine.

19. A pressure regulating valve according to claim 16, wherein one of the pressure regulating valve and the module comprising the pressure regulating valve, is integrated in a cylinder head cover of the internal combustion engine.

20. A pressure regulating valve according to claim 1, wherein the preliminary stop is formed by at least one preliminary stop structure that is positioned in the outflow cross-section and is flat and perforated on the side of the diaphragm.

21. A pressure regulating valve according to claim 20, wherein the preliminary stop structure is flat on its side facing one of the control diaphragm and the closing element.

22. A pressure regulating valve according to claim 20, wherein the perforations form passages in the preliminary stop structure which each comprise an axial length that is great in relation to the respective clear diameter of the passages.

23. A pressure regulating valve according to claim 22, wherein the passages in the preliminary stop structure each comprise an axial length that is at least five times as great as the clear diameter of the particular passage.

24. A pressure regulating valve according to claim 23, wherein the passages in the preliminary stop structure each comprise an axial length that is ten to twenty times as great as the clear diameter of the particular passage.

25. A pressure regulating valve according to claim 20, wherein the perforations form passages in the preliminary stop structure which comprise an overall surface ranging from 20 percent to 80 percent of the surface of the structure forming the valve seat stop.

26. A pressure regulating valve according to claim 20, wherein the preliminary stop structure has the form of a lattice of one of flat and plane walls and radial and concentric walls, that intersect each other.

27. A pressure regulating valve according to claim 20, wherein the preliminary stop structure has the form of a grating of one of flat and plane walls extending in parallel to each other and walls extending concentrically to each other.

28. A pressure regulating valve according to claim 20, wherein the preliminary stop structure has the form of one of a corrugated, layered and wound honeycomb.

29. A pressure regulating valve according to claim 28, wherein the preliminary stop structure is attached around a central core.

30. A pressure regulating valve according to claim 29, wherein the core is a solid body that is impermeable to the flowing medium.

31. A pressure regulating valve according to claim 29, wherein the core comprises one of a honeycomb and a duct structure in its axial direction.

32. A pressure regulating valve according to claim 29, wherein the core is formed integrally with the casing.

33. A pressure regulating valve according to claim 20, wherein the preliminary stop structure has the form of a bed of a plurality of one of parallel longitudinal pins and parallel longitudinal segments that are spaced apart from each other and the free ends of which are facing one of the control diaphragm and the closing element.

34. A pressure regulating valve according to claim 20, wherein the perforations comprise passages in the preliminary stop structure which each have a cross-section that is one of circular, elliptical, oval, polygonal, slotted, the shape of a circular sector and the shape of a circular-ring sector.

35. A pressure regulating valve according to claim 20, wherein the perforations comprises passages in the preliminary stop structure which all have the same cross-section.

36. A pressure regulating valve according to claim 20, wherein the perforations comprise passages in the preliminary stop structure which comprise at least two different cross-sections.

37. A pressure regulating valve according to claim 36, wherein the passages in the preliminary stop structure are larger on their inside and smaller on their outside, as seen in the radial direction of the passages.

38. A pressure regulating valve according to claim 20, wherein the closing element carries on its side facing the preliminary stop structure a lining that is elastic and one of flexible and compressible in an axial direction.

39. A pressure regulating valve according to claim 1, wherein the preliminary stop structure is formed integrally with the structure of the pressure regulating valve that forms the valve seat stop.

40. A pressure regulating valve according to claim 1, wherein the preliminary stop structure is formed of one or more component parts and is connected to the structure of the pressure regulating valve that forms the valve seat stop.

41. A pressure regulating valve according to claim 1, wherein at least a portion of the control diaphragm has one of a convex shape on its side facing the preliminary stop structure and a shape that can be deformed to be convex when a differential pressure is applied.

42. A pressure regulating valve according to claim 1, wherein the control diaphragm is an elastomeric diaphragm, which is free from any supporting body at least in its region cooperating with the preliminary stop structure.

43. A pressure regulating valve according to claim 1, wherein the preliminary stop structure is convex on its side facing one of the control diaphragm and the closing element.

44. A pressure regulating valve according to claim 1, wherein the structure forming the stop and the preliminary stop structure provided therein have one of a circular, elliptical, oval, ovoid, and polygonal, outer contour outline.

45. A pressure regulating valve according to claim 1, wherein the pressure regulating valve is formed with a liquid collection chamber on its outlet side forming a first separator stage, wherein at least the liquid separated from the gas flow flowing through the pressure regulating valve at the preliminary stop structure can be collected in a liquid collection region.

46. A pressure regulating valve according to claim 45, wherein the liquid collection chamber is formed as a vortex chamber that is circular in cross-section and that forms a second separator stage in which liquid droplets still contained in the gas flow through the pressure regulating valve downstream of the preliminary stop structure are separated from the gas flow by centrifugal force.

47. A pressure regulating valve according to claim 46, wherein the part of the liquid collection chamber that is at the top when the liquid collection chamber is in its installation position is formed as a cyclone with a tangential gas inlet, with a cleaned-gas outlet outgoing towards the top both centrally and axially, and with a liquid outlet going down and ending in the liquid collection region positioned underneath the cyclone.

48. A pressure regulating valve according to claim 45, wherein the liquid collection region is connected to one of a liquid discharge line and a liquid return line via a valve.

49. A pressure regulating valve according to claim 1, wherein at least one of the preliminary stop structure and the control diaphragm is provided with a heating device.

50. A pressure regulating valve according to claim 1, wherein a preseparator, in the form of one of a prescreen, and a cyclone, an impingement and a lamellar separator, capturing coarse contaminants from the gas flow, is arranged upstream of the preliminary stop structure as seen in the direction of the gas flow.

51. A pressure regulating valve according to claim 1, including an oil collection container positioned below the valve opening, wherein flow guide elements are arranged in the oil collection container.

52. A pressure regulating valve according to claim 51, wherein the flow guide elements are formed as guide walls that are arranged concentrically to each other and comprise a cross-section that has the shape of one of a circular sector and a circular-ring sector.

53. A pressure regulating valve according to claim 51, wherein the flow guide elements comprise passages which are arranged staggered in radial direction.

54. A pressure regulating valve according to claim 1, wherein the pressure regulating valve is integrated in one of a module for cleaning crankcase ventilation gases and a cylinder head cover of an internal combustion engine.

55. A pressure regulating valve according to claim 1, wherein a space on the reference pressure side of the diaphragm comprises an upper chamber and a space on the gas pressure side of the diaphragm comprises a lower chamber, and wherein the lower chamber is a vortex chamber that is circular in cross-section and in which the gas inlet is arranged tangentially and the gas column can be caused to rotate.

56. A pressure regulating valve according to claim 1, wherein the closing element comprises an integral portion of the diaphragm.

57. A pressure regulating valve according to claim 1, wherein the closing element comprises an element separate from, but attached to the diaphragm.

58. A pneumatic crankcase pressure regulating valve for regulating gas pressure in a crankcase of an internal combustion engine, the pressure regulating valve being arranged in the path of a crankcase ventilation line and having an opening which can be automatically changed by means of the pressure regulating valve in relation to a differential pressure between a reference pressure and one or more gas pressures applied to at least one inlet of the pressure regulating valve, comprising
    a control diaphragm including a closing element located in the pressure regulating valve,
        the control diaphragm being subjected to the reference pressure on one side thereof and being subjected to the gas pressure as well as to a governor spring on an opposite side, wherein a change in the differential pressure between regions adjacent to the control diaphragm causes an adjustment of the control diaphragm in the form of a movement of the control diagram, and the movement of the control diaphragm increases or reduces an outflow cross-section of the valve opening,
    a structure of the pressure regulating valve arranged adjacent to the outflow cross-section on the diaphragm side to form a valve seat stop for the closing element of the control diaphragm in a closed position of the control diaphragm,
    at least one rigid, non-elastic and non-flexible preliminary stop arranged in the pressure regulating valve such that, when the control diaphragm is moving in its closing direction, the control diaphragm first comes into contact with the preliminary stop,
    the control diaphragm having at least a portion that is formed of an elastomeric material that is elastic and flexible, such that when the control diaphragm is moving further in its closing direction, the control diaphragm will then, while being subjected to elastic and flexible deformation, further reduce the cross-section of the valve opening and, in a final position, also come into contact with the valve seat stop, wherein the preliminary stop structure extends into the structure forming the valve seat stop in an axial direction of the regulating valve structure.

59. A pressure regulating valve according to claim 58, wherein the length of the axial extension of the preliminary stop structure comprises at least 25 percent of a clear inside diameter of the structure forming the valve seat stop.

60. A pressure regulating valve according to claim 59, wherein the length of the axial extension of the preliminary stop structure comprises at least 50 percent of the clear inside diameter of the structure forming the valve seat stop.

* * * * *

UNITED STATES PATENT AND TRADEMARK OFFICE
CERTIFICATE OF CORRECTION

| | | |
|---|---|---|
| PATENT NO. | : 7,950,621 B2 | Page 1 of 1 |
| APPLICATION NO. | : 10/592697 | |
| DATED | : May 31, 2011 | |
| INVENTOR(S) | : Uwe Meinig et al. | |

It is certified that error appears in the above-identified patent and that said Letters Patent is hereby corrected as shown below:

On the Title Page:

After "(65) Prior Publication Data" and the publication listed, please insert:

-- (30) Foreign Application Priority Data
  March 12, 2004  (DE)......20 2004 003 860.9
  August 20, 2004  (DE)......20 2004 013 123.4 --

Signed and Sealed this
Twenty-third Day of August, 2011

David J. Kappos
*Director of the United States Patent and Trademark Office*